United States Patent [19]

Izutani et al.

[11] Patent Number: 5,088,281
[45] Date of Patent: Feb. 18, 1992

[54] METHOD AND APPARATUS FOR DETERMINING DETERIORATION OF THREE-WAY CATALYSTS IN DOUBLE AIR-FUEL RATIO SENSOR SYSTEM

[75] Inventors: Takahide Izutani, Susono; Nobuaki Kayanuma, Gotenba; Michio Furuhashi, Susono; Yukihiro Sonoda, Susono; Hiroyuki Sawamoto, Susono; Kouichi Hoshi, Susono; Kouichi Osawa, Susono; Hironori Bessho, Susono, all of Japan

[73] Assignee: Toyota Jidosha Kabushiki Kaisha, Aichi, Japan

[21] Appl. No.: 381,532

[22] Filed: Jul. 18, 1989

[30] Foreign Application Priority Data

Jul. 20, 1988 [JP] Japan .................................. 63-179155
Jul. 21, 1988 [JP] Japan .................................. 63-180336
Feb. 3, 1989 [JP] Japan .................................... 1-23962

[51] Int. Cl.⁵ ............................................. F01N 3/20
[52] U.S. Cl. .......................................... 60/274; 60/276; 60/277; 60/285

[58] Field of Search .................. 60/274, 276, 277, 285

[56] References Cited

U.S. PATENT DOCUMENTS

| 4,007,589 | 2/1977 | Neidhard et al. | 60/274 |
| 4,622,809 | 11/1986 | Abthoff | 60/274 |
| 4,739,614 | 4/1988 | Katsuno et al. | 60/276 |
| 4,817,383 | 4/1989 | Masui | 60/276 |

FOREIGN PATENT DOCUMENTS

| 63-97852 | 4/1988 | Japan . | |
| 2178857 | 2/1987 | United Kingdom | 70/274 |

*Primary Examiner*—Douglas Hart
*Attorney, Agent, or Firm*—Oliff & Berridge

[57] ABSTRACT

In a double air-fuel ratio sensor system having three-way catalysts, a full $O_2$ storage amount of the three-way catalysts is estimated and compared with a predetermined amount. When the estimated full $O_2$ storage amount is smaller than the predetermined amount, the three-way catalysts are determined to have deteriorated.

54 Claims, 41 Drawing Sheets

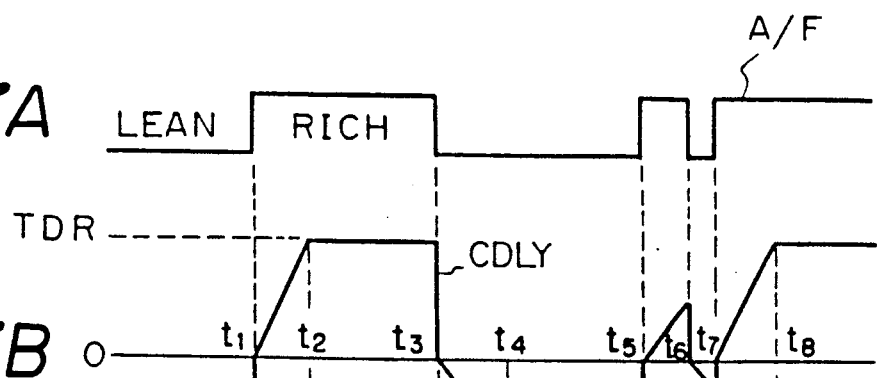
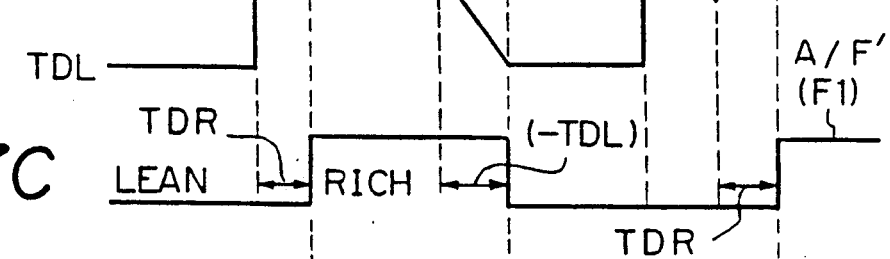
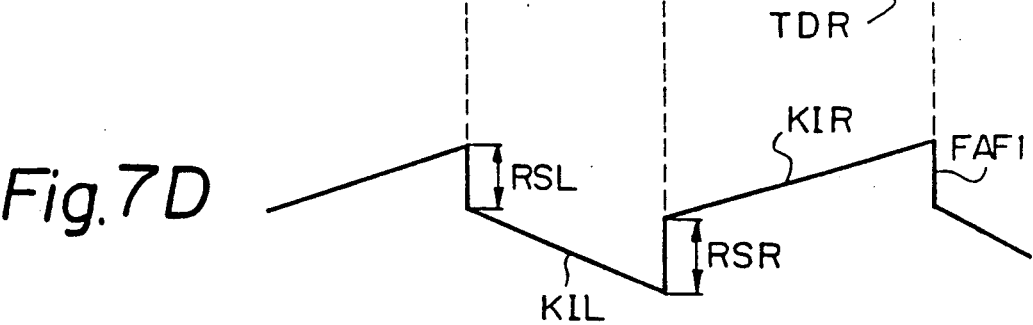

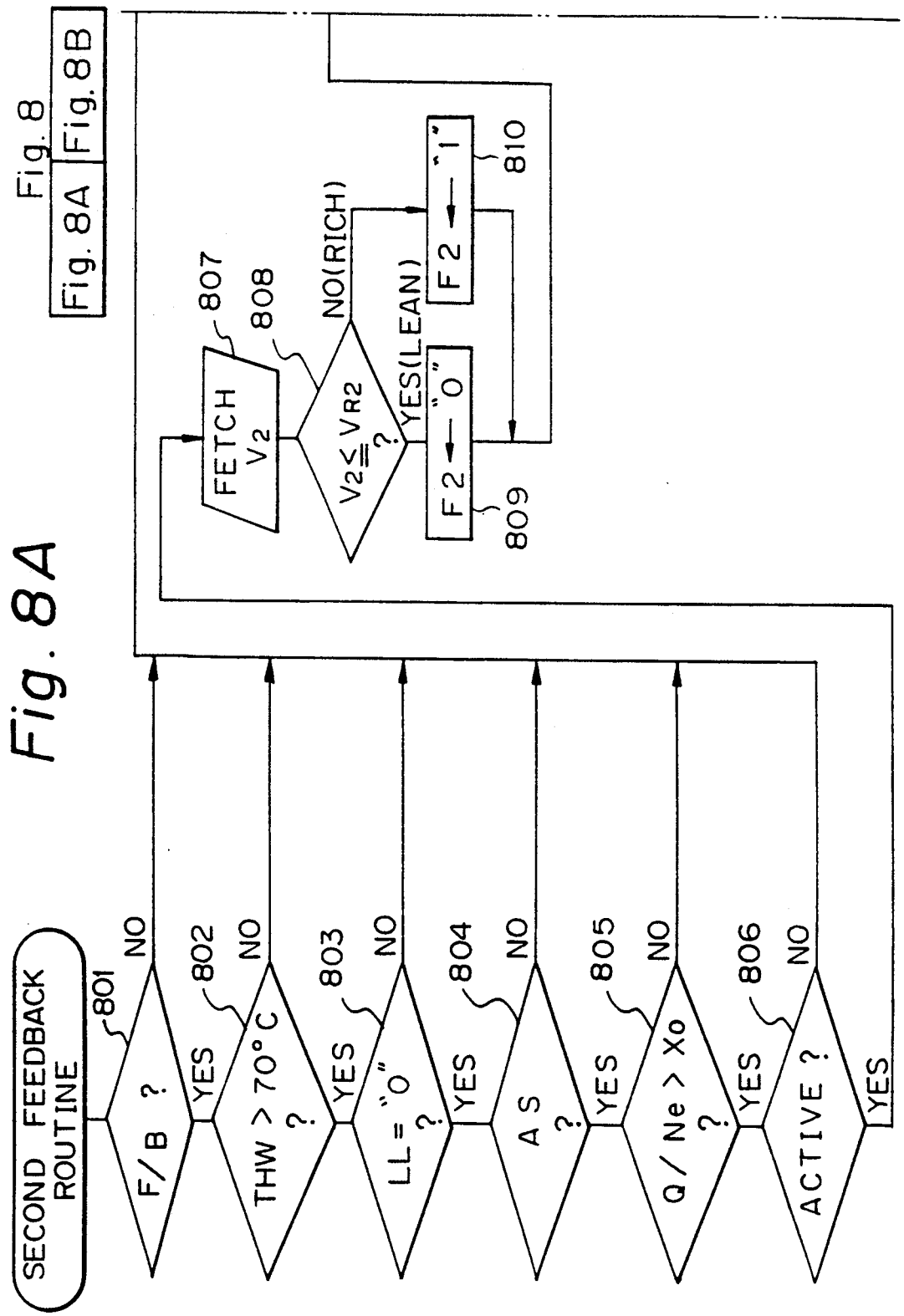

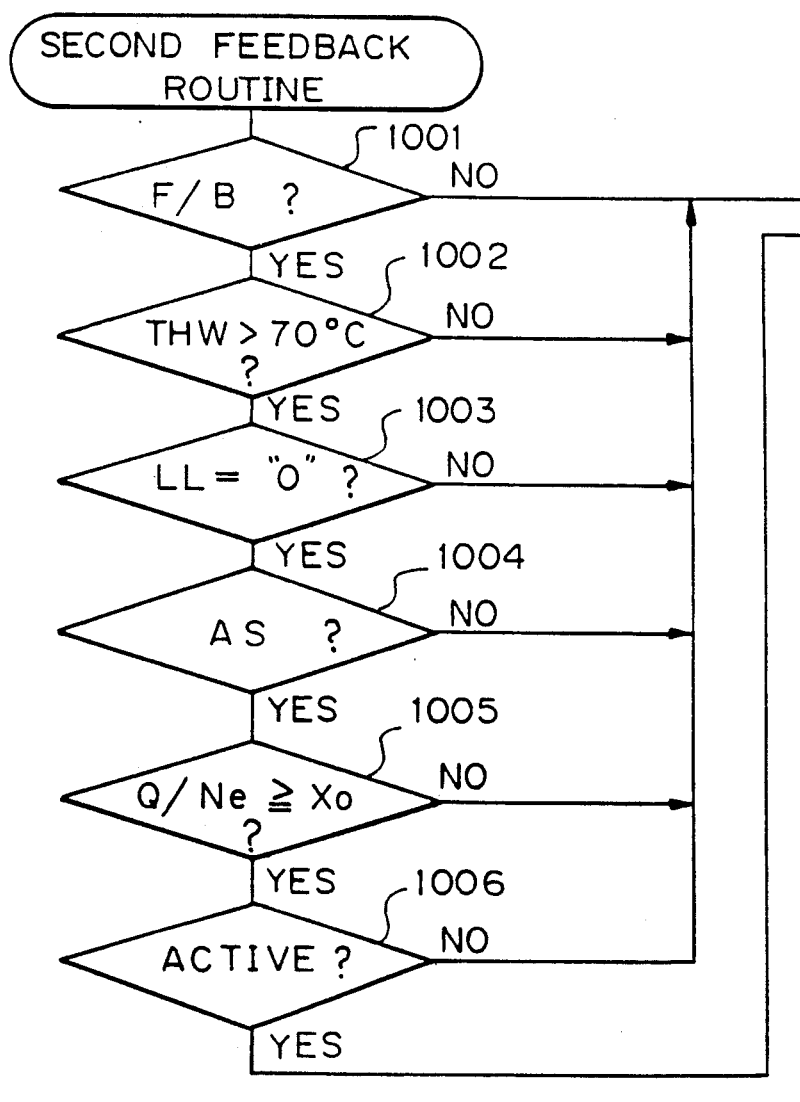

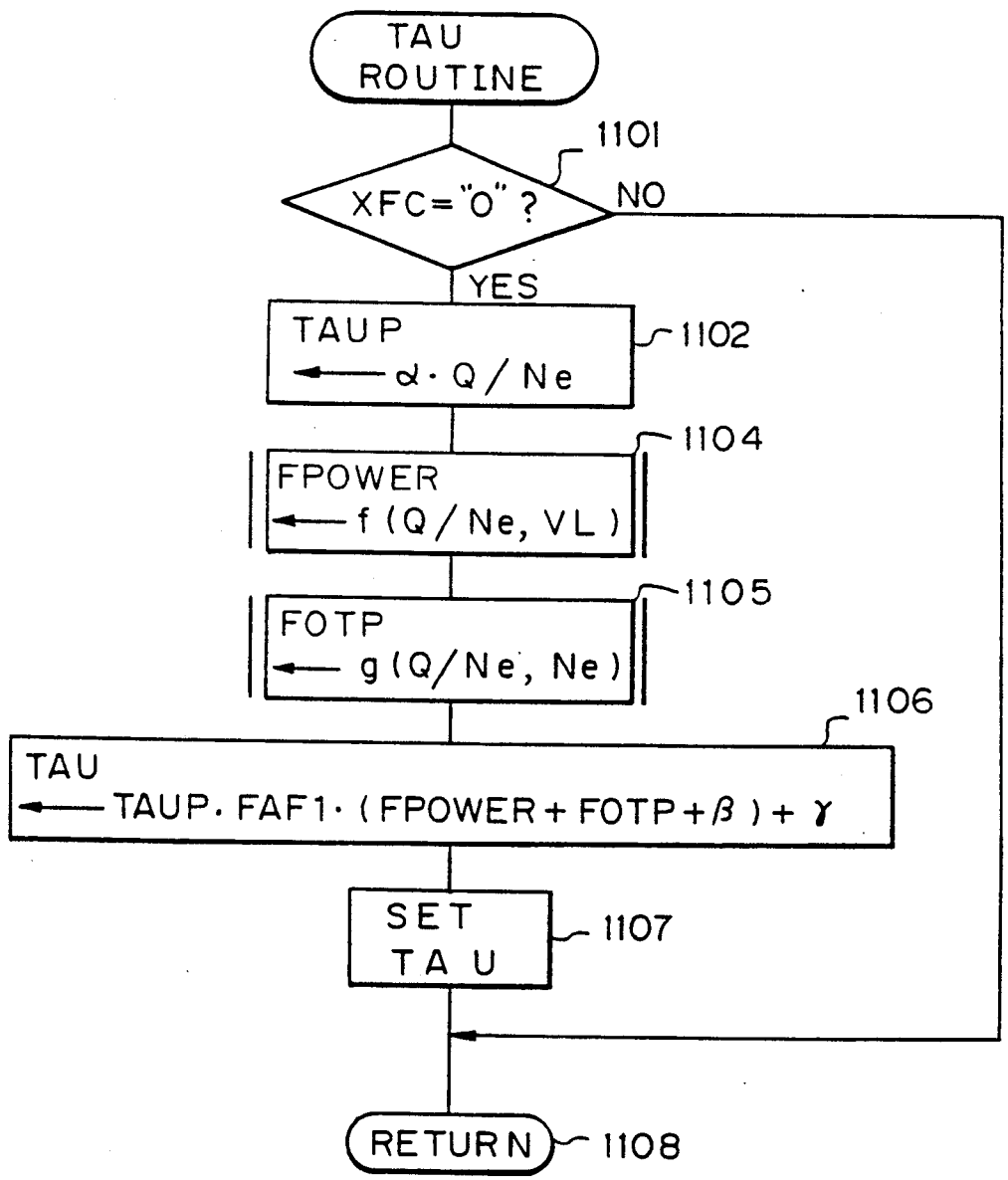

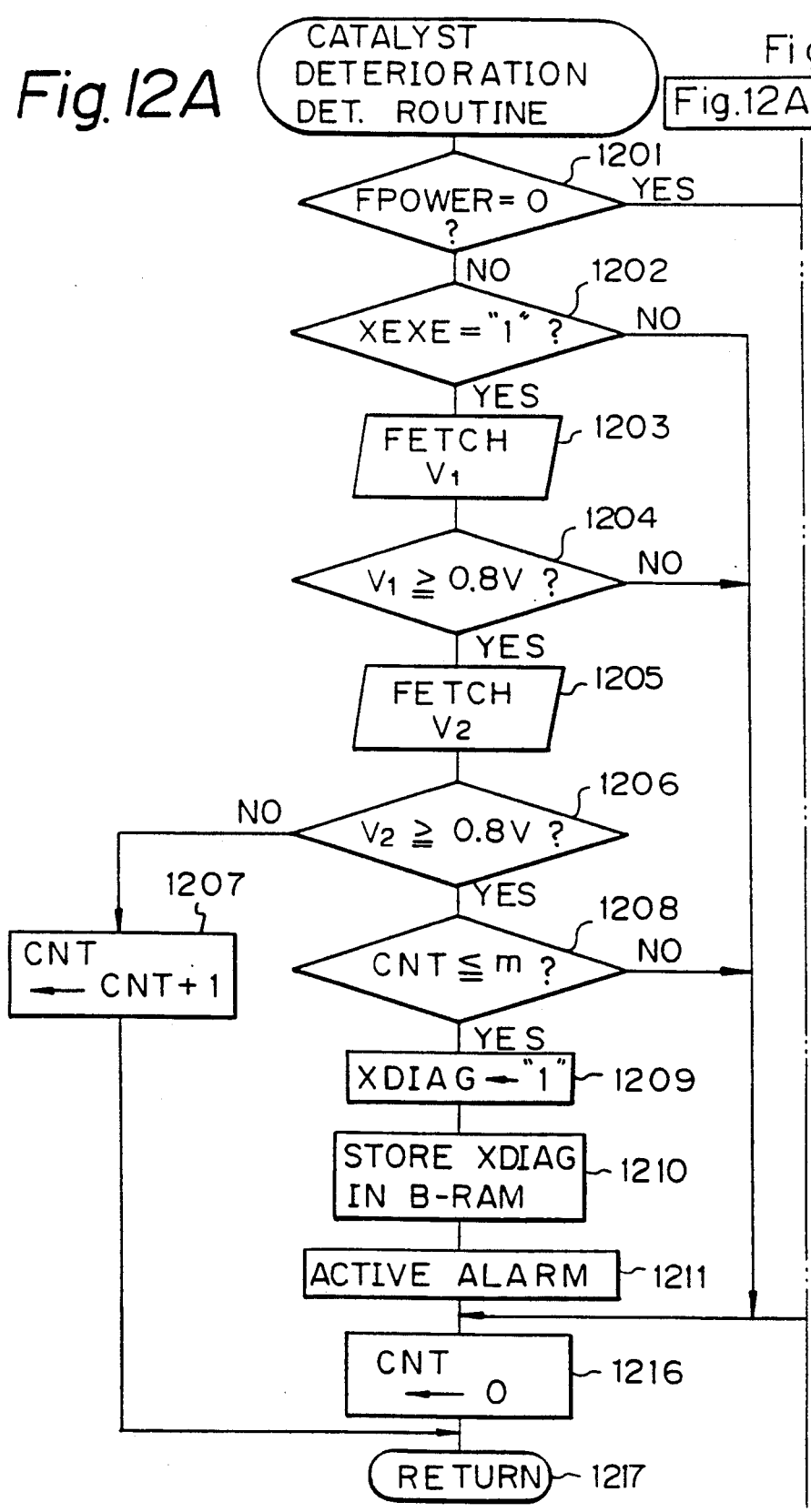

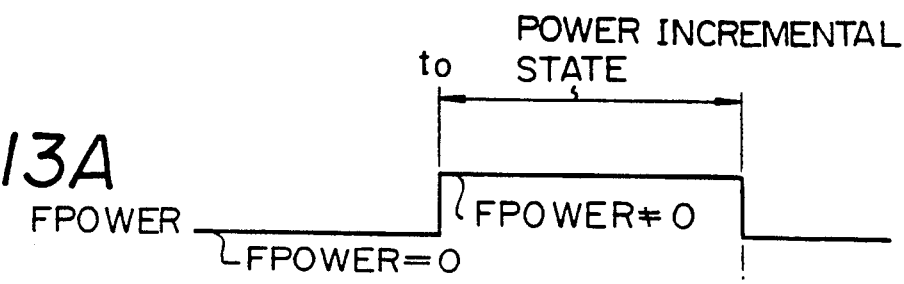
Fig. 13A FPOWER
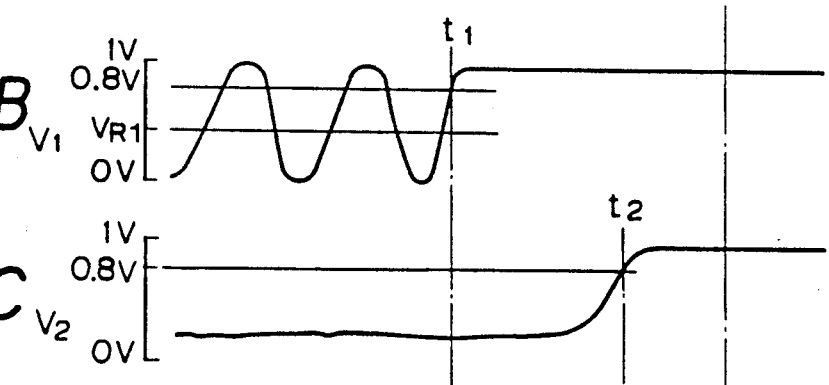
Fig. 13B $V_1$
Fig. 13C $V_2$
Fig. 13D XEXE
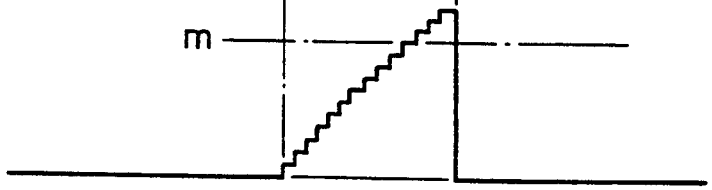
Fig. 13E CNT

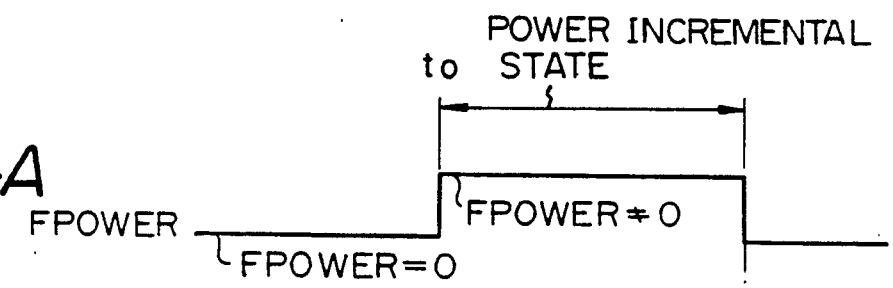
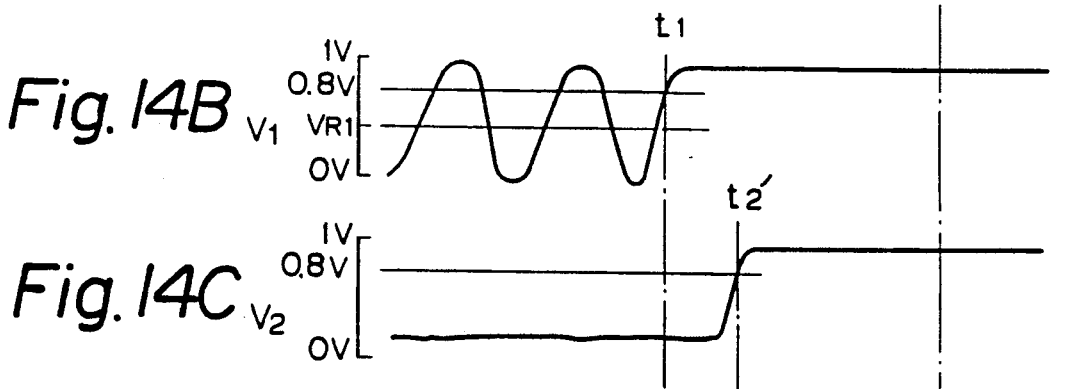
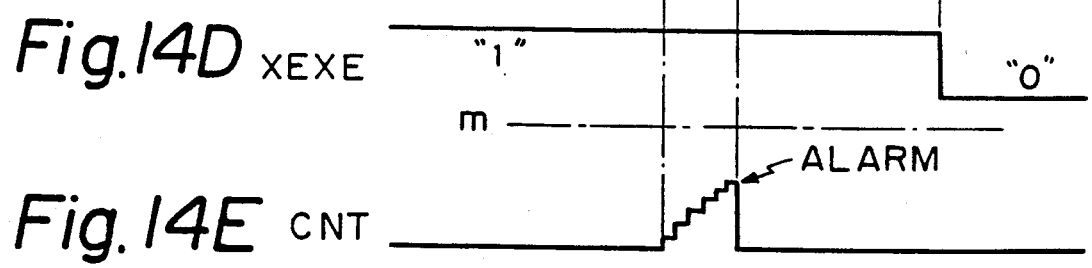

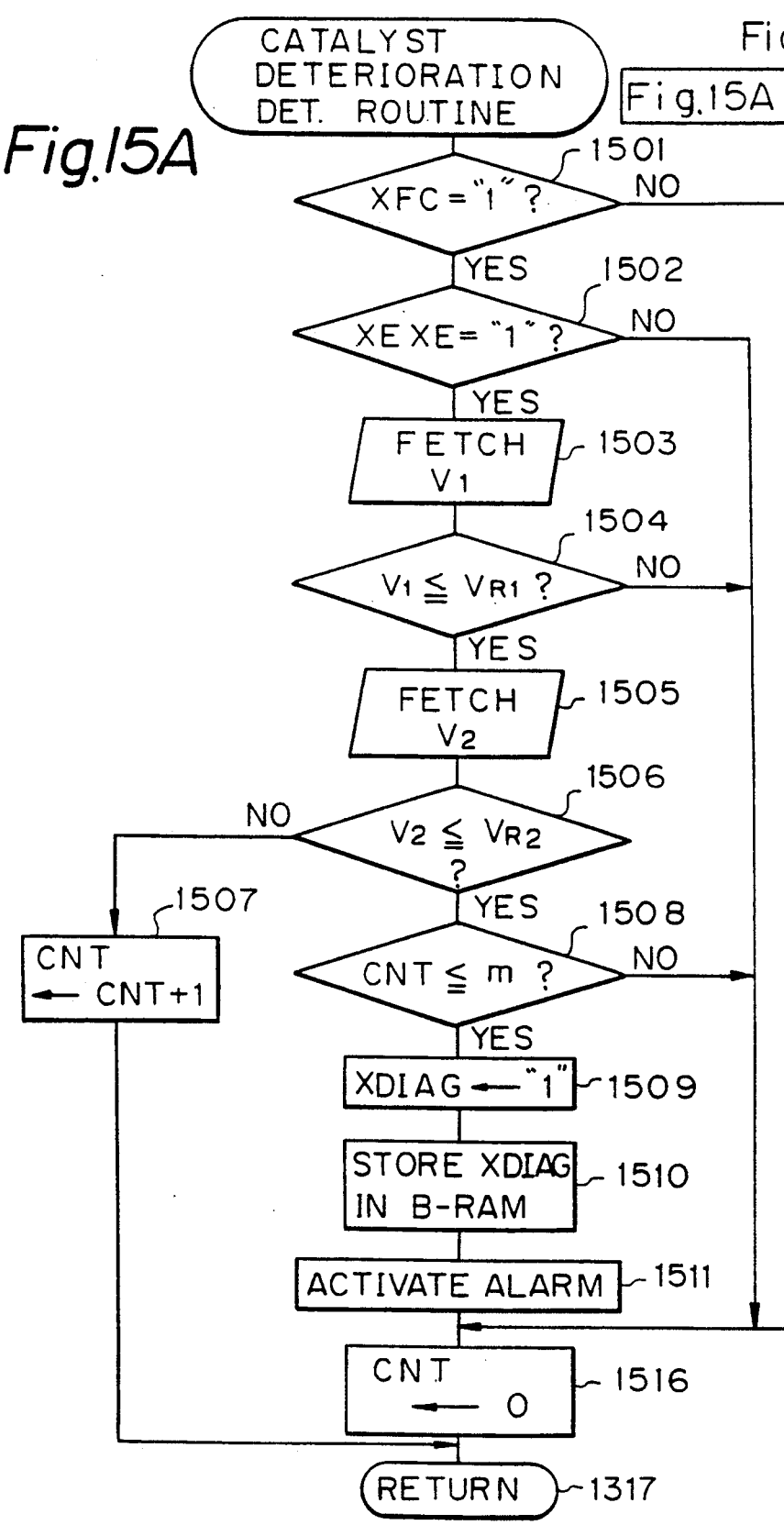

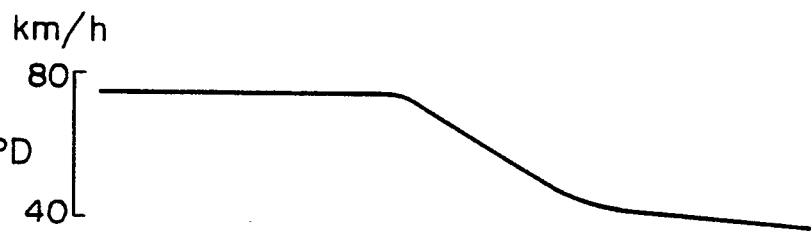
Fig.16A SPD
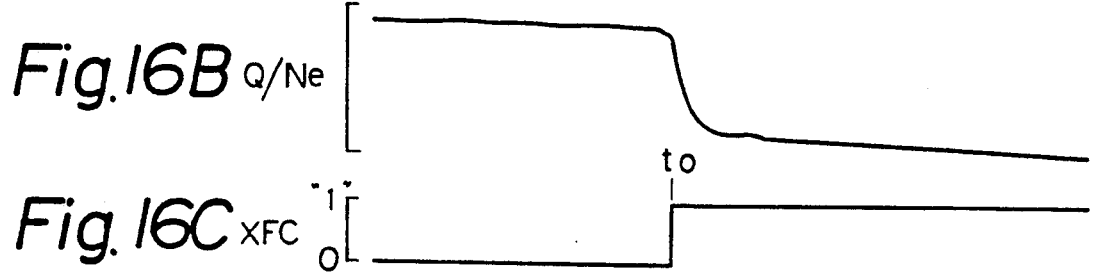
Fig.16B Q/Ne
Fig.16C XFC
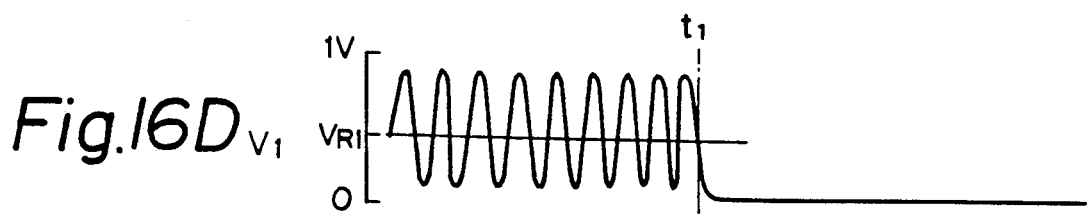
Fig.16D V₁
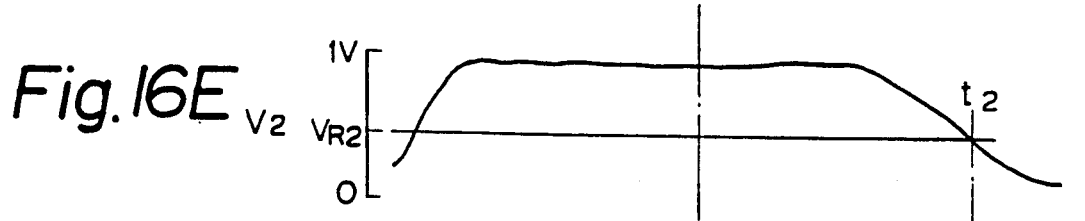
Fig.16E V₂
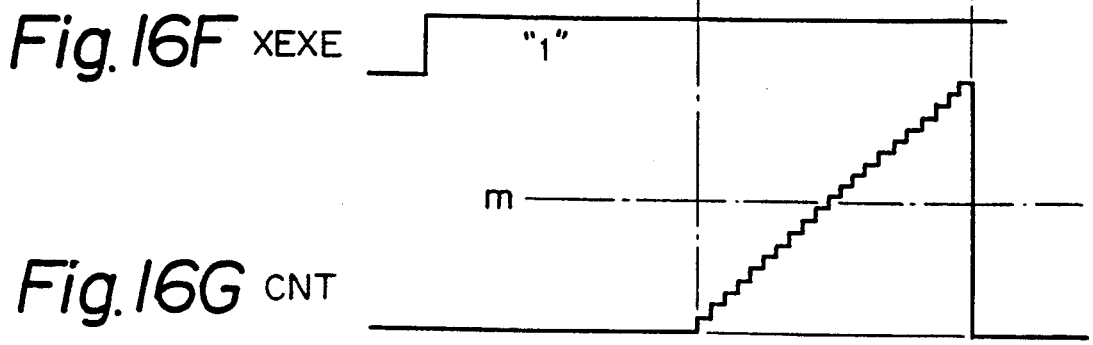
Fig.16F XEXE
Fig.16G CNT

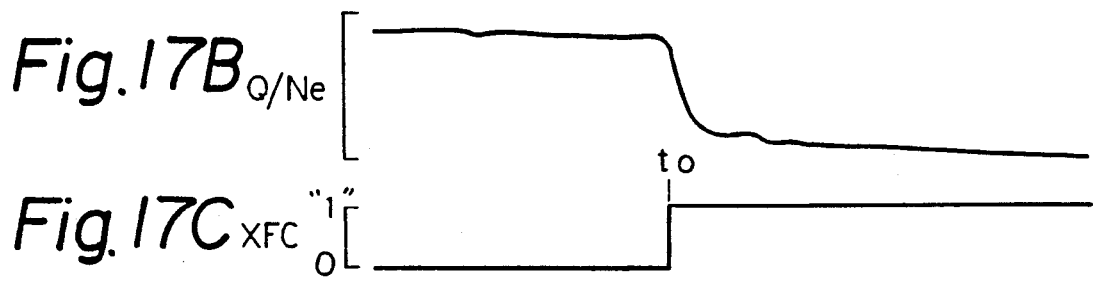
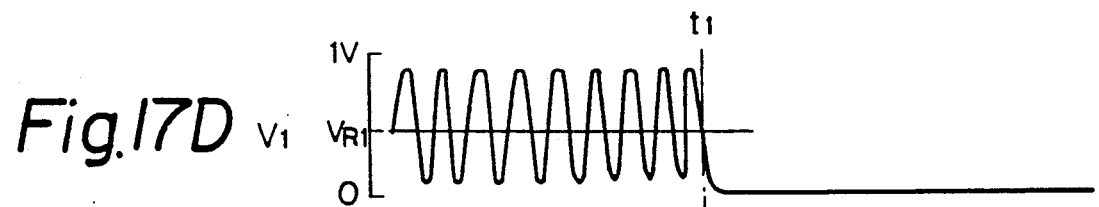
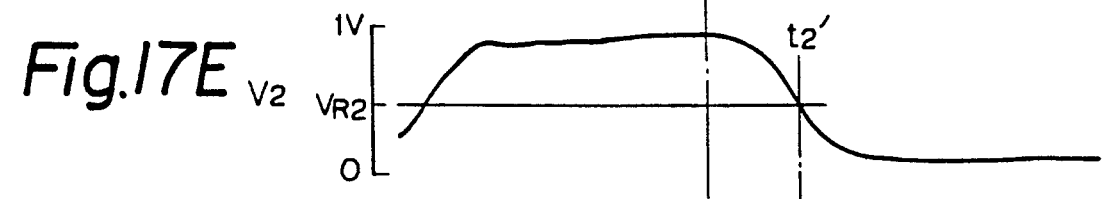
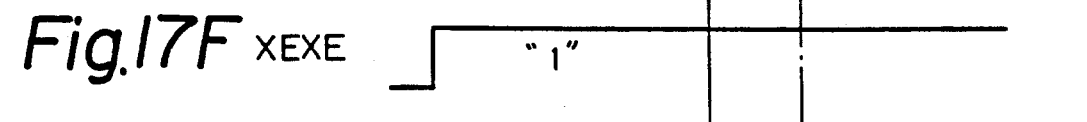

| Fig. 18A | Fig. 18B |

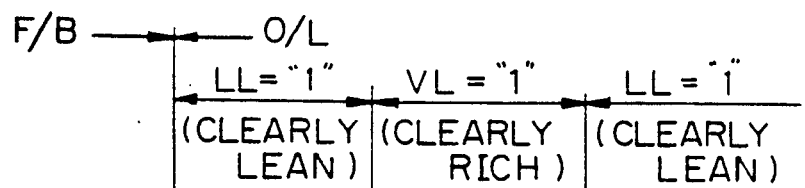
Fig.19A
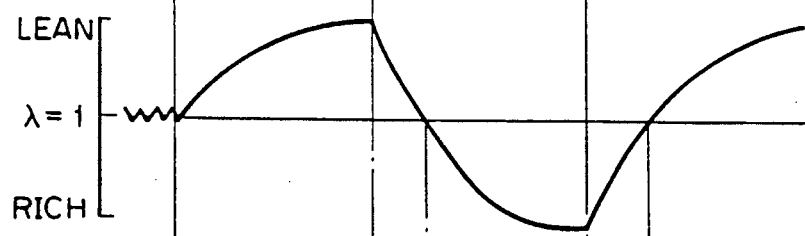
Fig.19B
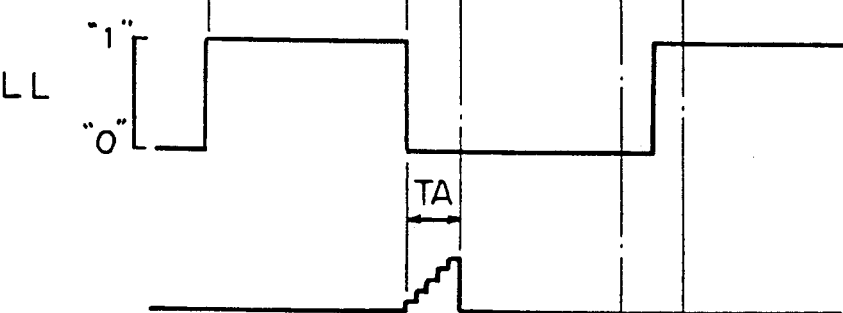
Fig.19C
Fig.19D
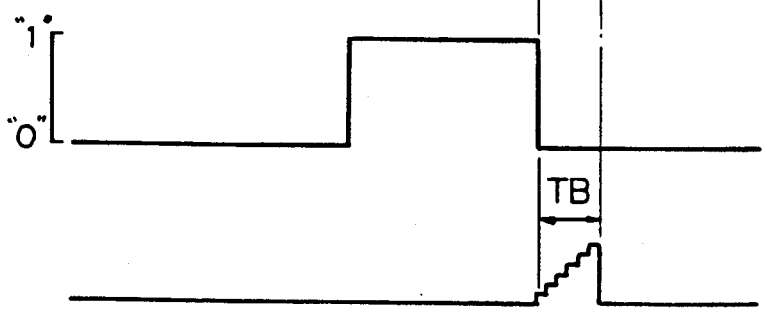
Fig.19E

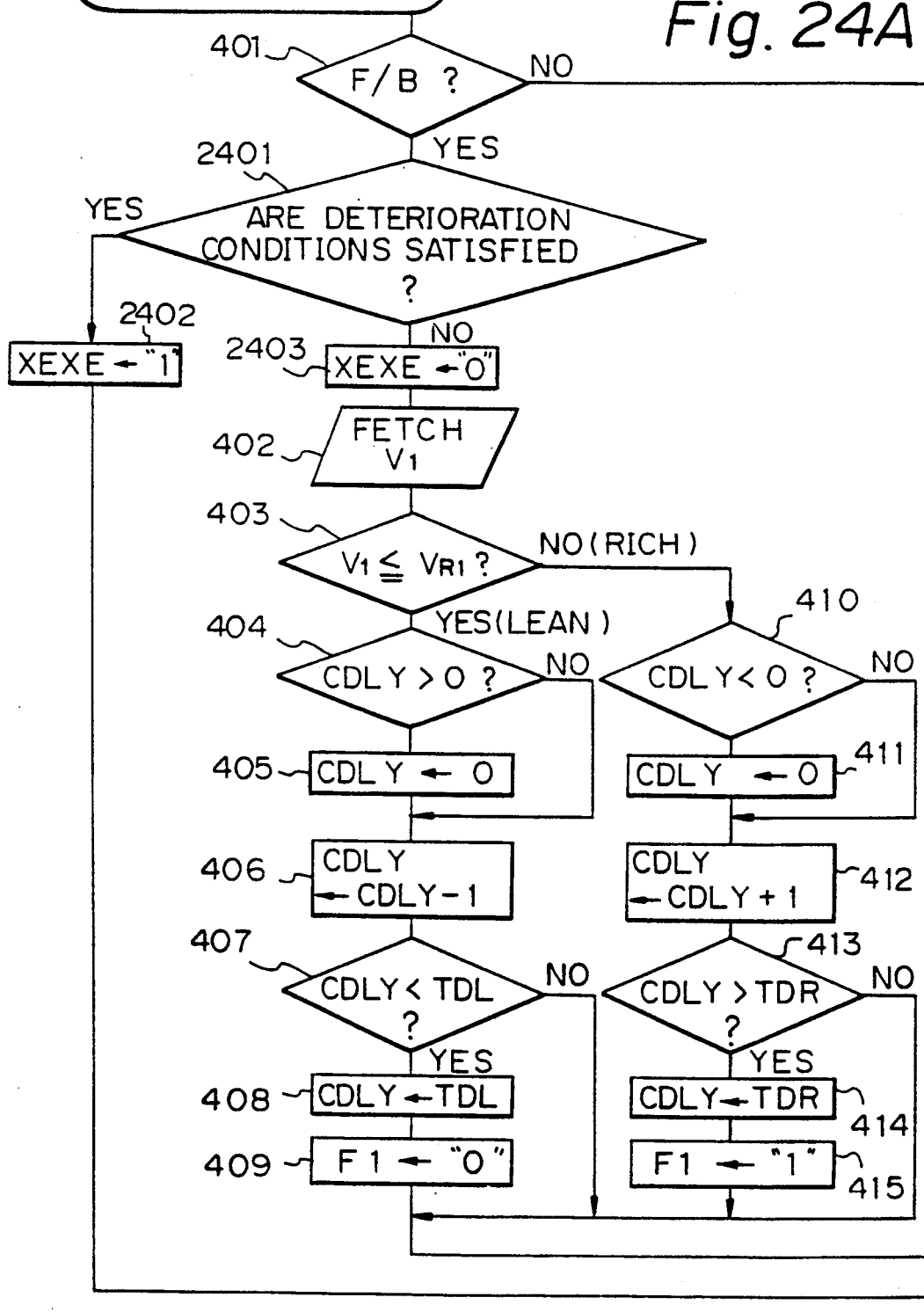

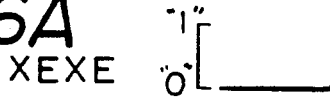
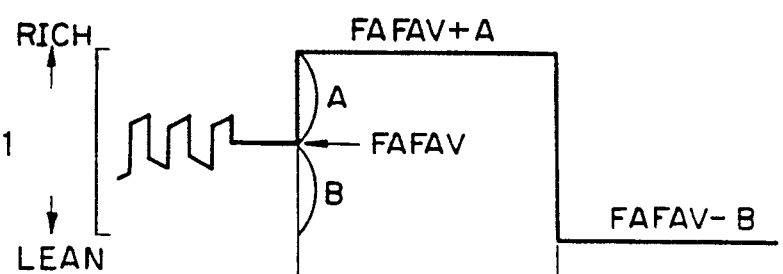
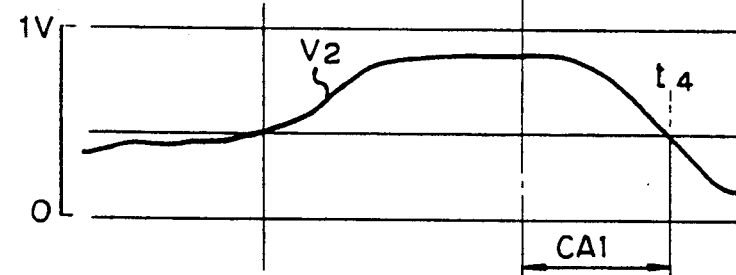
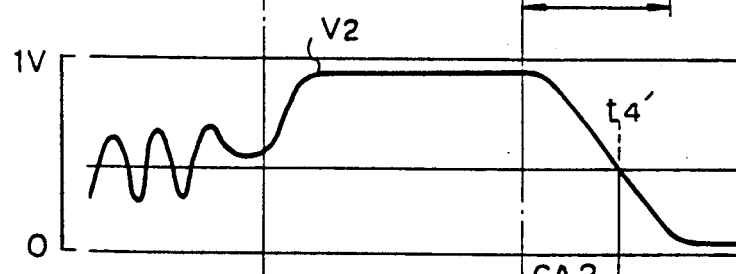
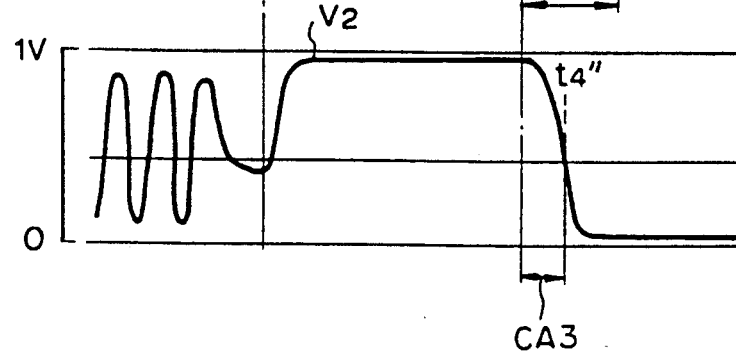

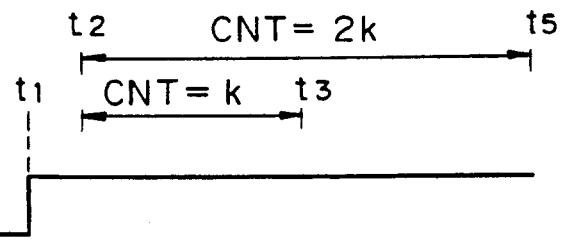
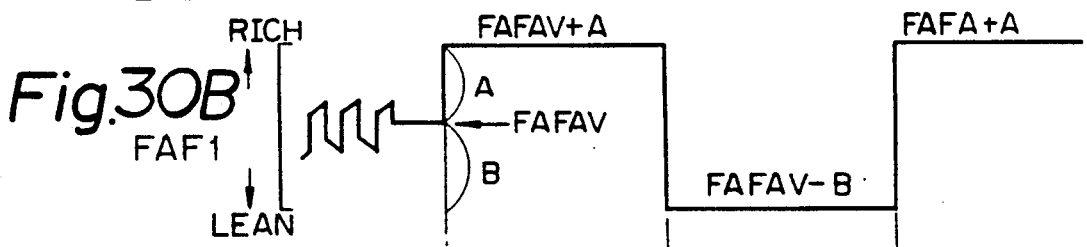
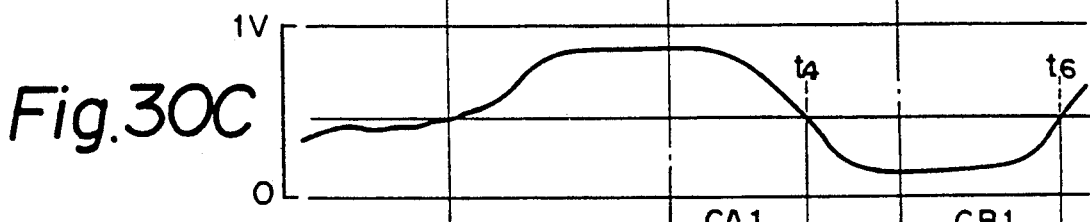
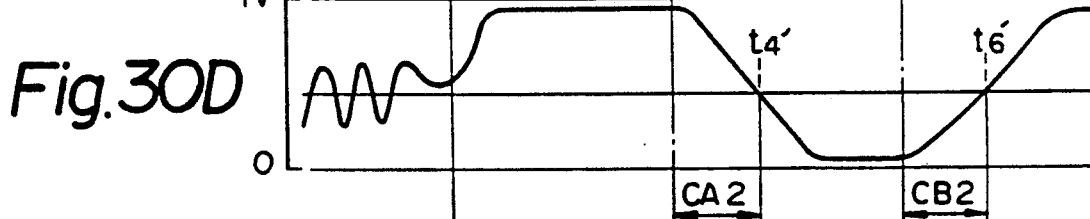
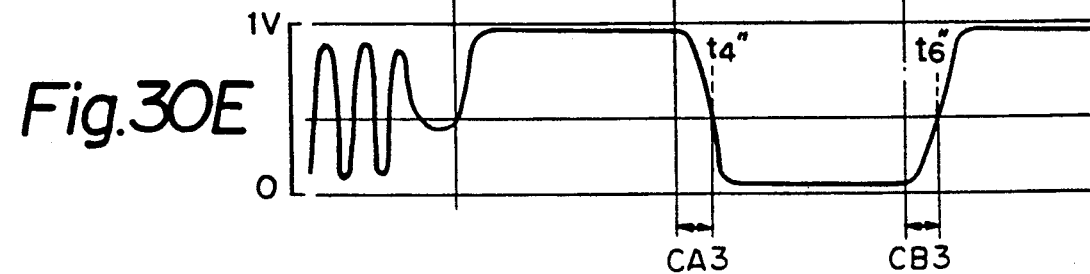

METHOD AND APPARATUS FOR DETERMINING DETERIORATION OF THREE-WAY CATALYSTS IN DOUBLE AIR-FUEL RATIO SENSOR SYSTEM

BACKGROUND OF THE INVENTION

1. Field of the Invention

The present invention relates to a method and apparatus for determining a state of deterioration of three-way reducing and oxidizing catalysts in a double air-fuel ratio sensor system having air-fuel ratio sensors upstream and downstream of the catalysts in an exhaust gas passage.

2. Description of the Related Art

Generally, in a feedback control of the air-fuel ratio sensor ($O_2$ sensor) system, a base fuel amount TAUP is calculated in accordance with the detected intake air amount and detected engine speed, and the base fuel amount TAUP is corrected by an air-fuel ratio correction coefficient FAF which is calculated in accordance with the output of an air-fuel ratio sensor (for example, an $O_2$ sensor) for detecting the concentration of a specific component such as the oxygen component in the exhaust gas. Thus an actual fuel amount is controlled in accordance with the corrected fuel amount. The above-mentioned process is repeated so that the air-fuel ratio of the engine is brought close to a stoichiometric air-fuel ratio.

According to this feedback control, the center of the controlled air-fuel ratio can be within a very small range of air-fuel ratios around the stoichiometric ratio required for three-way reducing and oxidizing catalysts (catalyst converter) which can remove three pollutants CO, HC, and $NO_x$ simultaneously from the exhaust gas.

In the above-mentioned $O_2$ sensor system where the $O_2$ sensor is disposed at a location near the concentration portion of an exhaust manifold, i.e., upstream of the catalyst converter, the accuracy of the controlled air-fuel ratio is affected by individual differences in the characteristics of the parts of the engine, such as the $O_2$ sensor, the fuel injection valves, the exhaust gas recirculation (EGR) valve, the valve lifters, individual changes due to the aging of these parts, environmental changes, and the like. That is, if the characteristics of the $O_2$ sensor fluctuate, or if the uniformity of the exhaust gas fluctuates, the accuracy of the air-fuel ratio feedback correction amount FAF is also fluctuated, thereby causing fluctuations in the controlled air-fuel ratio.

To compensate for the fluctuation of the controlled air-fuel ratio, double $O_2$ sensor systems have been suggested (see: U.S. Pat. No. 4,739,614). In a double $O_2$ sensor system, another $O_2$ sensor is provided downstream of the catalyst converter, and thus an air-fuel ratio control operation is carried out by the downstream $O_2$ sensor in addition to an air-fuel ratio control operation carried out by the upstream $O_2$ sensor. In the double $O_2$ sensor system, although the downstream $O_2$ sensor has lower response speed characteristics when compared with the upstream $O_2$ sensor, the downstream-side $O_2$ sensor has an advantage in that the output fluctuation characteristics are small when compared with those of the upstream $O_2$ sensor, for the following reasons.

(1) On the downstream side of the catalyst converter, the temperature of the exhaust gas is low, so that the downstream $O_2$ sensor is not affected by a high temperature exhaust gas.

(2) On the downstream side of the catalyst converter, although various kinds of pollutants are trapped in the catalyst converter, these pollutants have little affect on the downstream $O_2$ sensor.

(3) On the downstream side of the catalyst converter, the exhaust gas is mixed so that the concentration of oxygen in the exhaust gas is approximately in an equilibrium state.

Therefore, according to the double $O_2$ sensor system, the fluctuation of the output of the upstream-side $O_2$ sensor is compensated by a feedback control using the output of the downstream $O_2$ sensor. Actually, as illustrated in FIG. 1, in the worst case, the deterioration of the output characteristics of the $O_2$ sensor in a single $O_2$ sensor system directly effects deterioration in the emission characteristics. On the other hand, in a double $O_2$ sensor system, even when the output characteristics of the upstream-side $O_2$ sensor are deteriorated, the emission characteristics are not deteriorated. That is, in a double $O_2$ sensor system, even if only the output characteristics of the downstream $O_2$ are stable, good emission characteristics are still obtained.

Catalysts in a three-way catalyst converter suffer little deterioration if the catalysts are used only in a conventional state, but if leaded gasoline is erroneously introduced into the engine or a high-tension cord is broken or comes loose, to cause misfiring, the catalysts are greatly deteriorated.

In a single $O_2$ sensor system having an $O_2$ sensor upstream of the catalysts, even when the catalysts are deteriorated and the pollutant emissions increased, the air-fuel ratio feedback control by the upstream $O_2$ sensor per se is not affected by this deterioration of the catalysts. Conversely, in the above-mentioned double $O_2$ sensor system, when the catalysts are deteriorated, the air-fuel ratio feedback control is affected thereby; i.e., when the catalysts are deteriorated and unburned gas such as HC, CO, and $H_2$ components is allowed to pass therethrough, the output characteristics of the downstream $O_2$ sensor are also deteriorated and thus the air-fuel ratio feedback control by the downstream $O_2$ sensor is fluctuated, thereby reducing the emission characteristics, the fuel consumption characteristics, the drivability characteristics, and the like.

Therefore, particularly, in the double $O_2$ sensor system, it is very important to determine whether or not the catalysts are deteriorated.

In a prior art method of determining a deterioration of the catalysts, the period (frequency) of the output of the downstream $O_2$ sensor is compared with the period (frequency) of the output of the upstream $O_2$ sensor, and as a result, when the former is close to the latter, the catalysts are determined to have deteriorated (see: FIGS. 8A, 8B, 8C, 14, 15A, 15B, 15C, 15D, and 16 of U.S. Pat. No. 4,739,614). In another prior art method, a condition of a deterioration of the catalysts is obtained by determining whether or not the number of reversions of the output of the downstream $O_2$ sensor per unit time is larger than a predetermined number (see: Kokai (Unexamined Japanese Patent Publication No. 63-97852).

In the above-mentioned determination methods, however, the determination is carried out during an air-fuel ratio feedback control by the two $O_2$ sensors, the fluctuation of the output of the downstream $O_2$ sensor due to the air-fuel ratio feedback control is superimposed onto the fluctuation due to the deterioration thereof, and accordingly, it is difficult to extract only the fluctuation of the output of the downstream $O_2$ sensor due to the deterioration thereof. Also, when comparing the output period of the downstream $O_2$ sensor with that of the upstream $O_2$ sensor, since the former period is of the order of 1 min and the latter period is of the order of 1 s, it is possible to determined only a completely burned state, or a state close thereto, of the catalysts.

Note that, in a single $O_2$ sensor system, it is not possible to determine a state of deterioration of the catalysts per se.

SUMMARY OF THE INVENTION

An object of the present invention is to accurately determine a state of deterioration of a three-way catalyst in a double air-fuel ratio sensor ($O_2$ sensor) system.

According to the present invention, in a double air-fuel ratio sensor system having three-way catalysts, a full $O_2$ storage amount of the three-way catalysts is estimated, and is compared with a predetermined amount. When the estimated full $O_2$ storage amount is smaller than the predetermined amount, the three-way catalysts are determined to have deteriorated.

BRIEF DESCRIPTION OF THE DRAWINGS

The present invention will be more clearly understood from the description as set forth below with reference to the accompanying drawings, wherein:

FIGS. 4, 6, 7, 9, 10, 11, 12, 15, 18, 20A, 20B, 21, 22, 24, 25, 27, and 29 are flow charts showing the operation of the control circuit of FIG. 3;

FIGS. 13A through 13E, and 14A through 14E are timing diagrams explaining the flow chart of FIG. 12;

FIGS. 16A through 16G, and 17A through 17G are timing diagrams explaining the flow chart of FIG. 15;

FIGS. 19A through 19E are timing diagrams explaining the flow chart of FIG. 18;

FIGS. 26A through 26E are timing diagrams explaining the flow chart of FIG. 27;

FIGS. 30A through 30E are timing diagrams explaining the flow chart of FIG. 29.

DESCRIPTION OF THE PREFERRED EMBODIMENTS

Figure 1:
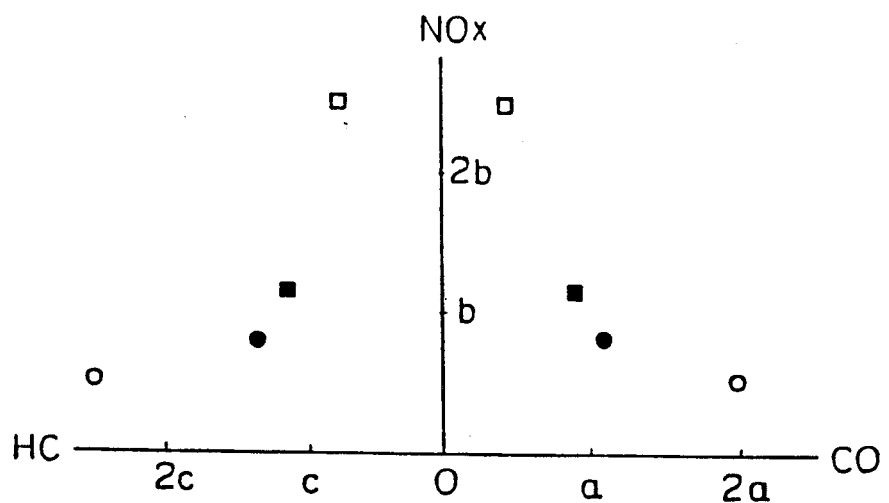
FIG. 1 is a graph showing the emission characteristics of a single $O_2$ sensor system and a double $O_2$ sensor system.
Figure 2:
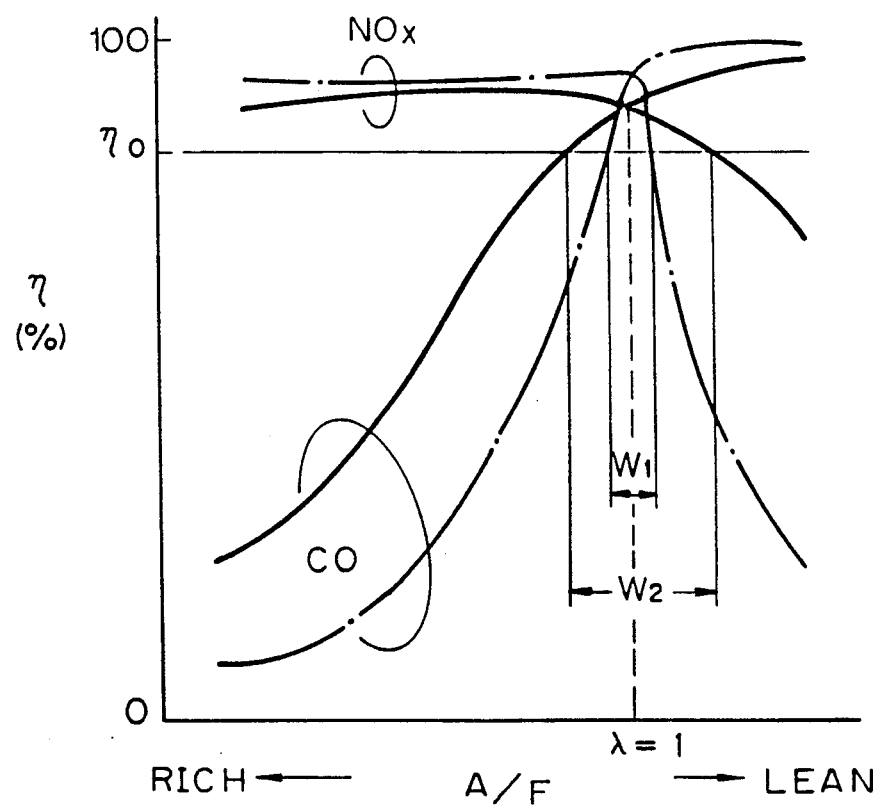
FIG. 2 is a graph showing the $O_2$ storage effect of three-way reducing and oxidizing catalysts.

First, the $O_2$ storage effect of a three-way reducing and oxidizing catalyst converter will be explained with reference to FIG. 2. As indicated by dot-solid lines in FIG. 2, the purifying rate $\eta$ for the NO component is large on the rich side with respect to the stoichiometric ratio ($\lambda = 1$), and the purifying rate $\eta$ for the CO component (or HC component) is large on the lean side with respect to the stoichiometric ratio ($\lambda = 1$). Note that the purifying rate $\eta$ for the HC component has the same tendency as the purifying rate $\eta$ for the CO component.

Therefore, if $\eta_0$ is a required purifying rate, the controllable window of the air-fuel ratio is very narrow ($W = W_2$), and therefore, the feedback control for the stoichiometric ratio should be carried out essentially within this range $W_1$. Nevertheless, in the three-way reducing and oxidizing catalysts, when a lean air-fuel ratio atmosphere prevails, $O_2$ is absorbed therein, and when a rich air-fuel ratio atmosphere prevails, HC and CO are absorbed therein, and are reacted with the absorbed $O_2$. This is an $O_2$ storage effect. An air-fuel feedback control operation provides an optimum frequency and amplitude of the air-fuel ratio, thereby making positive use of such an $O_2$ storage effect. Therefore, due to the air-fuel feedback control, as indicated by solid lines in FIG. 2, the purifying rate $\eta$ is improved and the controllable air-fuel ratio window is substantially broad ($W = W_2$). Nevertheless, when the three-way catalyst of the converter is deteriorated, the controllable air-fuel ratio window $W_2$ becomes low, and thus the HC, CO, and $NO_x$ emissions are increased.

Figure 3:
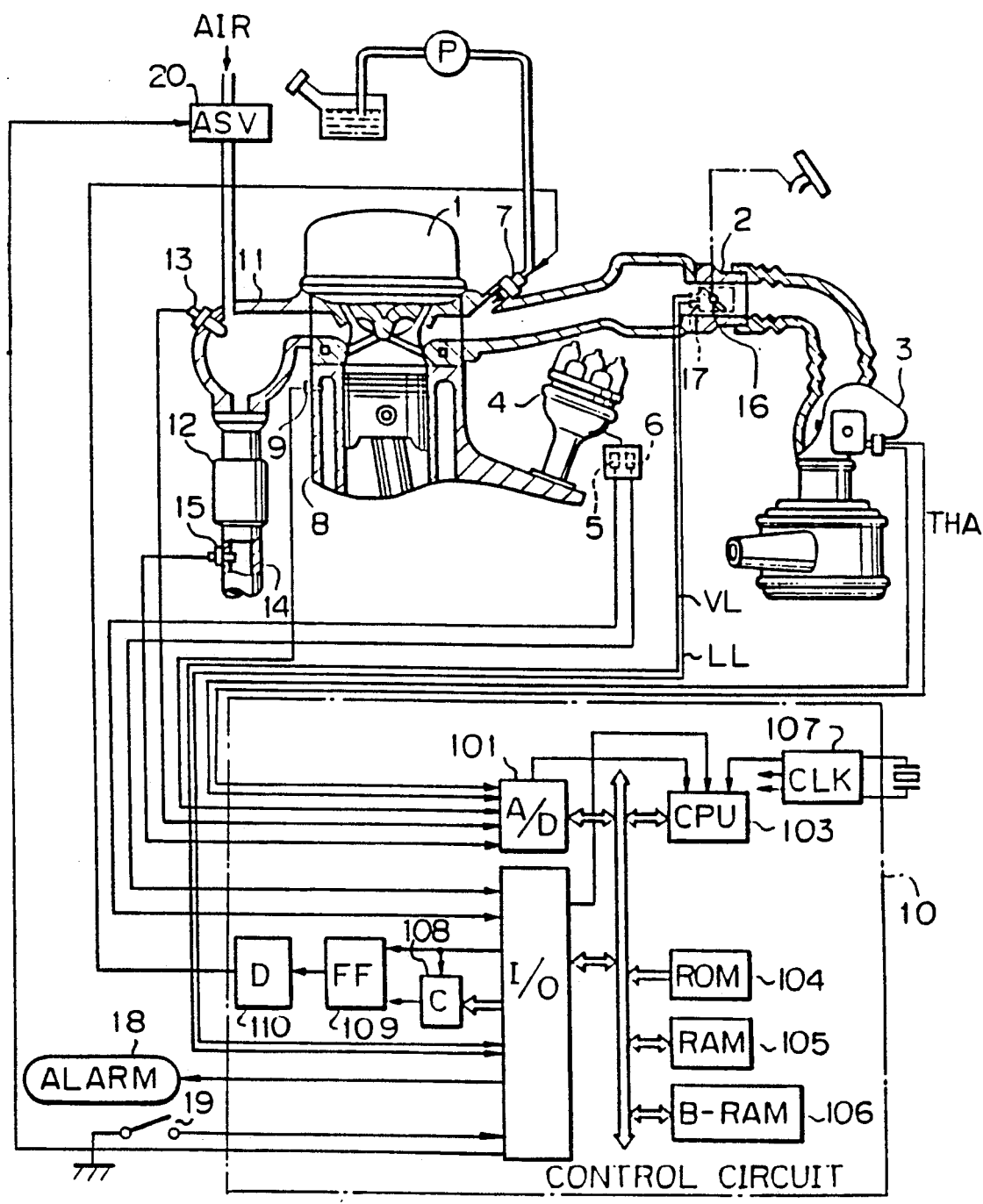
FIG. 3 is a schematic view of an internal combustion engine according to the present invention.

In FIG. 3, which illustrates an internal combustion engine according to the present invention, reference numeral 1 designates a four-cycle spark ignition engine disposed in an automotive vehicle. Provided in an air-intake passage 2 of the engine 1 is a potentiometer-type airflow meter 3 for detecting the amount of air drawn into the engine 1 to generate an analog voltage signal in proportion to the amount of air flowing therethrough. The signal of the airflow meter 3 is transmitted to a multiplexer-incorporating analog-to-digital (A/D) converter 101 of a control circuit 10. Also, the airflow meter 3 incorporates an intake air temperature sensor which generates an analog voltage signal in accordance with the temperature THA of the intake air. This signal is also supplied to the A/D converter 101 of the control circuit 10.

Disposed in a distributor 4 are crank angle sensors 5 and 6 for detecting the angle of the crank-shaft (not shown) of the engine 1.

In this case, the crank angle sensor 5 generates a pulse signal at every 720° crank angle (CA) and the crank-angle sensor 6 generates a pulse signal at every 30° CA. The pulse signals of the crank angle sensors 5 and 6 are supplied to an input/output (I/O) interface 102 of the control circuit 10. In addition, the pulse signal of the crank angle sensor 6 is then supplied to an interruption terminal of a central processing unit (CPU) 103.

Additionally provided in the air-intake passage 2 is a fuel injection valve 7 for supplying pressurized fuel from the fuel system to the air-intake port of the cylinder of the engine 1. In this case, other fuel injection valves are also provided for other cylinders, but are not shown in FIG. 3.

Disposed in a cylinder block 8 of the engine 1 is a coolant temperature sensor 9 for detecting the temperature of the coolant. The coolant temperature sensor 9 generates an analog voltage signal in response to the temperature THW of the coolant and transmits that signal to the A/D converter 101 of the control circuit 10.

Provided in an exhaust system on the downstream-side of an exhaust manifold 11 is a three-way reducing and oxidizing catalyst converter 12 which removes three pollutants CO, HC, and $NO_x$ simultaneously from the exhaust gas.

Provided on the concentration portion of the exhaust manifold 11, i.e., upstream of the catalyst converter 12, is a first $O_2$ sensor 13 for detecting the concentration of oxygen composition in the exhaust gas. Further, provided in an exhaust pipe 14 downstream of the catalyst converter 12 is a second O₂ sensor 15 for detecting the concentration of oxygen composition in the exhaust gas. The O₂ sensors 13 and 15 generate output voltage signals and transmit those signals via pull-up type input circuits 111 and 112, respectively, to the A/D converter 101 of the control circuit 10.

Reference 16 designates a throttle valve, and 17 designates an throttle sensor which incorporates an idle switch for detecting when the throttle valve 16 is fully closed, and a full switch for detecting whether or not the opening of the throttle valve 16 is larger than a predetermined value, such as 70°. The output LL of the idle switch and the output VL of the full switch are supplied to the I/O interface 102 of the control circuit 10.

Reference 18 designates an alarm which is activated when the three-way catalyst converter 12 is deteriorated.

Reference 19 designates a diagnosis terminal, called a T terminal. When the T terminal 19 is turned ON by an operator, the alarm 18 is turned ON and OFF a predetermined number of times in accordance with the result of the diagnosis of the engine 1.

Reference 20 designates an air suction valve of a secondary air supply system. When the engine is in a deceleration state or an idling state, the air suction valve 20 is opened to introduce secondary air into the exhaust manifold 11, thus reducing the HC and CO emissions. Also, when the coolant temperature THW is low, the air suction valve 20 is closed to stop the introduction of secondary air into the exhaust manifold 11, thereby preventing overheating of the exhaust system. The air suction valve 20 is controlled, via a vacuum switch valve (not shown), by the control circuit 10 using the data of the engine speed $N_e$, the vehicle speed, the idle switch, the coolant temperature, and the like.

The control circuit 10, which may be constructed by a microcomputer, further comprises a central processing unit (CPU) 103, a read-only memory (ROM) 104 for storing a main routine and interrupt routines such as a fuel injection routine, an ignition timing routine, tables (maps), constants, etc., a random access memory 105 (RAM) for storing temporary data, a backup RAM 106, a clock generator 107 for generating various clock signals, a down counter 108, a flip-flop 109, a driver circuit 110, and the like.

Note that the battery (not shown) is connected directly to the backup RAM 106 and, therefore, the content thereof is not erased even when the ignition switch (not shown) is turned OFF.

The down counter 108, the flip-flop 109, and the driver circuit 110 are used for controlling the fuel injection valve 7. That is, when a fuel injection amount TAU is calculated in a TAU routine, which will be later explained, the amount TAU is preset in the down counter 108, and simultaneously, the flip-flop 109 is set. As a result, the driver circuit 110 initiates the activation of the fuel injection valve 7. On the other hand, the down counter 108 counts up the clock signal from the clock generator 107, and finally generates a logic "1" signal from the borrow-out terminal of the down counter 108, to reset the flip-flop 109, so that the driver circuit 110 stops the activation of the fuel injection valve 7. Thus, the amount of fuel corresponding to the fuel injection amount TAU is injected into the fuel injection valve 7.

Interruptions occur at the CPU 103 when the A/D converter 101 completes an A/D conversion and generates an interrupt signal; when the crank angle sensor 6 generates a pulse signal; and when the clock generator 107 generates a special clock signal.

The intake air amount data Q of the airflow meter 3 and the coolant temperature data THW of the coolant sensor 9 are fetched by an A/D conversion routine(s) executed at predetermined intervals, and then stored in the RAM 105. That is, the data Q and THW in the RAM 105 are renewed at predetermined intervals. The engine speed $N_e$ is calculated by an interrupt routine executed at 30° CA, i.e., at every pulse signal of the crank angle sensor 6, and is then stored in the RAM 105.

Figure 4A:
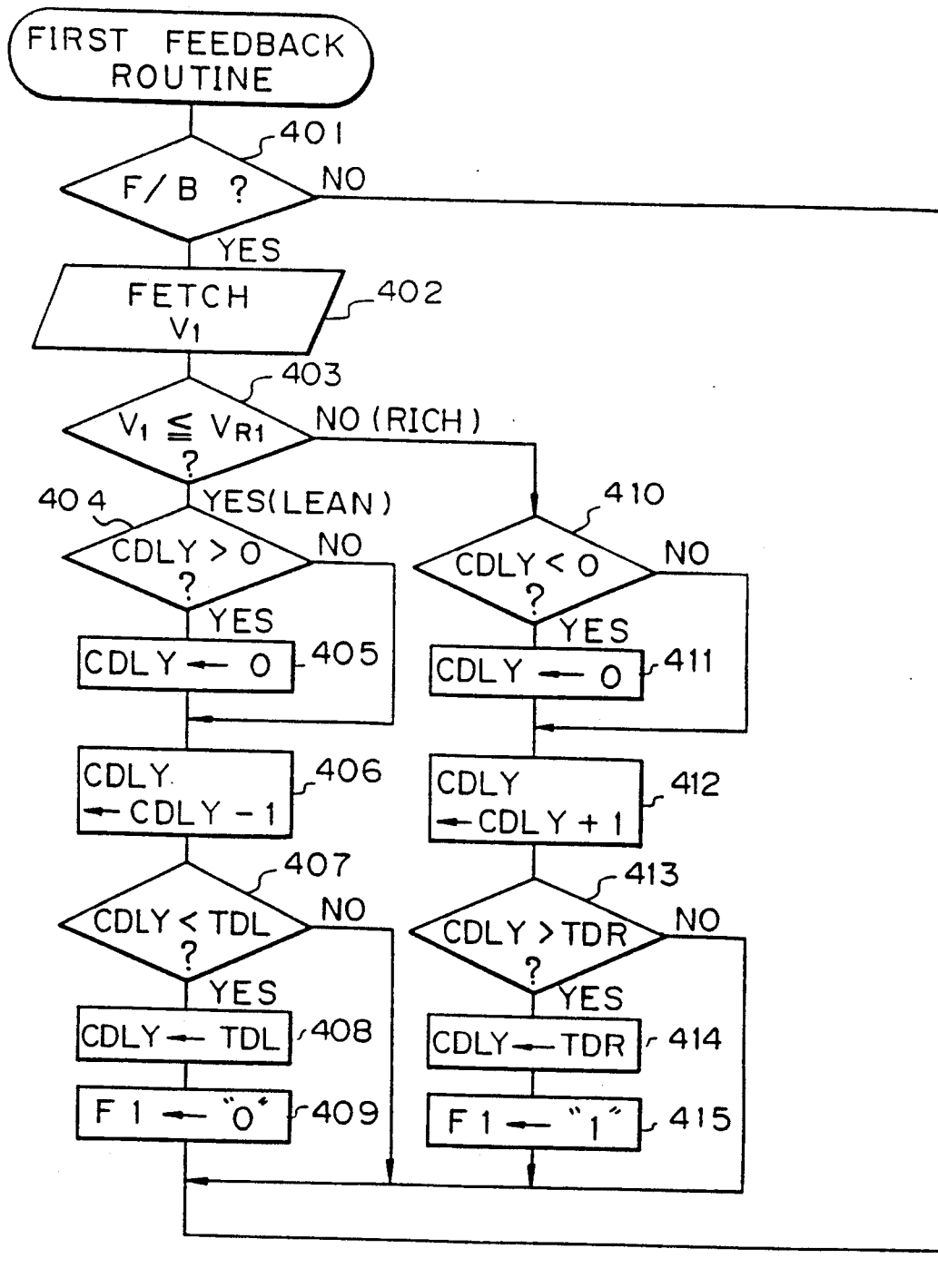
Figure 4B:
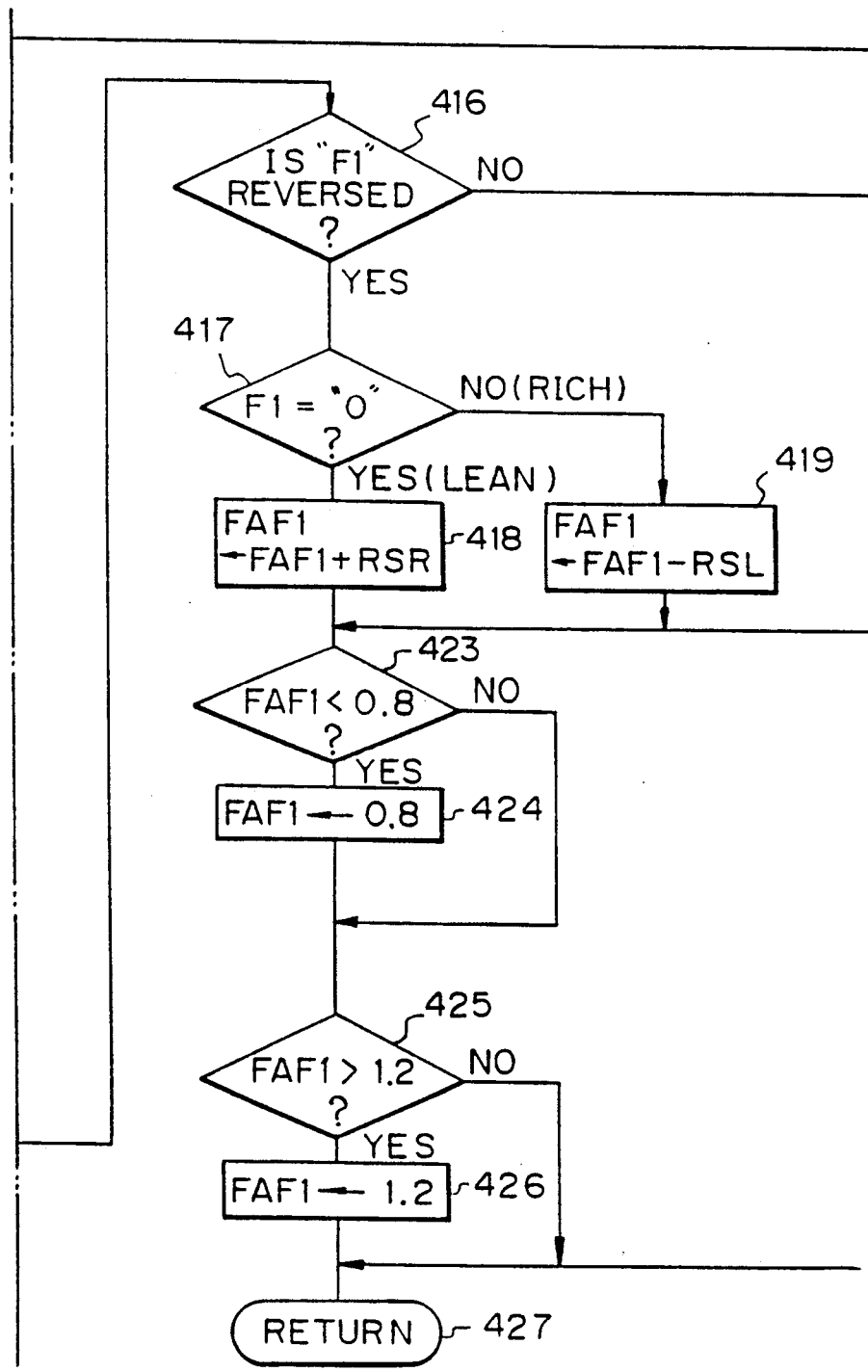
Figure 4C:
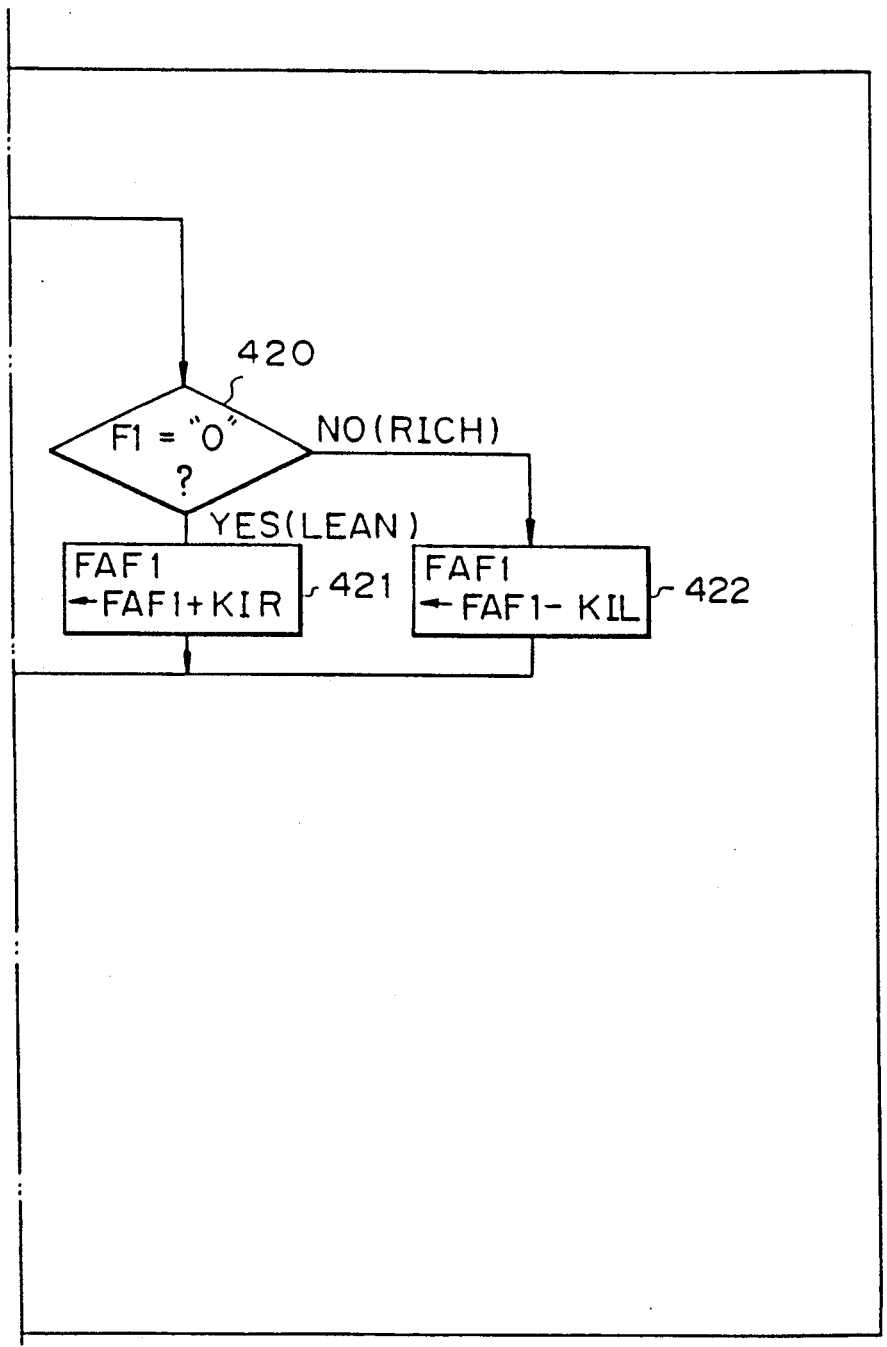

FIG. 4 is a routine for calculating a first air-fuel ratio feedback correction amount FAF1 in accordance with the output of the upstream O₂ sensor 13 executed at a predetermined time such as 4 ms.

At step 401, it is determined whether or not all of the feedback control (closed-loop control) conditions by the upstream O₂ sensor 13 are satisfied. The feedback control conditions are as follows.

i) the engine is not in a fuel cut-off state (XFC="0");
ii) the engine is not in a starting state;
iii) the coolant temperature THW is higher than 50° C.
iv) the power fuel incremental amount FPOWER is 0; and
v) the upstream O₂ sensor 13 is in an activated state Note that the determination of activation/nonactivation of the upstream O₂ sensor 13 is carried out by determining whether or not the coolant temperature THW≧70° C., or by whether or not the output voltage $V_1$ of the upstream O₂ sensor 13 is lower than a predetermined value. Of course, other feedback control conditions are introduced as occasion demands, but an explanation of such other feedback control conditions is omitted.

If one or more of the feedback control conditions is not satisfied, the control proceeds to step 427, to thereby carry out an open-loop control operation. Note that, in this case, the amount FAF1 can be a value or a mean value immediately before the open-loop control operation. That is, the amount FAF1 or a mean value FAF1 thereof is stored in the backup RAM 106, and in an open-loop control operation, the value FAF1 and FAF1 is read out of the backup RAM 106. Note that the amount FAF1 can be 1.0.

Contrary to the above, at step 401, if all of the feedback control conditions are satisfied, the control proceeds to step 402.

At step 402, an A/D conversion is performed upon the output voltage $V_1$ of the upstream O₂ sensor 13, and the A/D converted value thereof is then fetched from the A/D converter 101. Then at step 403, the voltage $V_1$ is compared with a reference voltage $V_{R1}$ such as 0.45 V, thereby determining whether the current air-fuel ratio detected by the upstream O₂ sensor 13 is on the rich side or on the lean side with respect to the stoichiometric air-fuel ratio.

If $V_1 \leq V_{R1}$, which means that the current air-fuel ratio is lean, the control proceeds to step 404, which determines whether or not the value of a delay counter CDLY is positive. If CDLY>0, the control proceeds to step 405, which clears the delay counter CDLY, and then proceeds to step 406. If CDLY≦0, the control proceeds directly to step 406. At step 406, the delay counter CDLY is counted down by 1, and at step 407, it is determined whether or not CDLY<TDL. Note that TDL is a lean delay time period for which a rich state is maintained even after the output of the upstream $O_2$ sensor 13 is changed from the rich side to the lean side, and is defined by a negative value. Therefore, at step 407, only when CDLY<TDL does the control proceed to step 408, which causes CDLY to be TDL, and then to step 408, which causes a first air-fuel ratio flag F1 to be "0" (lean state). On the other hand, if $V_1 > V_{R1}$, which means that the current air-fuel ratio is rich, the control proceeds to step 410, which determines whether or not the value of the delay counter CDLY is negative. If CDLY>0, the control proceeds to step 411, which clears the delay counter CDLY, and then proceeds to step 412. If CDLY≧0, the control directly proceeds to 412. At step 412, the delay counter CDLY is counted up by 1, and at step 413, it is determined whether or not CDLY>TDR Note that TDR is a rich delay time period for which a lean state is maintained even after the output of the upstream $O_2$ sensor 13 is changed from the lean side to the rich side, and is defined by a positive value. Therefore, at step 413, only when CDLY>TDR does the control proceed to step 414, which causes CDLY to be TDR, and then to step 415, which causes the first air-fuel ratio flag F1 to be "1" (rich state).

Next, at step 416, it is determined whether or not the first air-fuel ratio flag F1 is reversed, i.e., whether or not the delayed air-fuel ratio detected by the upstream $O_2$ sensor 13 is reversed. If the first air-fuel ratio flag F1 is reversed, the control proceeds to steps 417 to 419, which carry out a skip operation.

At step 417, if the flag F1 is "0" (lean), the control proceeds to step 418, which remarkably increases the correction amount FAF1 by a skip amount RSR. Also, if the flag F1 is "1" (rich) at step 417, the control proceeds to step 419, which remarkably decreases the correction amount FAF1 by a skip amount RSL.

On the other hand, if the first air-fuel ratio flag F1 is not reversed at step 416, the control proceeds to steps 420 to 422, which carries out an integration operation. That is, if the flag F1 is "0" (lean) at step 420, the control proceeds to step 421, which gradually increases the correction amount FAFI by a rich integration amount KIR. Also, if the flag F1 is "1" (rich) at step 420, the control proceeds to step which gradually decreases the correction amount FAF1 by a lean integration amount KIL.

The correction amount FAF1 is guarded by a minimum value 0.8 at steps 423 and 424. Also, the correction amount FAF1 is guarded by a maximum value 1.2 at steps 425 and 426. Thus, the controlled air-fuel ratio is prevented from becoming overlean or overrich.

The correction amount FAF1 is then stored in the RAM 105, thus completing this routine of FIG. 4 at steps 428.

Figure 5:
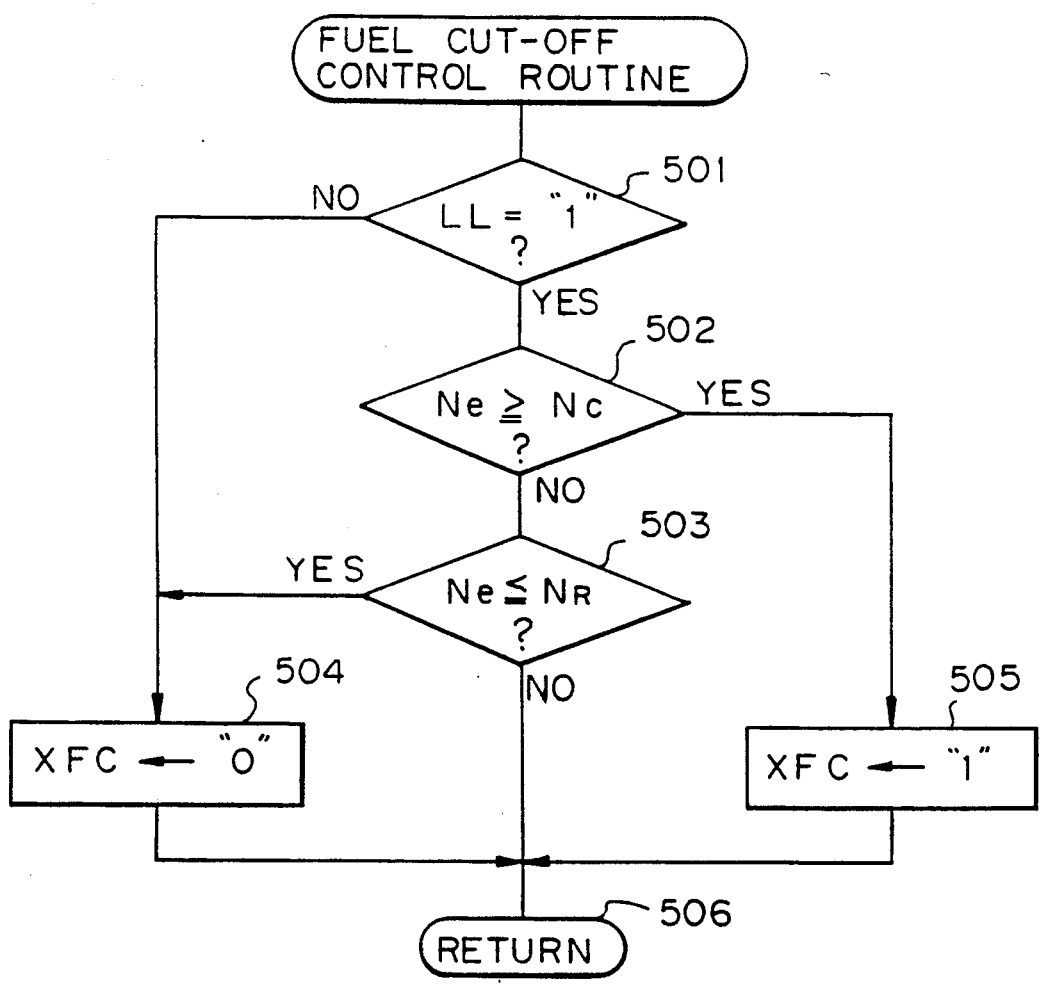
FIGS. 5A through 5D are timing diagrams explaining the flow chart of FIG. 4.
Figure 6:
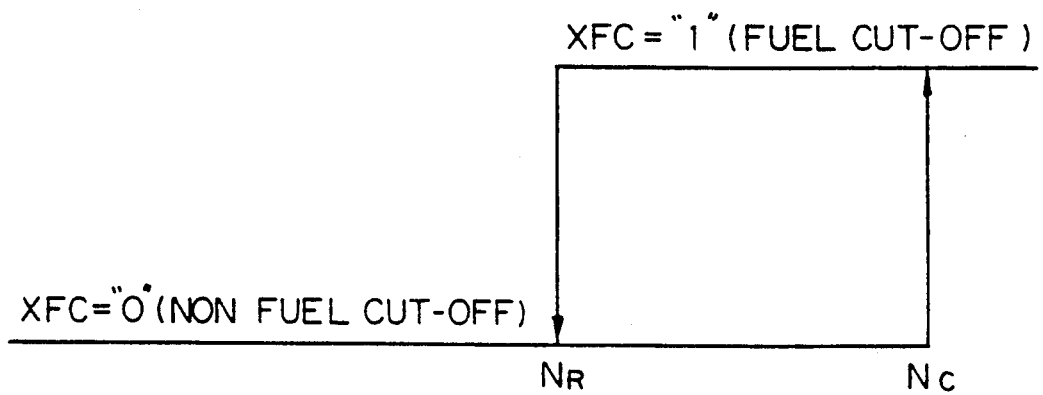

The fuel cut-off flag XFC at step 401 is calculated by a routine of FIG. 5 carried out at predetermined time such as 4 ms. The fuel cut-off flag XFC is set as illustrated in FIG. 6 in which $N_c$ and $N_R$ are a fuel cut-off engine speed and a fuel cut-off recovery engine speed, respectively, dependent upon the coolant temperature THW. AT step 501, it is determined whether or not the engine is in an idling state (LL="1"). If the engine is not in the idling state, the control proceeds to step 504 which resets the flag XFC. If the engine is in the idling state, the control proceeds to steps 502 and 503. At step 502, the engine speed $N_e$ is read out of the RAM 105, and this engine speed $N_e$ is compared with the fuel cut-off engine speed $N_e$. Also, at step 503, the engine speed $N_e$ is compared with the fuel cut-off recovery engine speed $N_R$. As a result, when $N_e \leq N_R$, the control proceeds to step 504 which resets the flag XFC, and when $N_e \geq N_c$, the control proceeds to step 505 which sets the flag XFC. Otherwise, the control proceeds directly to step 506 so that the flag XFC is unchanged.

The operation by the flow chart of FIG. 4 will be further explained with reference to FIGS. 7A through 7D. As illustrated in FIG. 7A, when the air-fuel ratio A/F is obtained by the output $V_1$ of the upstream $O_2$ sensor 13, the delay counter CDLY is counted up during a rich state, and is counted down during a lean state, as illustrated in FIG. 7B. As a result, a delayed air-fuel ratio corresponding to the first air-fuel ratio flag F1 is obtained as illustrated in FIG. 7C. For example, at time $t_1$, even when the air-fuel ratio A/F is changed from the lean side to the rich side, the delayed air-fuel ratio A/F' (F1) is changed at time $t_2$ after the rich delay time period TDR. Similarly at time $t_3$, even when the air-fuel ratio A/F is changed from the rich side to the lean side, the delayed air-fuel ratio F1' is changed at time $T_4$ after the lean delay time period TDL. However, at time $t_5$, $t_6$, or $t_7$, when the air-fuel ratio A/F is reversed within a shorter time than the rich delay time TDR or the lean delay time TDL, the delay air-fuel ratio A/F' is reversed at time $t_8$. That is, the delayed air-fuel ratio A/F' is stable when compared with the air-fuel ratio A/F. Further, as illustrated in FIG. 7D, at every change of the delayed air-fuel ratio A/F' from the rich side to the lean side, or vice versa, the correction amount FAF1 is skipped by the skip amount RSR or RSL, and in addition, the correction amount FAF1 is gradually increased or decreased in accordance with the delayed air-fuel ratio A/F'.

Air-fuel ratio feedback control operations by the downstream $O_2$ sensor 15 will be explained. There are two types of air-fuel ratio feedback control operations by the downstream $O_2$ sensor 15, i.e., the operation type in which a second air-fuel ratio correction amount FAF2 is introduced thereinto by which an air-fuel ratio feedback control parameter in the air-fuel ratio feedback control operation by the upstream $O_2$ sensor 13 is variable. Further, as the air-fuel ratio feedback control parameter, there are nominated a delay time TD (in more detail, the rich delay time TDR and the lean delay time TDL), a skip amount RS (in more detail, the rich skip amount RSL, and the lean skip amount RSL), an integration amount KI (in more detail, the rich integration amount KIR and the lean integration amount KIL), an the reference voltage $V_{R1}$.

For example, if the rich skip amount RSR is increased or if the lean skip amount RSL is decreased, the controlled air-fuel ratio becomes richer, and if the lean skip amount RSL is increased or if the rich skip amount RSR is decreased, the controlled air-fuel ratio becomes leaner. Thus, the air-fuel ratio can be controlled by changing the rich skip amount RSR and the lean skip amount RSL in accordance with the output of the downstream $O_2$ sensor. Also, if the rich integration amount KIR is increased or if the lean integration amount KIL is decreased, the controlled air-fuel ratio becomes richer, and if the lean integration amount KIL is increased or if the rich integration amount KIR is decreased, the controlled air-fuel ratio becomes leaner. Thus, the air-fuel ratio can be controlled by changing the rich integration amount KIR and the lean integration amount KIL in accordance with the output of the downstream $O_2$ sensor 15. Further, if the rich delay time TDR becomes longer or if the lean delay time TDL becomes shorter, the controlled air-fuel becomes rich, and if the lean delay time TDL becomes longer or if the rich delay time TDL becomes shorter, the controlled air-fuel ratio becomes leaner. Thus, the air-fuel ratio can be controlled by changing the rich delay time TDR and the lean delay time (-TDL) in accordance with the output of the downstream $O_2$ sensor 15. Still further, if the reference voltage $V_{R1}$ is increased, the controlled air-fuel ratio becomes richer, and if the reference voltage $V_{R1}$ is decreased, the controlled air-fuel ratio becomes leaner. Thus, the air-fuel ratio can be controlled by changing the reference voltage $V_{R1}$ in accordance with the output of the downstream $O_2$ sensor 15.

There are various merits in the control of the air-fuel ratio feedback control parameters by the output $V_2$ of the downstream $O_2$ sensor 15. For example, when the delay times TDR are TDL and controlled by the output $V_2$ of the downstream $O_2$ sensor 15, it is possible to precisely control the air-fuel ratio. Also, when the skip amounts RSR and RSL are controlled by the output $V_2$ of the downstream $O_2$ sensor 15, it is possible to improve the response speed of the air-fuel ratio feedback control by the output $V_2$ of the downstream $O_2$ sensor 15. Of course, it is possible to simultaneously control two or more kinds of the air-fuel ratio feedback control parameters by the output $V_2$ of the downstream $O_2$ sensor 15.

A double $O_2$ sensor system into which a second air-fuel ratio correction amount FAF2 is introduced will be explained with reference to FIGS. 8 and 9.

Figure 8B:
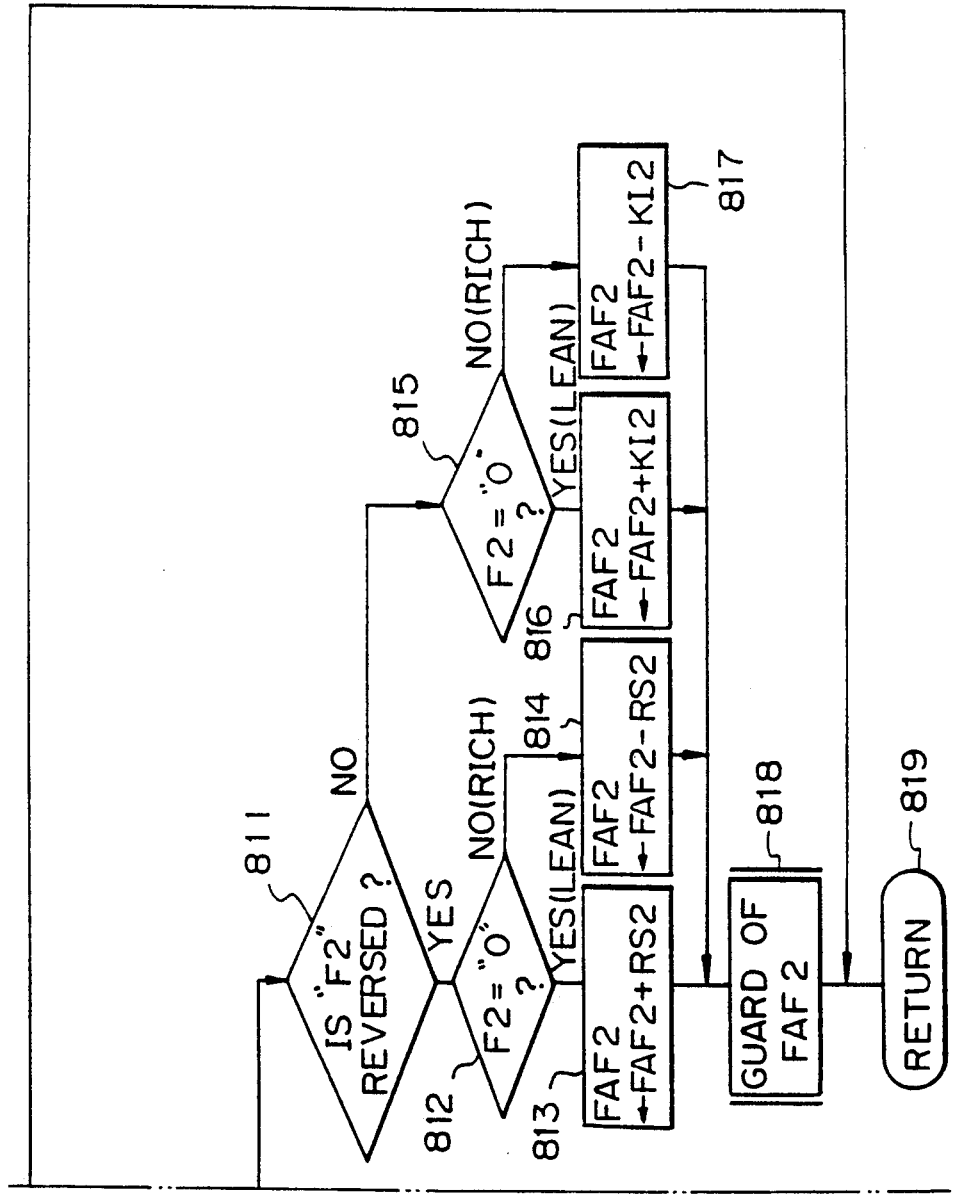
FIG. 8 is a graph showing the flag XFC of FIG. 7.

FIG. 8 is a routine for calculating a second air-fuel ratio feedback correction amount FAF2 in accordance with the output of the downstream $O_2$ sensor 15 executed at a predetermined time such as 1 s.

At steps 801 through 806, it is determined whether or not all of the feedback control (closed-loop control) conditions by the downstream $O_2$ sensor 15 are satisfied. For example, at step 801, it is determined whether or not the feedback control conditions by the upstream $O_2$ sensor 13 are satisfied. At step 802, it is determined whether or not the coolant temperature THW is higher than 70° C. At step 803, it is determined whether or not the throttle valve 16 is open (LL="0"). At step 604, it is determined whether or not the secondary air suction is carried out, i.e., the air suction valve 20 is opened in accordance with the engine speed $N_e$, the vehicle speed, the idle switch, the coolant temperature, and the like. At step 805, it is determined whether or not a load parameter such as $Q/N_e$ is larger than a predetermined value $X_0$. At step 806, it is determined whether or not the downstream $O_2$ sensor 15 is active. Note, the determination of an activation/nonactivation of the downstream air-fuel ratio sensor 15 is carried out on the same way as for the upstream $O_2$ sensor 13. Of course, other feedback control conditions are introduced as occasion demands.

If one or more of the feedback control conditions is not satisfied, the control directly proceeds to step 819, thereby carrying out an open-loop control operation. Note that, in this case, the amount FAF2 or a mean value FAF2 thereof is stored in the backup RAM 106, and in an open-loop control operation, the value FAF2 or FAF2 is read out of the backup RAM 106.

Contrary to the above, if all of the feedback control conditions are satisfied, the control proceeds to step 807.

At step 807, an A/D conversion is performed upon the output voltage $V_2$ of the downstream $O_2$ sensor 15 and the A/D converted value thereof is fetched from the A/D converter 101. At step 808, the voltage $V_2$ is compared with a reference voltage $V_{R2}$ such as 0.55 V, thereby determining whether the current air-fuel ratio detected by the downstream $O_2$ sensor 15 is on the rich side or on the lean side with respect to the stoichiometric air-fuel ratio. Note that the reference volta $V_{R2}$ (=0.55) is preferably higher than the reference voltage $V_{R1}$ (=0.45 V), in consideration of the different in output characteristics and deterioration speed between the $O_2$ sensor 13 upstream of the catalyst converter 12 and the $O_2$ sensor 15 downstream of the catalyst converter 12. However, the voltage $V_{R2}$ can be voluntarily determined.

At step 808, if the air-fuel ratio downstream of the catalyst converter 12 is lean, the control proceeds to step 809 which resets a second air-fuel ratio flag F2. Alternatively, the control proceeds to the step 810, which sets the second air-fuel ratio flag F2.

Next, at step 811, it is determined whether or not the second air-fuel ratio flag F2 is reversed. If the second air-fuel ratio flag F2 is reversed, the control proceeds to steps 812 to 814 which carry out a skip operation. That is, if the flag F2 is "0" (lean) at step 812, the control proceeds to step 813, which remarkably increases the second correction amount FAF2 by a skip amount RS2. Also, if the flag F2 is "1" (rich) at step 812, the control proceeds to step 814, which remarkably decreases the second correction amount FAF2 by the skip amount RS2. On the other hand, if the second air-fuel ratio flag F2 is not reversed at step 811, the control proceeds to steps 815 to 817, which carry out an integration operation. That is, if the flag F2 is "0" (lean) at Step 815, the control proceeds to step 816, which gradually increases the second correction amount FAF2 by an integration amount KI2. Also, if the flag F2 is "1" (rich) at step 815, the control proceeds to step 817, which decreases the second correction amount FAF2 by the integration amount KI2.

Note that the skip amount RS2 is larger than the integration amount KI2.

At step 818, the second correction amount FAF2 is guarded by a minimum value 0.8, and by a maximum value 1.2, thereby also preventing the controlled air-fuel ratio from becoming overrich or overlean.

The routine of FIG. 8 is then completed by step 819.

Figure 9:
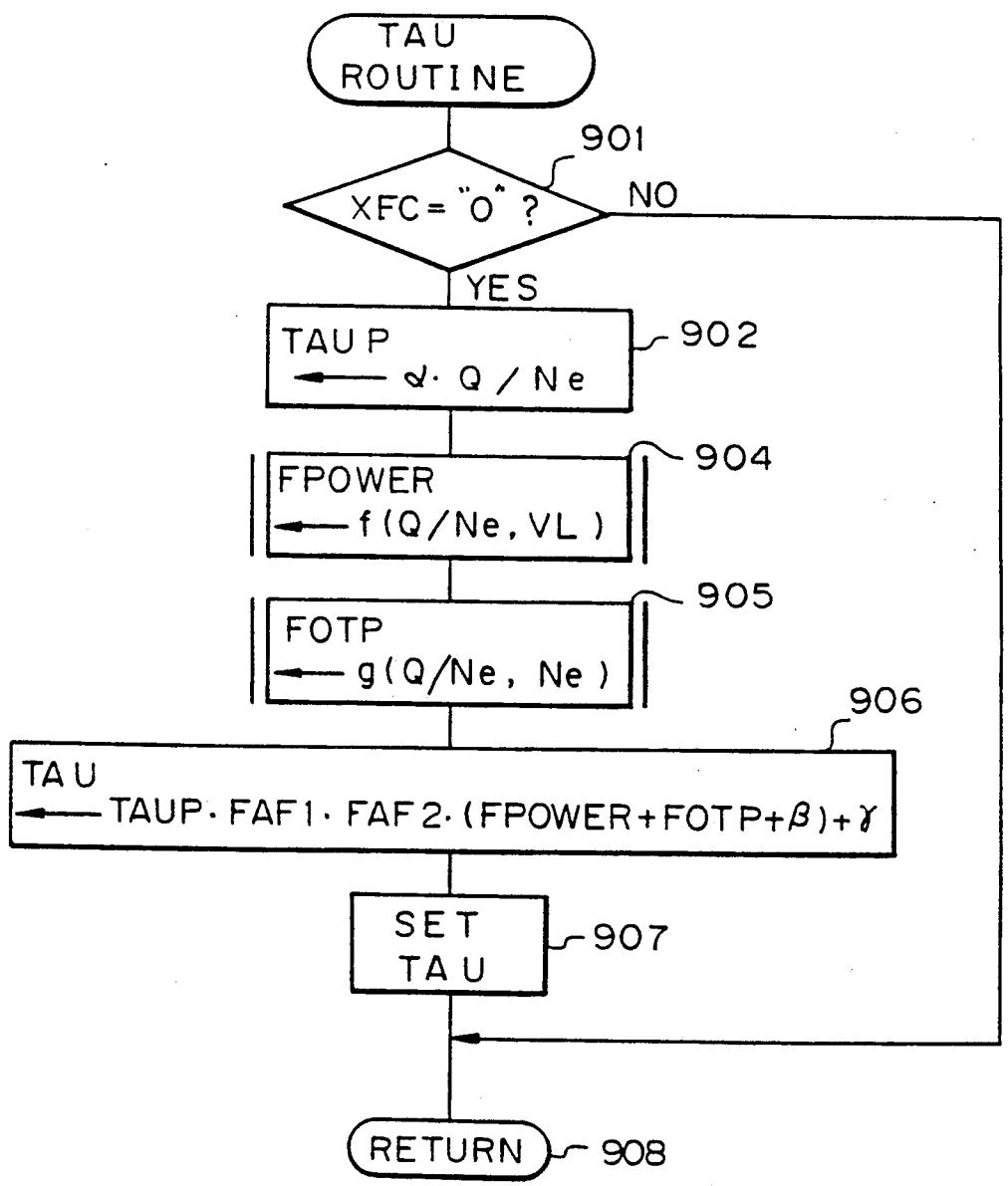

FIG. 9 is a routine for calculating a fuel injection amount TAU executed at every predetermined crank angle such as 360° CA. At step 901, it is determined whether or not the fuel cut-off flag XFC is "0". As a result, if the flag XFC is "1", the control proceeds directly to step 908, and a fuel injection is not carried out. Conversely, if the flag XFC is "1", the control proceeds to steps 902 to 907.

At step 902, a base fuel injection amount TAUP is calculated by using the intake air amount data Q and the engine speed data $N_e$ stored in the RAM 105. That is, TAUP←$\alpha \cdot Q/N_e$ where $\alpha$ is a constant. At step 904, a power fuel incremental amount FPOWER is calculated in accordance with the load parameter $Q/N_e$ and the output VL of the full switch of the throttle sensor 17. For example,

| STATE | Q/N_e | VL | FPOWER |
|---|---|---|---|
| I | small | "0" | 0 |
| II | large | "0" | FPOWER 1 |
| III | small | "1" | FPOWER 1 |
| IV | large | "1" | FPOWER 2 | where 0<FPOWER 1<FPOWER 2. This fuel incremental amount FPOWER is used to increase the output of the engine 1 in a high load state. At step 905, an over temperature preventing fuel incremental amount FOTP is calculated from a two-dimensional map, using the load parameter $Q/N_e$ and the engine speed $N_e$. This fuel incremental amount FOTP is used to prevent overheating of the catalyst converter 12, the exhaust pipe 14, and the like in a high load state. At step 906, a final fuel injection amount TAU is calculated by

TAU←TAUP·FAF1·FAF2·(FPOWER+FOTP+β)+γ where β and γ are correction factors determined by other parameters such as the voltage of the battery and the temperature of the intake air. At step 907, the final fuel injection amount TAU is set in the down counter 107, and in addition, the flip-flop 108 is set to initiate the activation of the fuel injection valve 7. This routine is completed by step 908. Note that, as explained above, when a time corresponding to the amount TAU has passed, the flip-flop 109 is reset by the borrow-out signal of the down counter 108 to stop the activation of the fuel injection valve 7.

A double $O_2$ sensor system, in which an air-fuel ratio feedback control parameter of the first air-fuel ratio feedback control by the upstream $O_2$ sensor is variable, will be explained with reference to FIGS. 10 and 11. In this case, the skip amounts RSR and RSL as the air-fuel ratio feedback control parameters are variable.

Figure 10B:
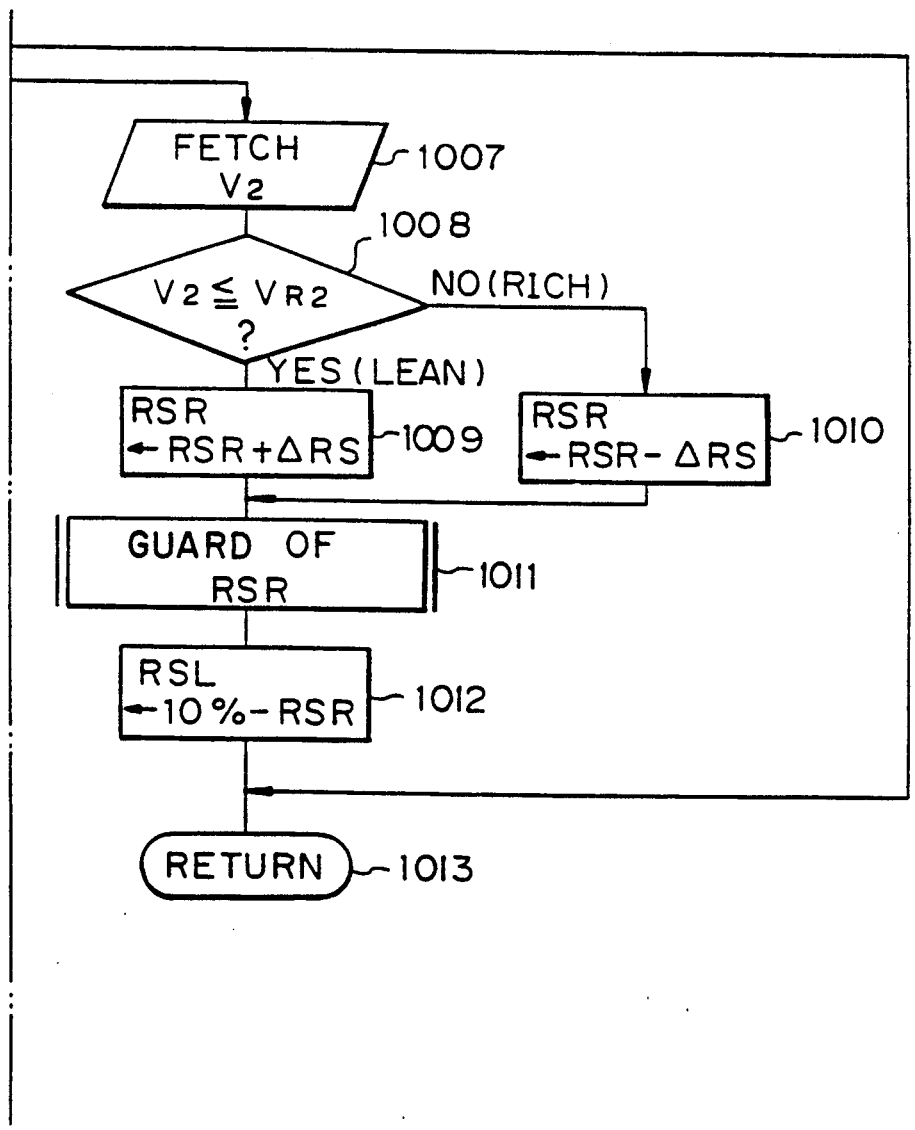

FIG. 10 is a routine for calculating the skip amounts RSR and RSL in accordance with the output $V_2$ of the downstream $O_2$ sensor 15 executed at a predetermined time such as 1 s.

Steps 1001 through 1006 are the same as steps 801 through 806 of FIG. 8. That is, if one or more of the feedback control conditions is not satisfied, the control proceeds directly to step 1013, thereby carrying out an open-loop control operation. Note that, in this case, the skip amount $\overline{RSR}$ ($\overline{RSL}$) or a mean value $\overline{RSR}$ ($\overline{RSL}$) thereof is stored in the backup RAM 106, and in an open-loop control operation, the value $\overline{RSR}$ ($\overline{RSL}$) or $\overline{RSR}$ ($\overline{RSL}$) is read out of the backup RAM 106.

Contrary to the above, if all of the feedback control conditions are satisfied, the control proceeds to steps 1007 through 1012.

At step 1007, an A/D conversion is performed upon the output voltage $V_2$ of the downstream $O_2$ sensor 15, and the A/D converted value thereof is fetched from the A/D converter 101. At step 1008, the voltage $V_2$ is compared with the reference voltage $V_{R2}$, thereby determining whether the current air-fuel ratio detected by the downstream $O_2$ sensor 15 is on the rich side or on the lean side with respect to the stoichiometric air-fuel ratio. As a result, at step 1008, if the air-fuel ratio downstream of the catalyst converter 12 is lean, the control proceeds to step 1009. Alternatively, the control proceeds to the step 1010.

At step 1009, the rich skip amount RSR is increased by ΔRS to move the air-fuel ratio to the rich side. On the other hand, at step 1010, the rich skip amount RSR is decreased by ΔRS to move the air-fuel ratio to the lean side. At step 1011, the rich skip amount RSR is guarded by a maximum value MAX such as 7.5% and a minimum value MIN such as 2.5%. Note that the minimum value MIN is a level by which the transient characteristics of the skip operation using the amounts RSR and RSL can be maintained, and the maximum value MAX is a level by which the drivability is not deteriorated by the fluctuation of the air-fuel ratio.

Then, at step 1012, the lean skip amount RSL is calculated by

RSL←10%−RSR.

The routine of FIG. 10 is then completed by step 1013.

FIG. 11 is a routine for calculating a fuel injection amount TAU executed at every predetermined crank angle such as 360° CA.

Steps 1101, 1102, 1103, 1104, 1105, 1107, and 1108 are the same as steps 901, 902, 903, 904, 905, 907, and 908, respectively, of FIG. 9.

At step 1106, a final fuel injection amount TAU is calculated by

TAU←TAUP·FAF1·(FPOWER+FOTP+β)+γ.

Figure 12B:
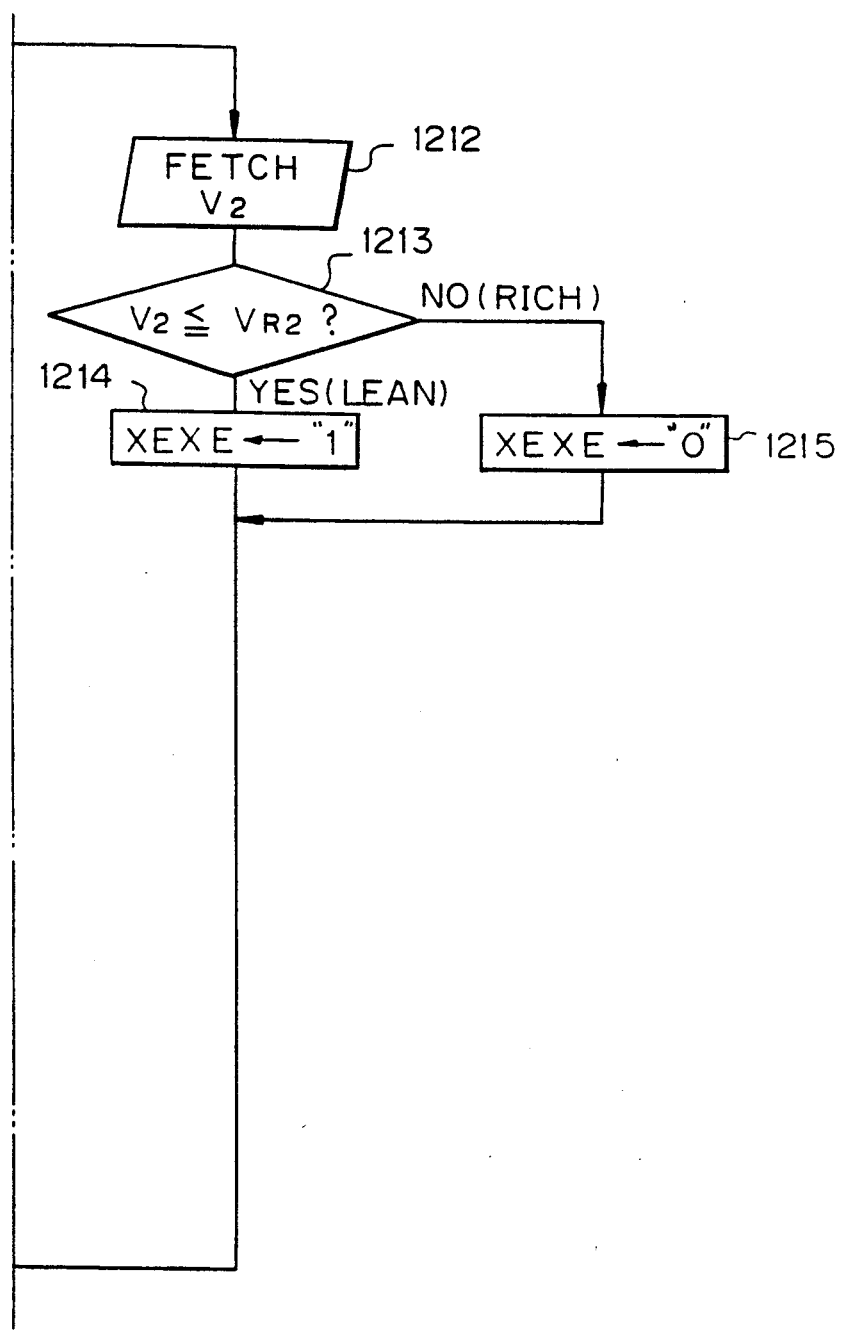

FIG. 12 is a first routine for determination of a deterioration of the catalysts executed at a predetermined time such as 4 ms. At step 1201, it is determined whether or not the engine is in a power fuel incremental state by the power fuel incremental fuel amount FPOWER. Here, the power incremental state is defined by the states II, III, and IV of the above-mentioned table. If the engine is not in the power fuel incremental state (FPOWER=0), the control proceeds to steps 1212 through 1215. If the engine is in the power fuel incremental state (FPOWER≠0) the control proceeds to step 1202.

Note that the final incremental amount FOTP can be used at step 1201 instead of the power fuel incremental amount FPOWER.

Steps 1212, 1213, and 1214 used for setting a catalyst determination execution flag XEXE when the engine is in the power fuel incremental state and the output $V_2$ of the downstream $O_2$ sensor 15 becomes lean. That is, at step 1212, an A/D conversion is performed upon the output $V_2$ of the downstream $O_2$ sensor 15, and at step 1213, it is determined whether or not $V_2 \leq V_{R2}$ is satisfied, i.e., the air-fuel ratio downstream of the catalyst converter 12 is lean. As a result, when this air-fuel ratio is lean, the control proceeds to step 1214 which sets the execution flag XEXE. Otherwise, the control proceeds to step 1215 which resets the execution flag XEXE. The control proceeds to step 1216, which clears a counter CNT, and then to step 1217.

When the engine is switched to the power fuel incremental state, the control at step 1201 proceeds to step 1202, which determines whether or not the execution flag XEXE is "1". As a result, if XEXE="0", the control proceeds directly to step 1216, but if XEXE="1", the control proceeds to steps 1203 through 1211 which carry out a determination of a deterioration of the catalysts of the catalyst converter 12.

At step 1203, an A/D conversion is performed upon the output $V_1$ of the upstream $O_2$ sensor 13, and at step 1204, it is determined whether or not $V_1 \geq 0.8$ V (rich)

is satisfied. The reason why the reference voltage at step 1204 is higher than the reference voltage $V_{R1}$ (0.45 V) at step 403 of FIG. 4 is as follows. Conventionally, the determination of a rich state is carried out by determining whether or not the output $V_1$ of the upstream $O_2$ sensor 13 is compared with the reference voltage $V_{R1}$ as explained above; Nevertheless, when the upstream $O_2$ sensor 13 is deteriorated the output $V_1$ thereof is unstable, and thus a rich state is erroneously determined even when the actual air-fuel ratio is lean. To avoid this error, the reference voltage at step 1204 is higher than the reference voltage $V_{R1}$ (0.45 V). Only when $V_1 \geq 0.8$ V, does the control proceed to step 1205.

At step 1205, an A/D conversion is performed upon the output $V_2$ of the downstream $O_2$ sensor 15, and at step 1206, it is determined whether or not $V_2 \geq 0.8$ V (rich) is satisfied. The reason why the reference voltage at step 1206 is higher than the reference voltage $V_{R2}$ at step 808 of FIG. 8 and step 1007 of FIG. 10 is the same as explained above. As a result, if $V_2 < 0.8$ V (lean), the control proceeds to step 1207 which increases the value of the counter CNT by $+1$. When the output $V_2$ of the downstream $O_2$ sensor 15 reaches 0.8 V, the control at step 1206 is switched to step 1208.

Namely, the counter CNT is used for counting a time from a timing at which $V_1 \geq 0.8$ V is satisfied to a timing at which $V_2 \geq 0.8$ V is satisfied, when the execution flag XEXE is "1". This time is dependent upon the $O_2$ storage effect of the three catalysts of the catalyst converter 12, i.e., the deterioration thereof. That is, when the catalyst converter 12 is not deteriorated, and accordingly the $O_2$ storage effect thereof is large, the above-mentioned time is long. On the other hand, when the catalyst converter 12 is deteriorated, and accordingly the $O_2$ storage effect thereof is small, the above-mentioned time is short.

Therefore, at step 1208, if $CNT \leq m$ (predetermined value) is satisfied, the three-way catalysts of the catalyst converter 12 are determined to be deteriorated, and as a result at steps 1209, and 1210 a deterioration diagnosis flag XDIAG is set (XDIAG = "1") and stored in the backup RAM 106. Further, at step 1211, the alarm 18 is activated. On the other hand, if $CNT \geq m$, then the catalysts are not deteriorated, so that the control proceeds directly to step 1216, which clears the counter CNT.

The routine of FIG. 12 is completed by step 1217.

The operation of the flow chart of FIG. 12 is further explained with reference to FIGS. 13A through 13E and FIGS. 14A through 14E. Note that FIGS. 13A through 13E show the case wherein the catalyst converter 12 is normal, i.e., not deteriorated, and FIGS. 14A through 14E show the case wherein the catalyst converter 12 is deteriorated.

Referring to FIGS. 13A through 13E, at a time $t_0$, the engine enters into a clearly rich state such as a power fuel incremental state. Note in this case, at a time to, the execution flag XEXE for indicating a clearly lean state is already set (XEXE = "1"). Therefore, at the time to a determination of a deterioration of the catalyst converter 12 is substantially initiated, and as a result, a time from a time $t_1$ to a time $t_2$ is measured by the counter CNT. Note that the time $t_1$ is a final point of a clearly lean state, and the time $t_2$ is an initial point of a clearly rich state. Therefore, when the engine is forcibly switched from a clearly lean state to a clearly rich state, the counter CNT counts a transition time between $t_1$ and $t_2$. As illustrated in FIG. 13E, when the value of the counter CNT is larger than m, the control at step 1208 of FIG. 12 proceeds directly to step 1216, and thus the alarm 18 is not activated.

Contrary to the above, as illustrated in FIGS. 13A through 13E, when the value of the counter CNT is smaller than m, the transition time from a clearly lean state ($t_1$) to a clearly rich state ($t'_2$) is short. In this case, the control at step 1208 of FIG. 12 proceeds to steps 1209 through 1211, thus activating the alarm 18.

Figure 15B:
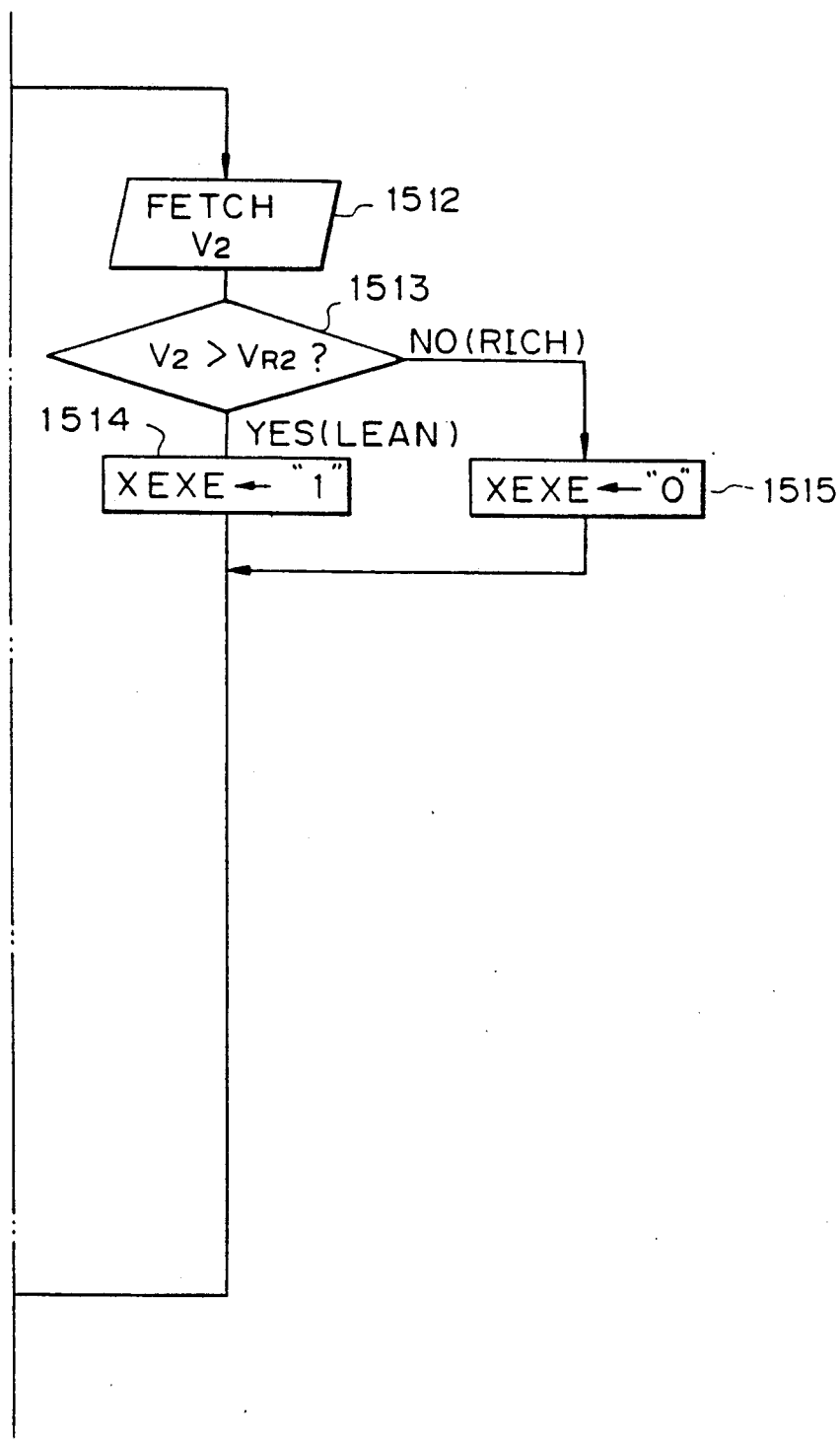

FIG. 15 is a second routine for determination of a deterioration of the catalysts executed at a predetermined time such as 4 ms. In FIG. 15, in contrast with the case of FIG. 12, a determination of a deterioration of the catalyst converter 12 is carried out in accordance with an $O_2$ storage time defined by a transition time from a clearly rich state to a clearly lean state; in this case, in a fuel cut-off state. That is at step 1501, it is determined whether or not the engine is in a fuel cut-off state by the fuel cut-off flag XFC. If the engine is not in the fuel cut-off state XFC = "0", the control proceeds to steps 1512 through 1515. If the engine is in the fuel cut-off state (XFC = "1"), the control proceeds to step 1502.

Steps 1512, 1513, and 1514 used for setting the catalyst determination execution flag XEXE when the engine is in the fuel cut-off state and the output $V_2$ of the downstream $O_2$ sensor 15 becomes rich. That is, at step 1512, an A/D conversion is performed upon the output $V_2$ of the downstream $O_2$ sensor 15, and at step 1513, it is determined whether or not $V_2 > V_{R2}$ is satisfied, i.e., the air-fuel ratio downstream of the catalyst converter 12 is rich. As a result, when this air-fuel ratio is rich, the control proceeds to step 1514 which sets the execution flag XEXE. Otherwise, the control proceeds to step 1515 which resets the execution flag XEXE. The control proceeds to step 1516 which clears a counter CNT, and then to step 1517.

When the engine is switched to the fuel cut-off state, the control at step 1501 proceeds to step 1502 which determines whether or not the execution flag XEXE is "1". As a result, if XEXE = "0", the control proceeds directly to step 1516, and if XEXE = "1", the control proceeds to step 1503 through 1511 which carry out a determination of a deterioration of the catalysts of the catalyst converter 12.

At step 1503, an A/D conversion is performed upon the output $V_1$ of the upstream $O_2$ sensor 13, and at step 1504, it is determined whether or not $V_1 \leq V_{R1}$ (lean) is satisfied. Also in this case, the reference voltage can be lowered to avoid an erroneous lean determination due to the deterioration of the upstream $O_2$ sensor 13. Only when $V_1 \leq V_{R1}$ does the control proceed to step 1505.

At step 1505, an A/D conversion is performed upon the output $V_2$ of the downstream $O_2$ sensor 15, and at step 1506, it is determined whether or not $V_2 \leq V_{R2}$ (lean) is satisfied. Also in this case, the reference voltage at step 1506 can be lowered as at step 1504. As a result, if $V_2 > V_{R2}$ (rich), the control proceeds to step 1507 which increases the value of the counter CNT by $+1$. When the output $V_2$ of the downstream $O_2$ sensor 15 reaches $V_{R2}$, the control at step 1506 is switched to step 1508.

Thus, the counter CNT is used for counting a time from a timing at which $V_1 \leq V_{R1}$ is satisfied to a timing at which $V_2 \leq V_{R2}$ is satisfied, when the execution flag XEXE is "1". This time is also dependent upon the $O_2$ storage effect of the three catalysts of the catalyst converter 12, i.e., the deterioration of thereof. That is, when the catalyst converter 12 is not deteriorated, and accordingly the $O_2$ storage effect thereof is large, the above-mentioned time is long. On the other hand, when the catalyst converter 12 is deteriorated, and accordingly the $O_2$ storage effect thereof is small, the above-mentioned time period is short.

Therefore, at step 1508, if CNT≦m (predetermined value) is satisfied, the three-way catalysts of the catalyst converter 12 are determined to be determined, and as a result, at steps 1509 and 1510, a deterioration diagnosis flag XDIAG is set (XDIAG="1") and stored in the backup RAM 106. Further, at step 1511, the alarm 18 is activated. On the other hand, if CNT≧m, then the catalysts are not deteriorated so that the control proceeds directly to step 1516, which clears the counter CNT.

The routine of FIG. 15 is completed by step 1517.

The operation of the flow chart of FIG. 15 is further explained with reference to FIGS. 16A through 16E and FIGS. 17A through 17E. Note that FIGS. 16A through 16E show the case wherein the catalyst converter 12 is normal, i.e., not deteriorated, and FIGS. 17A through 17E show the case wherein the catalyst converter 12 is deteriorated.

Referring to FIGS. 16A through 16E, if the vehicle speed SPD and the load parameter $Q/N_e$ are changed as illustrated in FIGS. 16A and 16B, and the engine enters into a clearly lean state such as a fuel cut-off state at a time to as illustrated in FIG. 16C, a determination of a deterioration of the catalyst converter 12 is substantially initiated, and as a result, a time from a time $t_1$ to a time $t_2$ is measured by the counter CNT. Note that the time $t_1$ is a final point of a clearly lean state, and the time $t_2$ is an initial point of a clearly rich state. Therefore, when the engine is forcibly switched from a clearly rich state to a clearly lean state, the counter CNT counts a transition time between $t_1$ and $t_2$. As illustrated in FIG. 16E, when the value of the counter CNT is larger than m, the control at step 1508 of FIG. 15 proceeds directly to step 1516, and thus the alarm 18 is not activated.

Contrary to the above, as illustrated in FIGS. 17A through 17E, when the value of the counter CNT is smaller than m, the transition time period from a clearly lean state ($t_1$) to a clearly rich state ($t_2'$) is short. In this case, the control at step 1508 of FIG. 15 proceeds to steps 1509 through 1511, thus activating the alarm 18.

Note that the routines of FIGS. 12 and 15 can be combined, i.e., when the engine is forcibly switched from a clearly lean state (XEXE="1") to a clear rich state (FPOWER≠0 or FOTP≠0), a transition time TA (from $t_1$ to $t_2$ ($t_2'$) of FIGS. 13A through 13E and FIGS. 14A through 14E) of the output $V_2$ of the downstream $O_2$ sensor 15 is calculated by the routine of FIG. 12. Also, when the engine is forcibly switched from a clearly rich state (XEXE="1") to a clear lean state (XFC="1"), a transition time TB (from $t_1$ to $t_2$ ($t_2'$) of FIGS. 16A through 16E and FIGS. 17A through 17E) of the output $V_2$ of the downstream $O_2$ sensor 15 is calculated by the routine of FIG. 14. Then a determination of deterioration of the catalyst converter 12 is carried out by determining whether or not TA+TB is compared with a predetermined value. In this case, when the sum TA+TB is larger than TA or TB, the accuracy of the determination of a deterioration of the catalyst converter 12 can be enhanced.

Figures 18, 18A:
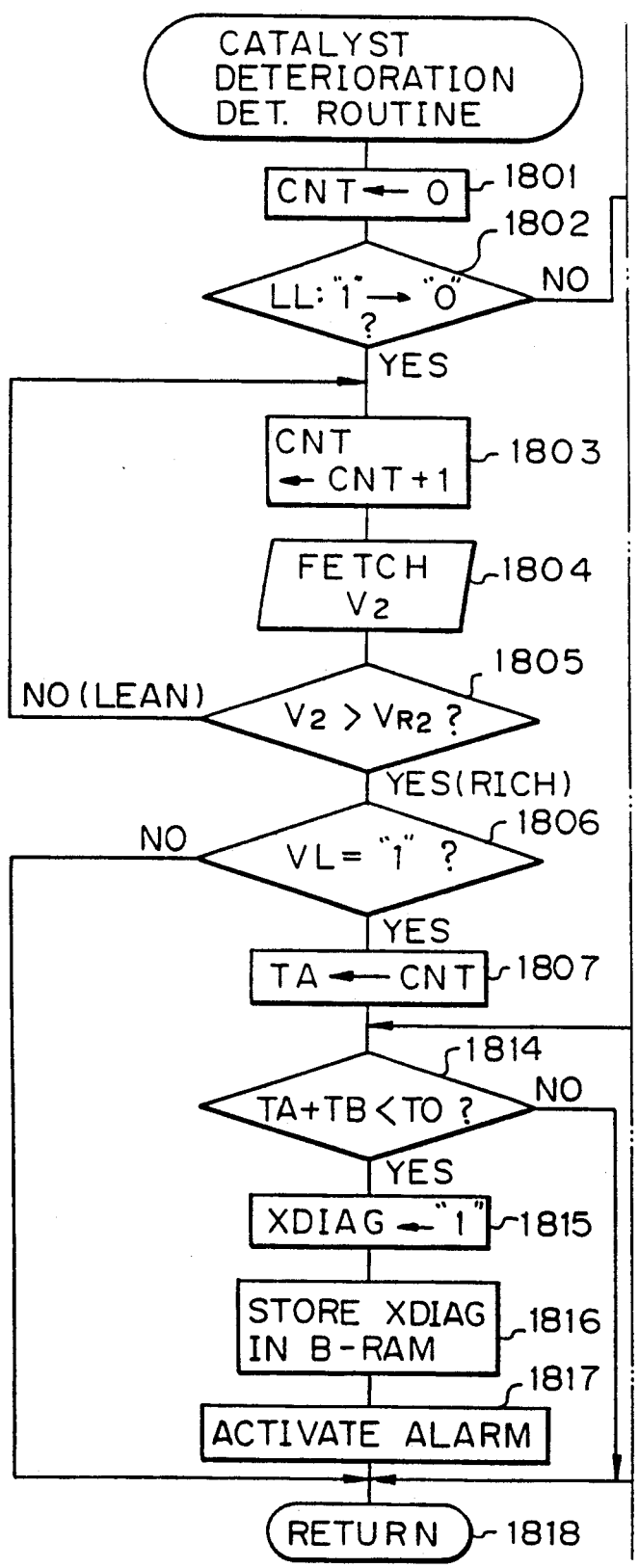
Figure 18B:
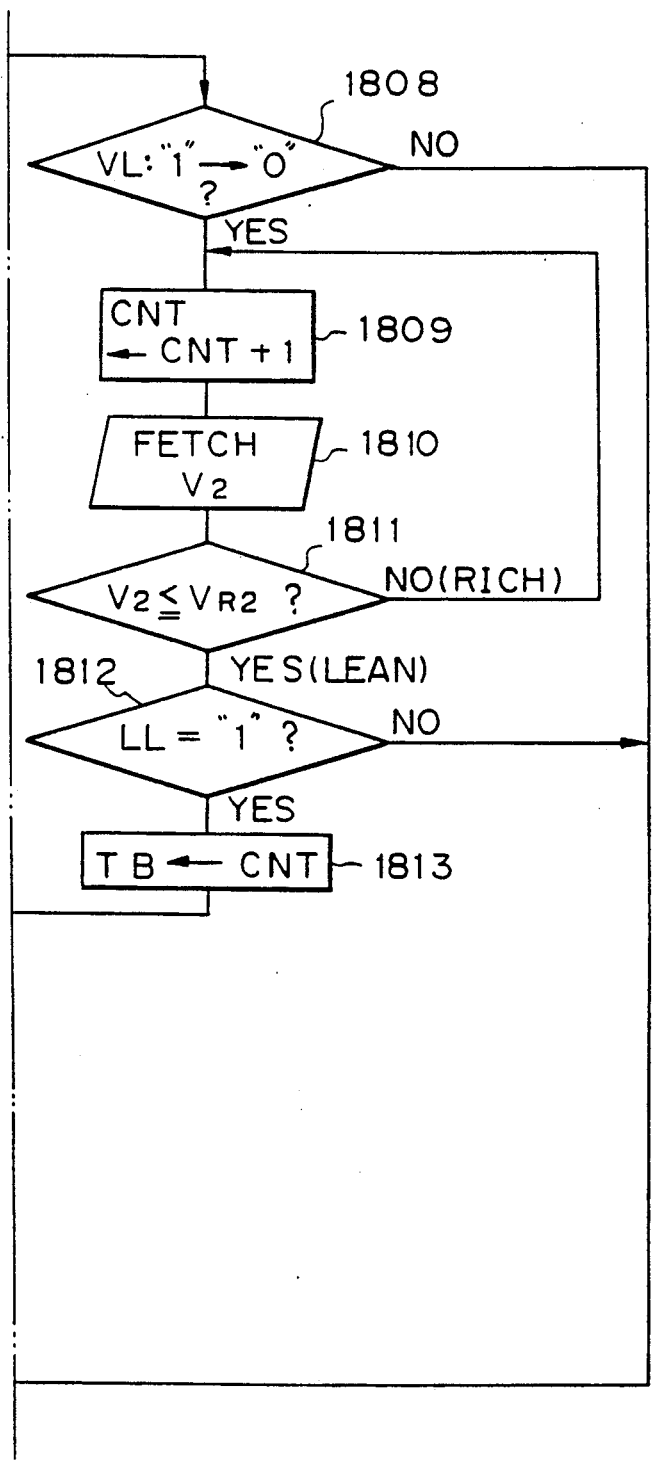

FIG. 18 is a third routine for a determination of a deterioration of the catalysts executed at a predetermined time such as 4 ms. At step 1801, a counter CNT is cleared. Then, at step 1802, it is determined whether or not "1" (ON) has changed to "0" (OFF) in the output LL of the idle switch of the throttle sensor 17, i.e., whether or not the engine has departed from a clearly lean state such as an idling state (LL="1") wherein the throttle valve 16 is completely closed. On the other hand, at step 1808, it is determined whether or not "1" (ON) has changed to "0" (OFF) in the output VL of the full switch of the throttle sensor 17, i.e., whether or not the engine has departed from a clearly rich state such as an idling state (VL="1") wherein the opening of the throttle valve 17 is larger than 70°. Note that, when LL="1" or LV="1", the air-fuel ratio feedback control by the downstream $O_2$ sensor 15 is not carried out.

Only when a change from "1" (ON) to "0" (OFF) occurs in the output LL of the idle switch, does the control proceed to steps 1803 to 1805, and only when a change from "1" (ON) to "0" (OFF) occurs in the output VL of the full switch, does the control proceed to steps 1809 to 1811. Otherwise, the control proceeds directly to step 1815.

At steps 1803 to 1805, a time of a transition of the downstream $O_2$ sensor 15 from a rich state to a lean state is measured by the counter CNT. That is, at step 1803, the value of the counter CNT is counted up by +1, and at step 1804, an A/D conversion is performed upon the output $V_2$ of the downstream $O_2$ sensor 15. Then, at step 1805, it is determined whether or not $V_2 > V_{R2}$ (rich) is satisfied. If the answer at step 1805 is negative, the control returns to step 1803. Accordingly, the control at steps 1803 to 1805 is repeated until $V_2 > V_{R2}$ (rich) is satisfied. Note that idling steps for adjusting a delay time can be inserted into steps 1803 to 1805, and as a result, when the output $V_2$ of the downstream $O_2$ sensor 15 becomes rich, the control proceeds to step 1806 which determines whether or not the output VL of the full switch is "1" (ON). That is, at step 1806, it is determined whether or not the time measured by the counter CNT by the flow of steps 1803 to 1805 corresponds to a transition time during which the engine is forcibly switched from a clearly lean state (LL="1") to a clearly rich state (VL="1"). Therefore, at step 1806 if VL="0", the control proceeds directly to step 1818, and if VL="1", the control proceeds to step 1807 which replaces TA with the value of the counter CNT. In this case, TA is illustrated in FIG. 19C.

At steps 1809 to 1811, a time of a transition of the downstream-side $O_2$ sensor 15 from a lean state to a rich state is measured by the counter CNT. That is, at step 1809, the value of the counter CNT is counted up by +1, and at step 1810, an A/D conversion is performed upon the output $V_2$ of the downstream $O_2$ sensor 15. Then, at step 1811, it is determined whether or not $V_2 \leq V_{R2}$ (lean) is satisfied. If the answer at step 1811 is negative, the control returns to step 1809. Accordingly the control at steps 1809 to 1811 is repeated until $V_2 \leq V_{R2}$ (lean) is satisfied. Note that idling steps for adjusting a delay time can be also inserted into steps 1809 to 1811, and as a result, when the output $V_2$ of the downstream-side $O_2$ sensor 15 becomes lean, the control proceeds to step 1812 which determines whether or not the output LL of the idle switch is "1" (ON). That is, at step 1812, it is determined whether or not the time measured by the counter CNT by the flow of steps 1809 to 1811 corresponds to a transition time period during which the engine is forcibly switched from a clearly rich state (VL="1") to a clearly lean state (LL="1"). Therefore, at step 1812, if LL="0", the control proceeds directly to step 1818, and if LL="1", the control proceeds to step 1813 which replaces TB with the value of the counter CNT. In this case, TB is illustrated in FIG. 19E.

At step 1814, it is determined whether or not a sum of response times TA and TB is smaller than a predetermined value T0, and as a result, only if $TA + TB < T0$, does the control proceed to steps 1815, 1816, and 1817. That is, at steps 1815 and 1816, a deterioration diagnosis flag XDIAG is set (XDIAG="1") and stored in the backup RAM 106. Further, at step 1817, the alarm 18 is activated. On the other hand, if $TA + TB \geq T0$, then the catalysts are not deteriorated, and the control proceeds directly to step 1818.

The routine of FIG. 18 is completed by step 1818.

Thus, in the routine of FIG. 18, as illustrated in FIGS. 19A through 19E, when the engine is forcibly switched from a clearly rich state to a clearly lean state and vice versa, the response times TA and TB are obtained. Each of the response times TA and TB is dependent upon the degree of deterioration of the catalysts of the catalyst converter 12, and accordingly, the sum of TA and TB is also dependent upon this deterioration degree, the sum TA + TB is preferably compared with each, since the absolute value of the sum is larger than that of each.

Figure 20A:
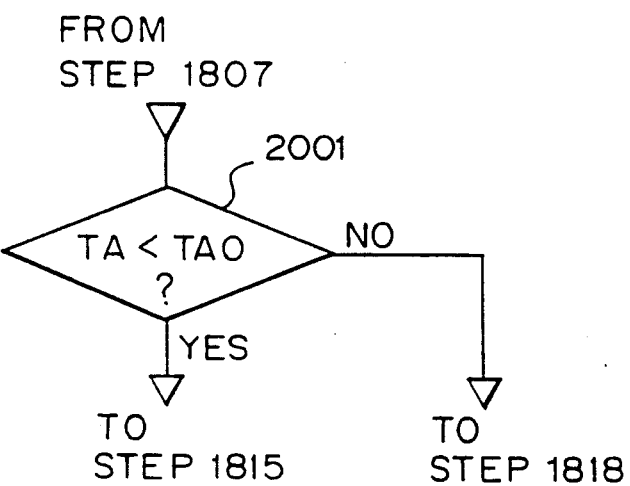
Figure 20B:
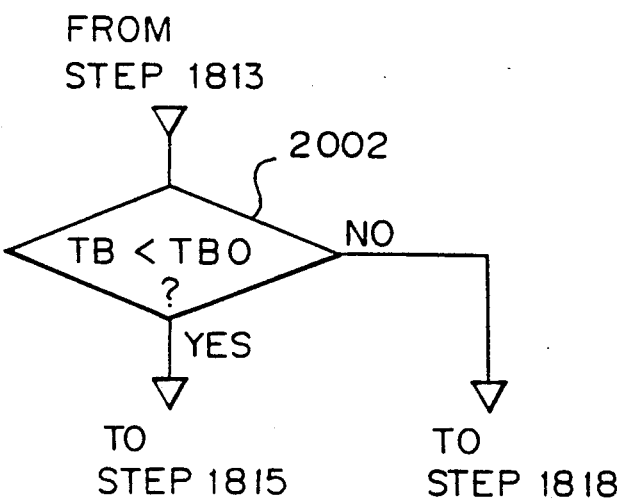

Also, as explained above, since each of the response time TA and TB represents the degree of deterioration of the catalysts, a determination of a deterioration thereof can be carried out by using one of the response times TA and TB. For example, if the response time TA from a clearly lean state (LL="1") to a clearly rich state (VL="1") is used, the routine of FIG. 20A is used in FIG. 18. That is, the control at step 1807 proceeds to step 2001 which determines whether or not $TA < TA0$ (predetermined value) is satisfied. Only when $TA < TA0$ is satisfied, does the control proceed to steps 1815 through 1817. In this case, steps 1808 through 1813 are deleted. Similarly, if the response time TB from a clearly rich state (VL="1") to a clearly lean state (LL="1") is used, the routine of FIG. 20B is used in FIG. 18. That is, the control at step 1813 proceeds to step 2002 which determines whether or not $TB < TB0$ (predetermined value) is satisfied. Only when $TB < TB0$ is satisfied, does the control proceed to steps 1815 through 1817. In this case, steps 1802 through 1807 are omitted.

Figure 21:
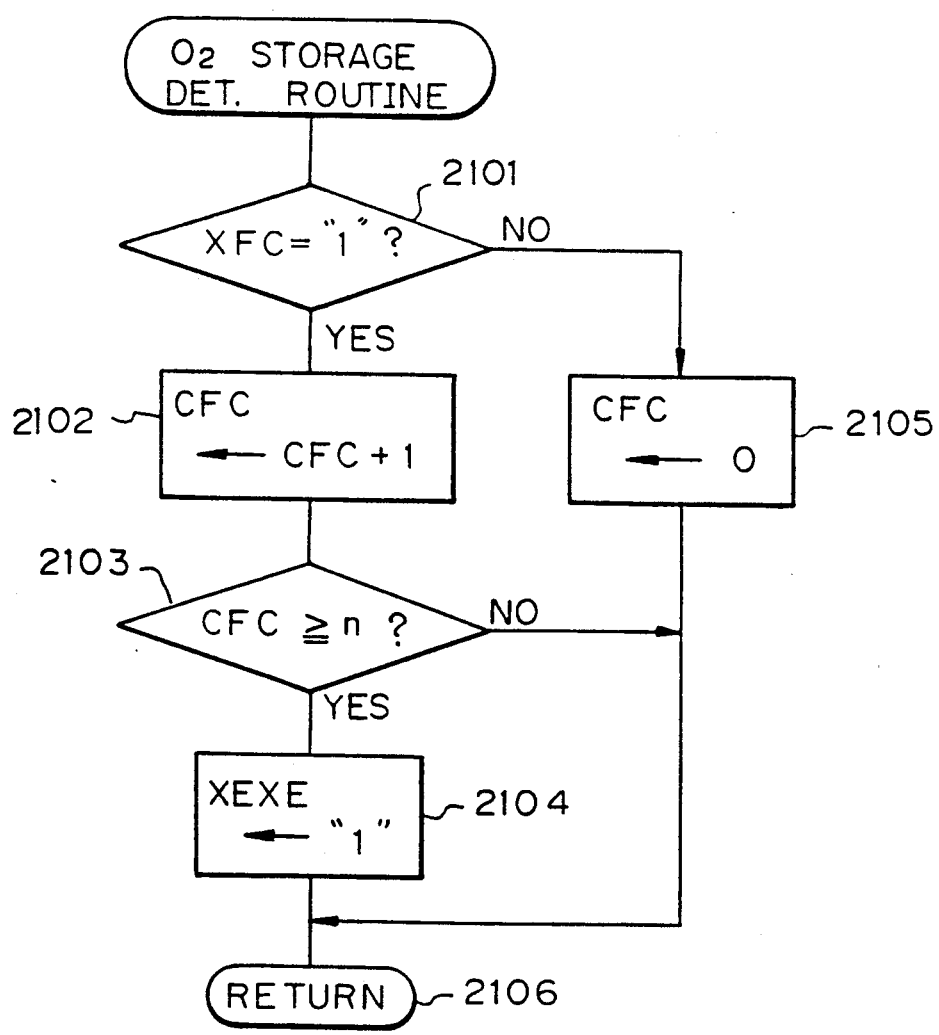
Figure 22A:
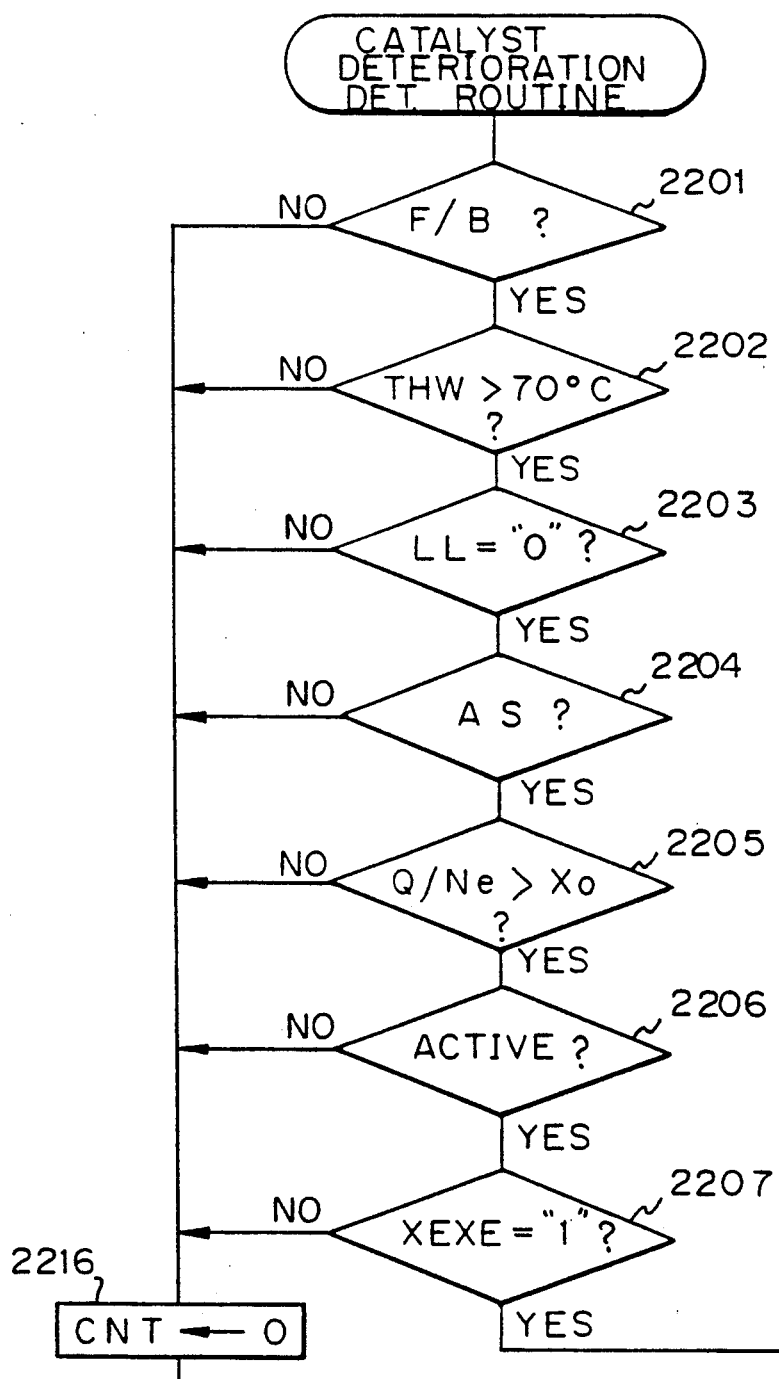
Figure 22B:
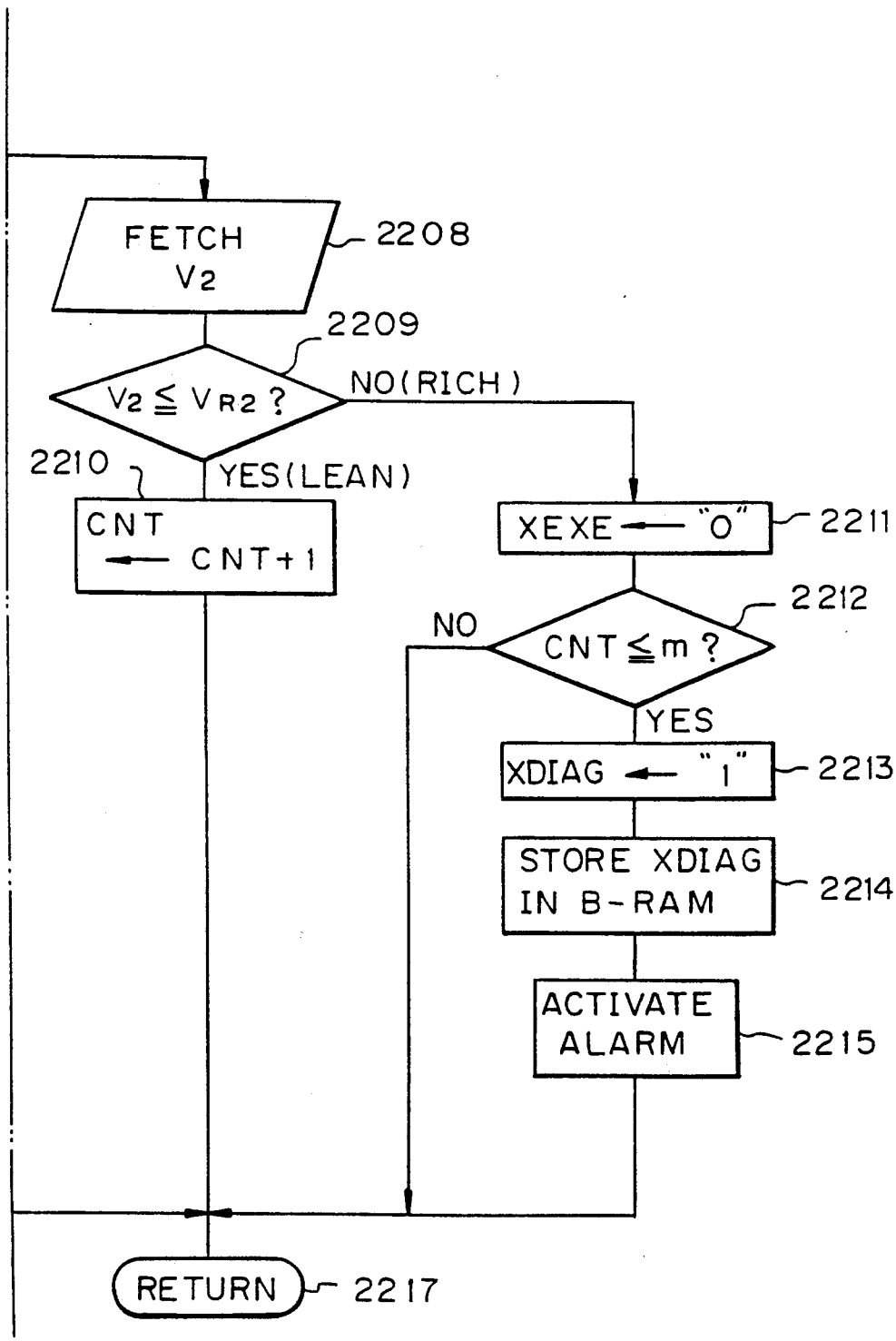

FIG. 21 is a routine for determining whether or not oxygen (O2) is fully stored in the catalyst converter 12, and FIG. 22 is a fourth routine for determining a deterioration of the catalysts. Both of these routines are carried out at a predetermined time such as 4 ms.

In FIG. 21, at step 2101, it is determined whether or not the engine is in a fuel cut-off state, by the fuel cut-off flag XFC. If the engine is in the fuel cut-off state (XFC="1"), the control proceeds to step 2102 which increases a fuel cut-off duration counter CFC by +1, and if not in the fuel cut-off state (XFC="0"), the control proceeds to step 2105 which clears the counter CFC.

At step 2103, it is determined whether or not the value of the counter CFC has reached a predetermined value n which corresponds to 2 to 5 sec. If $CFC \geq n$, this means that oxygen is fully stored in the catalyst converter 12, and accordingly, a determination execution flag XEXE is set (XEXE="1") at step 2104. Otherwise, the control proceeds directly to step 2106, thus completing this routine.

In FIG. 22, steps 2201 through 2206 are the same as steps 801 through 806 (steps 1001 through 1006) of FIG. 8 (FIG. 10). That is, at steps 2201 through 2206, it is determined whether or not all of the air-fuel ratio feedback controls by the downstream O2 sensor 15 are satisfied. Note that the air-fuel ratio feedback control by the downstream O2 sensor 15 represents a control regarding a stoichiometric air-fuel ratio which is different from a clearly lean state. Only if all of the air-fuel ratio feedback control conditions at steps 201 through 2206 are satisfied does the control proceed to step 2207, which determines whether or not the determination flag XEXE is "1". Also only if XEXE="1" does the control proceed to steps 2208 through 2215. Otherwise, the control proceeds to step 2216 which clears a counter CNT, and then proceeds directly to step 2217.

Steps 2208 through 2210 are used for measuring a time of a change of the output V2 of the downstream O2 sensor 15 from a lean state to a rich state. That is, at step 2208, an A/D conversion is performed upon the output V2 of the downstream O2 sensor 15, and at step 2209, it is determined whether or not $V_2 \leq V_{R2}$ (lean) is satisfied. If $V_2 \leq V_{R2}$, the control proceeds to step 2210, which increases the value of the counter CNT by +1, and then to step 2217.

In the above-mentioned state, when the output V2 of the downstream O2 sensor 15 is switched from the lean side to the rich side, the control at step 2209 proceeds to step 2211 which resets the determination execution flag XEXE. Then, at step 2212, it is determined whether or not $CNT \leq m$ is satisfied. Here, m is a value corresponding to 5 to 10 sec. As a result, only when $CNT \leq m$ does the control proceed to steps 2213, 2214, and 2215. At steps 2213 and 2214, a deterioration diagnosis flag XDIAG is set and stored in the backup RAM 106. Then, at step 2215, the alarm 18 is activated. Otherwise, the control proceeds directly to step 2217 and the routine of FIG. 22 is completed.

Figure 23A:
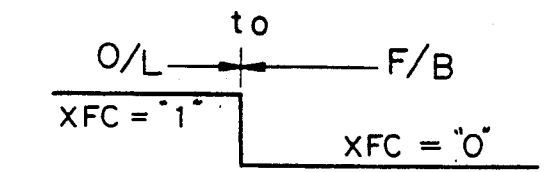
FIGS. 23A through 23D are timing diagrams explaining the flow chart of FIG. 22.
Figure 23B:
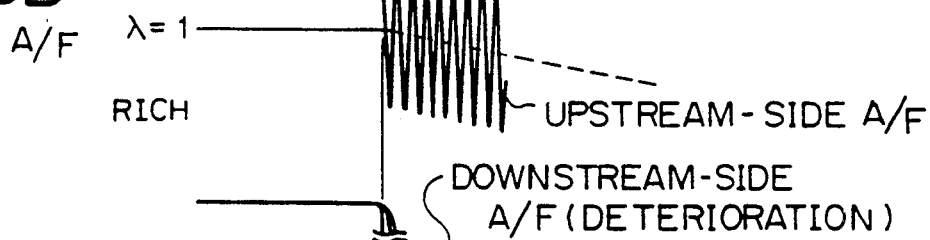
Figure 23C:
Figure 23D:
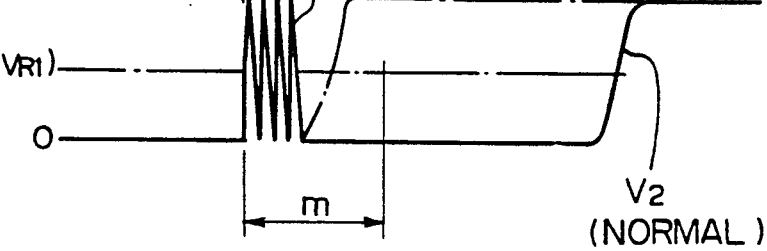

The operation of the flow chart of FIG. 22 is further explained with reference to FIGS. 23A through 23D. As illustrated in FIG. 23A, at a time $t_0$, when the engine is switched from a fuel cut-off state (XFC="1") to a non fuel cut-off state (XFC="0"), and accordingly, the air-fuel ratio control is switched from an open-loop control ($\lambda > 1$) to a closed-loop control by the downstream O2 sensor 15, the air-fuel ratio is brought close to the stoichiometric air-fuel ratio ($\lambda > 1$). In this case, as illustrated in FIG. 23B and 23C, the air-fuel ratio upstream of the catalyst converter 12 is promptly brought close to the stoichiometric air-fuel ratio, and accordingly, the output $V_1$ of the upstream O2 sensor 13 crosses the reference voltage $V_{R1}$ as illustrated in FIG. 23D. As illustrated in FIG. 23C, the air-fuel ratio downstream of the catalyst converter 12 is changed in accordance with the O2 storage effect of the catalyst converter 12, and accordingly, as illustrated in FIG. 23D, the output $V_2$ of the downstream O2 sensor 15 crosses the reference voltage $V_{R2}$ with a delay time dependent upon the O2 storage effect of the catalyst converter 12. That is, when the catalyst converter 12 has a large O2 storage effect, i.e., the catalyst converter 12 has not deteriorated (normal), it takes a long time as illustrated in FIG. 23C for the air-fuel ratio downstream of the catalyst converter 12 to reach the stoichiometric air-fuel ratio, and accordingly, as illustrated in FIG. 23D, the output $V_2$ of the downstream O2 sensor 15 crosses the reference voltage $V_{R2}$ with a long delay time. Conversely when the catalyst converter 12 has a small O2 storage effect, i.e., the catalyst converter 12 is deteriorated, it takes a short time as illustrated in FIG. 23C for the air-fuel ratio downstream of the catalyst converter 12 to reach the stoichiometric air fuel ratio, and accordingly, as illustrated in FIG. 23D, the output $V_2$ of the downstream side $O_2$ sensor 15 crosses the reference voltage $V_{R2}$ with a short delay time. Thus, the value m at step 2212 of FIG. 22 is preset in order to discriminate the deterioration state from the normal state in FIG. 23D.

In FIGS. 21 and 22, a clearly lean state is detected by the duration of a fuel cut-off state, and after such a clearly lean state is detected, a determination of a deterioration of the catalyst converter 12 is carried out for a recovery time by which the air-fuel ratio is returned from the above-mentioned clearly lean state by the air-fuel ratio feedback control by the downstream $O_2$ sensor 15 to the stoichiometric air-fuel ratio. Note it is possible for a clearly rich state to be detected by the duration of a power fuel incremental (FPOWER) state or an OTP fuel incremental state, and after such a clearly rich state is detected, a determination of a deterioration of the catalyst converter 12 is carried out during a recovery time in which the air-fuel ratio is returned from the above-mentioned clearly rich state by the air-fuel ratio feedback control by the downstream $O_2$ sensor 15 to the metric air-fuel ratio. In this case, at step 2101 of FIG. 21, it is determined whether or not FPOWER or FOTP is 0. As a result, if FPOWER (or FOTP) is not zero, the control proceeds to step 2102, and if FPOWER (or FOTP) is 0, the control proceeds to step 2105. Also, at step 2209 of FIG. 22, it is determined whether or not $V_2 > V_{R2}$ (rich) is satisfied.

In the routines of FIG. 12, 15, 18, or 22, the determination of a deterioration of the catalysts is carried out in an actual driving state, and accordingly, such a determination may be often carried out in a steady driving state; note, when the engine is in an acceleration state or in a deceleration state, such a determination may be not carried out. Nevertheless, the accuracy of the determination of a deterioration of the catalysts carried out in an actual driving state is relatively low, and to improve this accuracy, the above-mentioned deterioration is preferably carried out only in a predetermined driving state such as a test mode, which will be explained with reference to FIGS. 24, 25, 27, and 29.

Figure 24B:
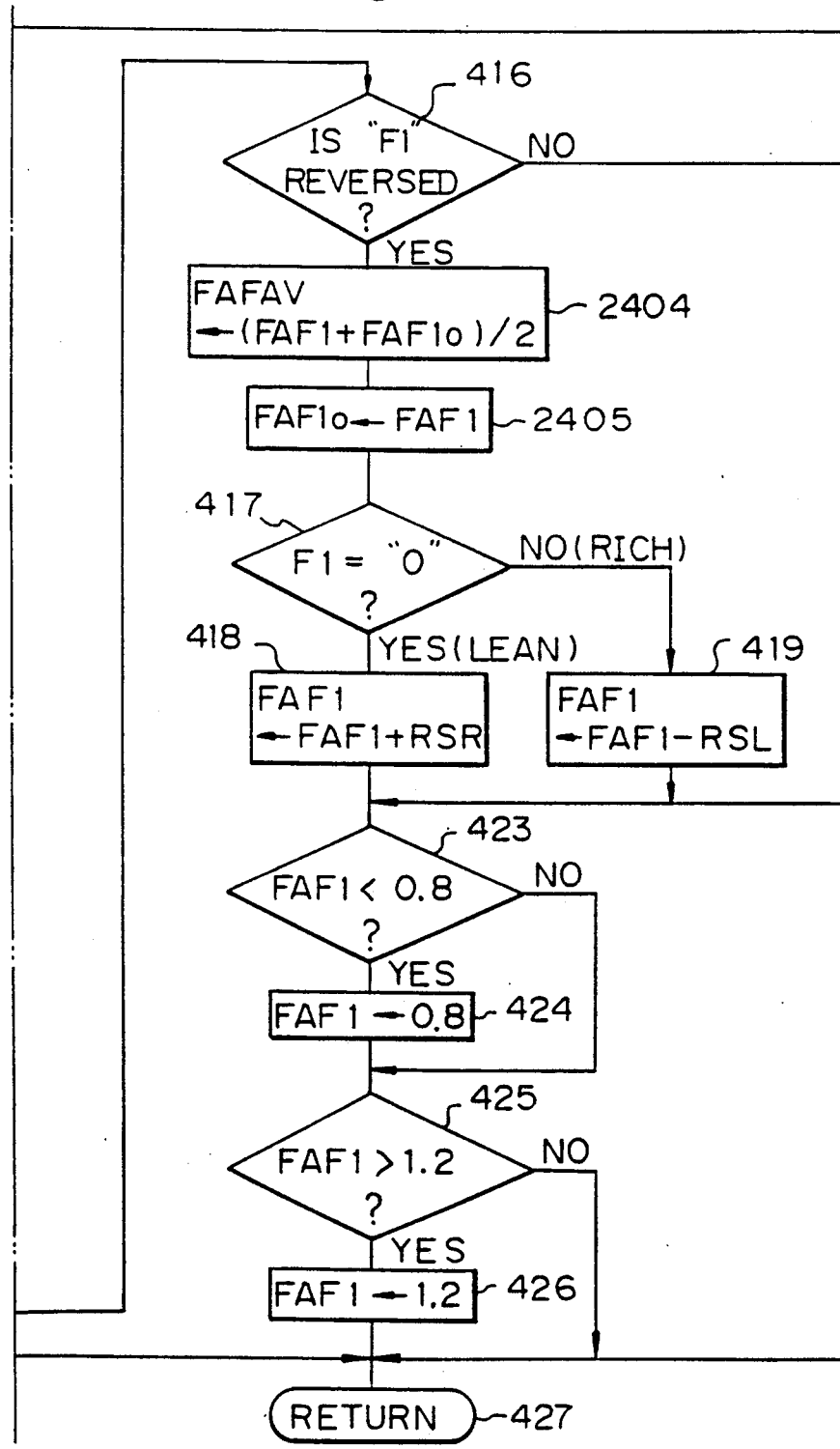
Figure 24C:
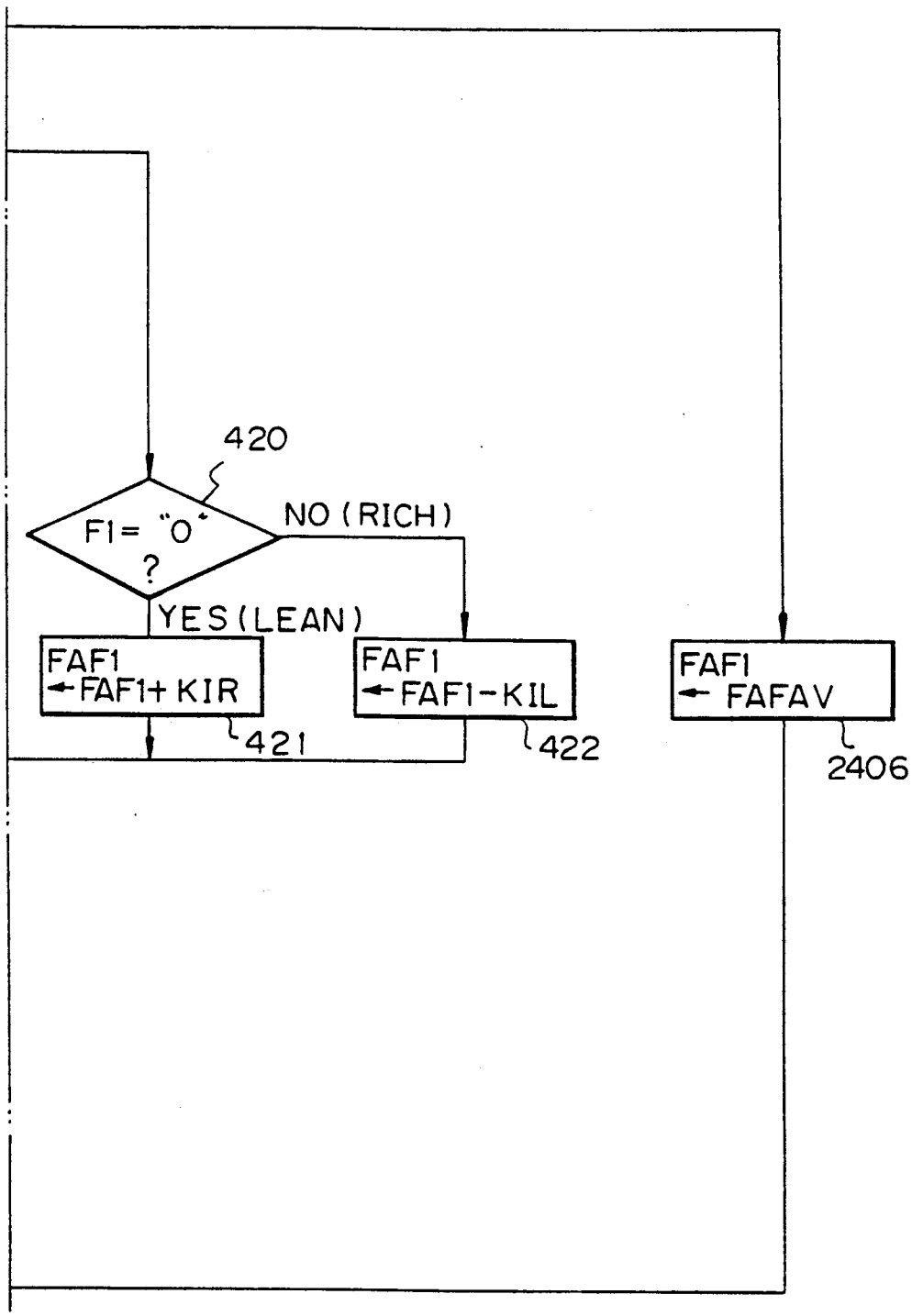
Figure 25:
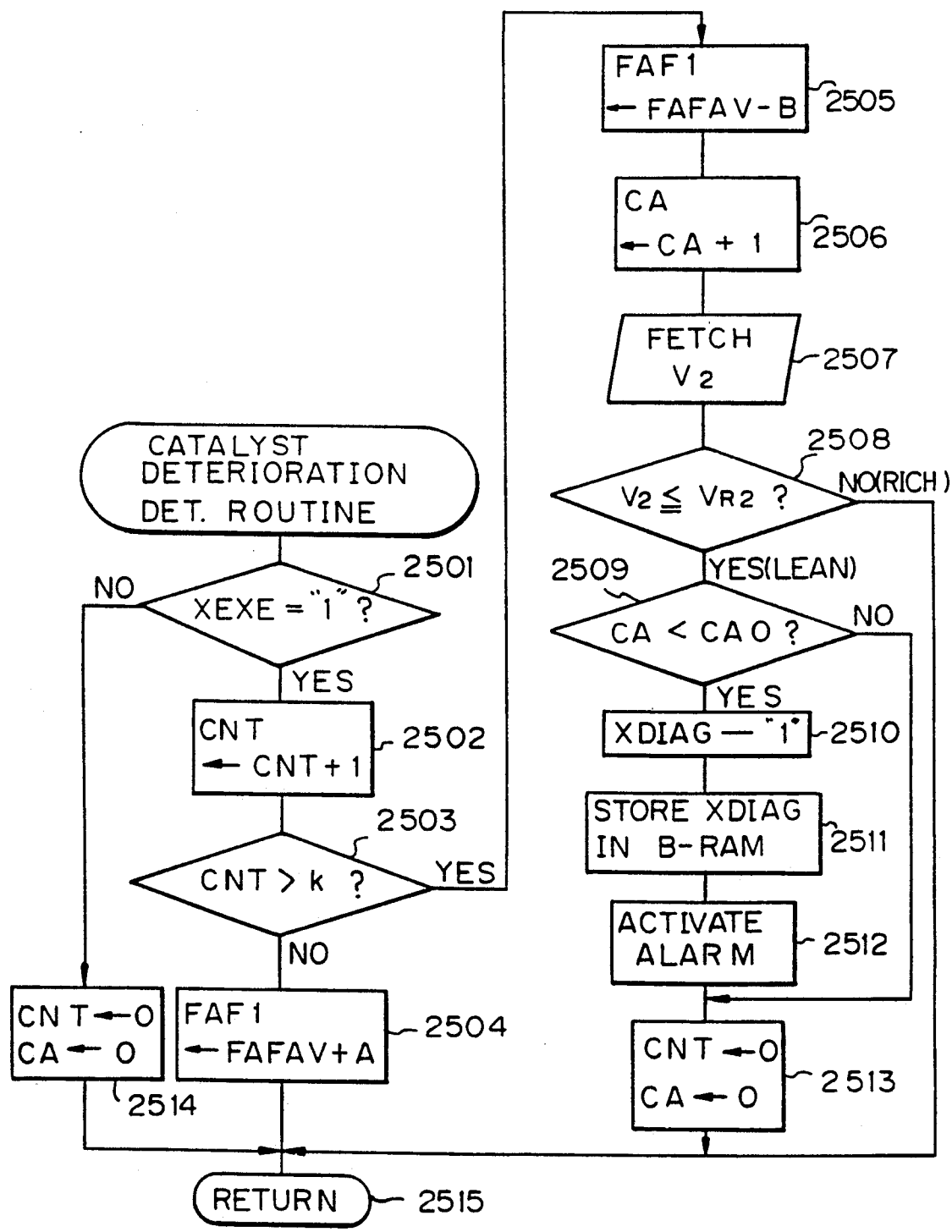

FIG. 24 is a modification of FIG. 4, and FIG. 25 is a fifth routine for a determination of a deterioration of the catalysts executed at a time such as 4 ms.

In FIG. 24, steps 2401 through 2406 are added to the routine of FIG. 4. At step 401, when all of the air-fuel ratio feedback control conditions by the upstream $O_2$ sensor 13 are satisfied, the control proceeds to step 2401. Otherwise, the control proceeds to step 2406 which replaces the air-fuel ratio correction amount FAF1 with its mean value FAFAV.

At step 2401, it is determined whether or not all of the conditions for determining a deterioration of the catalyst converter 12 are satisfied. The deterioration determining conditions are as follows:

i) the coolant temperature THW is within a range of from 70° C. to 100° C.;

ii) the load $Q/N_e$ is within a range of from 0.07 to 0.12;

iii) all of the fuel incremental amounts are 0;

iv) the secondary air suction system is turned OFF;

v) seven minutes have passed since the engine was started;

vi) the intake air temperature THA is within a range of from 10° C. to 40° C.;

vii) the idle switch is turned ON (LL="1"); and viii) the T terminal 19 is turned ON.

Of course, other conditions are introduced as occasion demands. For example, in a repair factory, if the engine is fully warmed up and the catalysts within the catalyst converter 12 also are fully warmed up, the engine will satisfy the above-mentioned deterioration determining conditions. If all of the deterioration determining conditions are satisfied, the control proceeds to step 2404 which sets the execution flag XEXE (XEXE="1"). In this case, the air-fuel ratio feedback control by the upstream $O_2$ sensor 13 defined by steps through 426 is prohibited. Note that, when the execution flag XEXE is set, the deterioration determining routine of FIG. 25 is substantially carried out.

At steps 401 and 2401, if all of the air-fuel ratio feedback control conditions by the upstream $O_2$ sensor 13 are satisfied and all of the deterioration determining conditions are satisfied, the control proceeds to step 2403 which resets the execution flag XEXE, and then the air-fuel ratio feedback control by the upstream $O_2$ sensor 15 is carried out.

At every reversion of the air-fuel ratio correction amount FAF1 during an air-fuel ratio feedback control by the upstream $O_2$ sensor 13, at step 2404, the mean value FAFV of the air-fuel ratio correction amount FAF1 is renewed by $$FAFV \leftarrow (FAF1 + FAF1_0)//2.$$

Then, at step 2405, the value $FAF1_0$ is replaced by FAF1, as preparation for the next operation.

Note that, when the execution XEXE is "1", the air-fuel ratio feedback control by the downstream-side $O_2$ sensor 15 is also substantially prohibited. Accordingly, in the routines of FIGS. 8 and 10, a step for determining whether or not the execution flag XEXE is "1" is introduced after step 806 of FIG. 8 and step 1006 of FIG. 10.

The routine of FIG. 25 is explained with reference to timing diagrams illustrated in FIGS. 26A through 26E.

Before a time $t_1$, all illustrated in FIG. 26A, since the execution flag XEXE is "0", the control at step 2501 proceeds to step 2514 which clears counters CNT and CA, and then proceeds to step 2515. In this state, the air-fuel ratio feedback control by the upstream $O_2$ sensor 13 is carried out as illustrated in FIG. 26B, and the air-fuel ratio feedback control by the downstream $O_2$ sensor 15 may be carried out as illustrated in FIGS. 26C, 26D, 26E.

At the time $t_1$, when the execution flag XEXE is switched from "0" to "1", the control at step 2501 proceeds to steps 2502 through 2504, thereby forcibly making the air-fuel ratio rich for a time of from $t_2$ to $t_3$ defined by CNT=k, as illustrated in FIG. 26B. That is, at step 2502, the value of the counter CNT is counted up by +1, and at step 2503, it is determined whether or not CNT>k is satisfied. Then, at step 2504, the air-fuel ratio correction amount FAF1 is calculated by $$FAF1 \leftarrow FAFAV + A$$

Note that FAFAF is the mean value of the air-fuel ratio correction amount FAF1, and accordingly, FAFAV corresponds to the stoichiometric air-fuel ratio. Thus, such a rich state wherein FAF1=FAFAV +A is maintained for a time (CNT=k) long enough to expel oxygen from the catalysts of the catalyst converter 12. As a result, at the time $t_3$, the output $V_2$ of the downstream $O_2$ sensor 15 becomes completely high as illustrated in FIGS. 26C, 26D, and 26E. Note that FIGS. 26C, 26D, and 26E show the cases wherein the degree of deterioration of the catalysts is small, medium, and large, respectively.

At time $t_3$, when CNT>k is satisfied, the control at step 2503 proceeds to step 2505, thereby forcibly making the air-fuel ratio lean. That is, at step 2505, the air-fuel ratio correction amount FAF1 is calculated by $$FAF1 \leftarrow FAFAV - B.$$

At step 2506, a timer counter CA is counted up by +1. Then at step 2507, an A/D conversion is performed upon the output $V_2$ of the downstream $O_2$ sensor 15, and at step 2508, it is determined whether or not $V_2 \leq V_{R2}$ (lean) is satisfied. That is, the counter CA is used for counting a transition time from a time $t_3$ to a time $t_4$ ($t_4'$, $t_4''$) when the downstream air-fuel ratio is switched from the rich side to the lean side.

As a result, at the time $t_4$ ($t_4'$, $t_4''$) the control at step 2508 proceeds to step 2509 which determines whether or not CA<CA0 is satisfied. Only when CA<CA0 are the catalysts determined to be deteriorated, so that the control proceeds to step 2510 which sets "1" in the deterioration diagnosis flag XDIAG. Then, at 2511, the deterioration flag XDIAG is stored in the backup RAM 106, and at step 2512, the alarm 18 is activated.

Then, at step 2513, the counters CNT and CA are cleared, and the routine of FIG. 25 is completed by step 1515.

As illustrated in FIGS. 26C, 26D, and 26E, the values CA1, CA2, and CA3 of the counter CA show the time from a completely $O_2$ empty state of the catalysts ($t_3$) to a full $O_2$ storage state ($t_4$, $t_4'$, $t_4''$), and accordingly, the values CA1, CA2, and CA3 of the counter CA show the degree of deterioration of the catalysts. For example, the threshold value CA0 at step 2509 is a value between CA1 and CA2.

Figure 27:
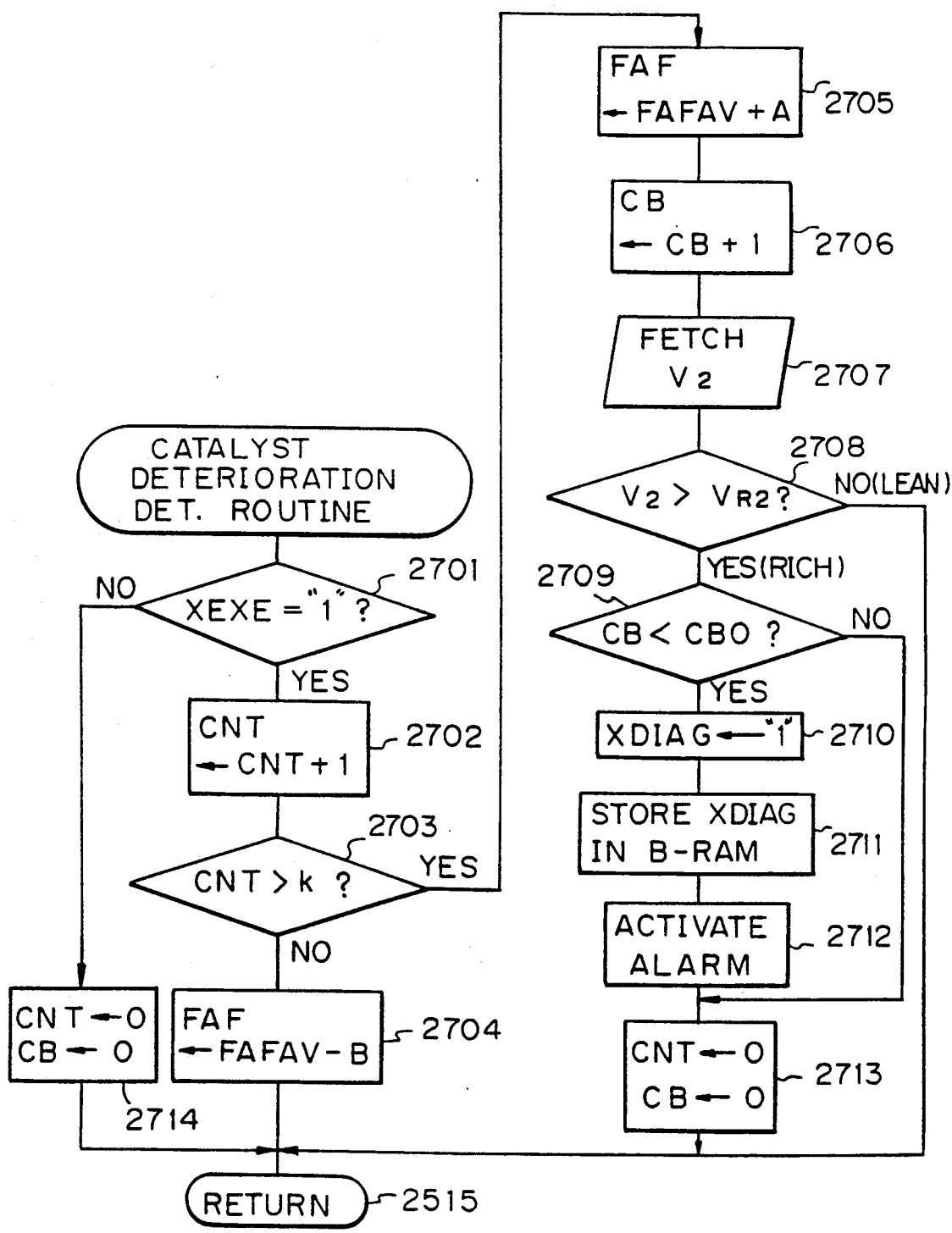

FIG. 27 is a sixth routine for the determination of a deterioration of the catalysts executed at a predetermined time such as 4 ms. In FIG. 27, in contrast with FIG. 25, the air-fuel ratio is first forcibly made lean, and then the air-fuel ratio is forcibly made rich. Then, a determination of the deterioration of the catalysts is carried out during a transition time CB from a lean state to a rich state.

The routine of FIG. 27 is explained with reference to timing diagrams illustrated in FIGS. 28A through 28E.

Figure 28A:
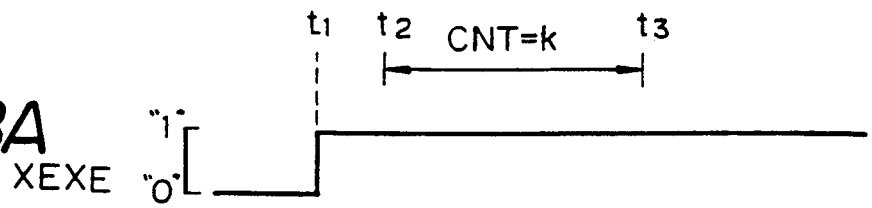
FIGS. 28A through 28E are timing diagrams explaining the flow chart of FIG. 27.

Before a $t_1$, as illustrated in FIG. 28A, since the execution flag XEXE is "0", the control at step 2701 proceeds to step 2714, which clears counters CNT and CB, and then proceeds to step 2715. In this state, the air-fuel ratio feedback control by the upstream $O_2$ sensor 13 is carried out as illustrated in FIG. 28B, and the air-fuel ratio feedback control by the downstream $O_2$ sensor 15 may be carried out as illustrated in FIGS. 28C, 28D, 28E.

Figure 28B:
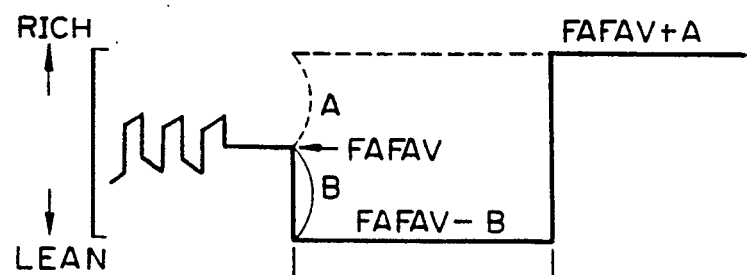
Figure 28C:
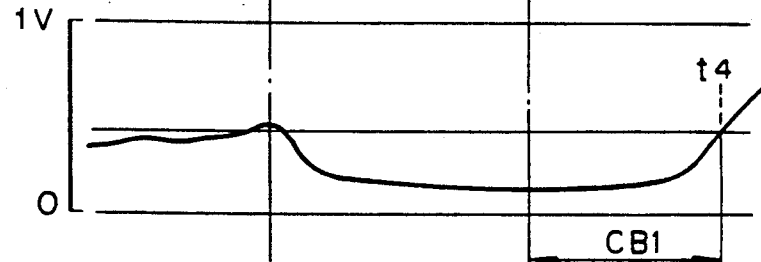
Figure 28D:
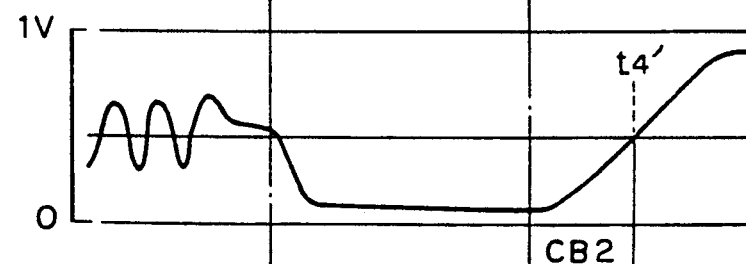
Figure 28E:
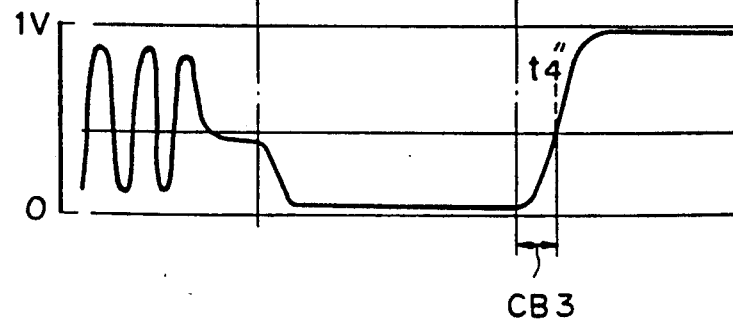

At the time $t_1$, when the execution flag XEXE is switched from "0" to "1", the control at step 2701 proceeds to steps 2702 through 2704, thereby forcibly making the air-fuel ratio lean for a time of from $t_2$ to $t_3$ defined by CNT=k, as illustrated in FIG. 28B. That is, at step 2702, the value of the counter CNT is counted up by +1, and at step 2703, it is determined whether or not CNT>k is satisfied. Then, at step 2704, the air-fuel ratio correction amount FAF1 is calculated by $$FAF1 \leftarrow FAFAV - B$$

Thus, such a rich state wherein $FAF1 = FAFAV + A$ is maintained for a time (CNT=k) long enough to store oxygen fully in the catalysts of the catalyst converter 12. As a result, at a time $t_3$, the output $V_2$ of the downstream $O_2$ sensor 15 becomes completely high as illustrated in FIGS. 28C, 28D, and 28E. Also, note that FIGS. 28C, 28D, and 28E show the cases wherein the degree of deterioration of the catalysts is small, medium, and large, respectively.

At a time $t_3$, when CNT>k is satisfied, the control at step 2703 proceeds to step 2705, thereby forcibly making the air-fuel ratio rich. That is, at step 2705, the air-fuel ratio correction amount FAF1 is calculated by $$FAF1 \leftarrow FAFAV + A.$$

At step 2506, a timer counter CB is counted up by +1. Then at step 2707, an A/D conversion is performed upon the output $V_2$ of the downstream $O_2$ sensor 15, and at step 2708, it is determined whether or not $V_2 > V_{R2}$ (rich) is satisfied. That is, the counter CB is used for counting a transition time from time $t_3$ to time $t_4$ ($t_4'$, $t_4''$) when the downstream air-fuel ratio is switched from the lean side to the rich side.

As a result, at a time $t_4$ ($t_4'$, $t_4''$), the control at step 2708 proceeds to step 2709, which determines whether or not CB<CB0 is satisfied. Only when CB<CB0 are the catalysts determined to be deteriorated, so that the control proceeds to step 2710 which sets "1" in the deterioration diagnosis flag XDIAG. Then, at 271), the deterioration flag XDIAG is stored in the backup RAM 106, and at step 2712, the alarm 18 is activated.

Then, at step 2713, the counters CNT and CA are cleared, and the routine of FIG. 27 is completed by step 2715.

As illustrated in FIGS. 28C, 28D, and 28E, the values CB1, CB1, and CB3 of the counter CB show the time from a fully $O_2$ storage state of the catalysts ($t_3$) to a completely $O_2$ empty state ($t_4$, $t_4'$, $t_4''$), and accordingly, the values CB1, CB2, and CB3 of the counter CB show the degree of deterioration of the catalysts. For example, the threshold value CB0 at step 2709 is a value between CB1 and CB2.

Figure 29A:
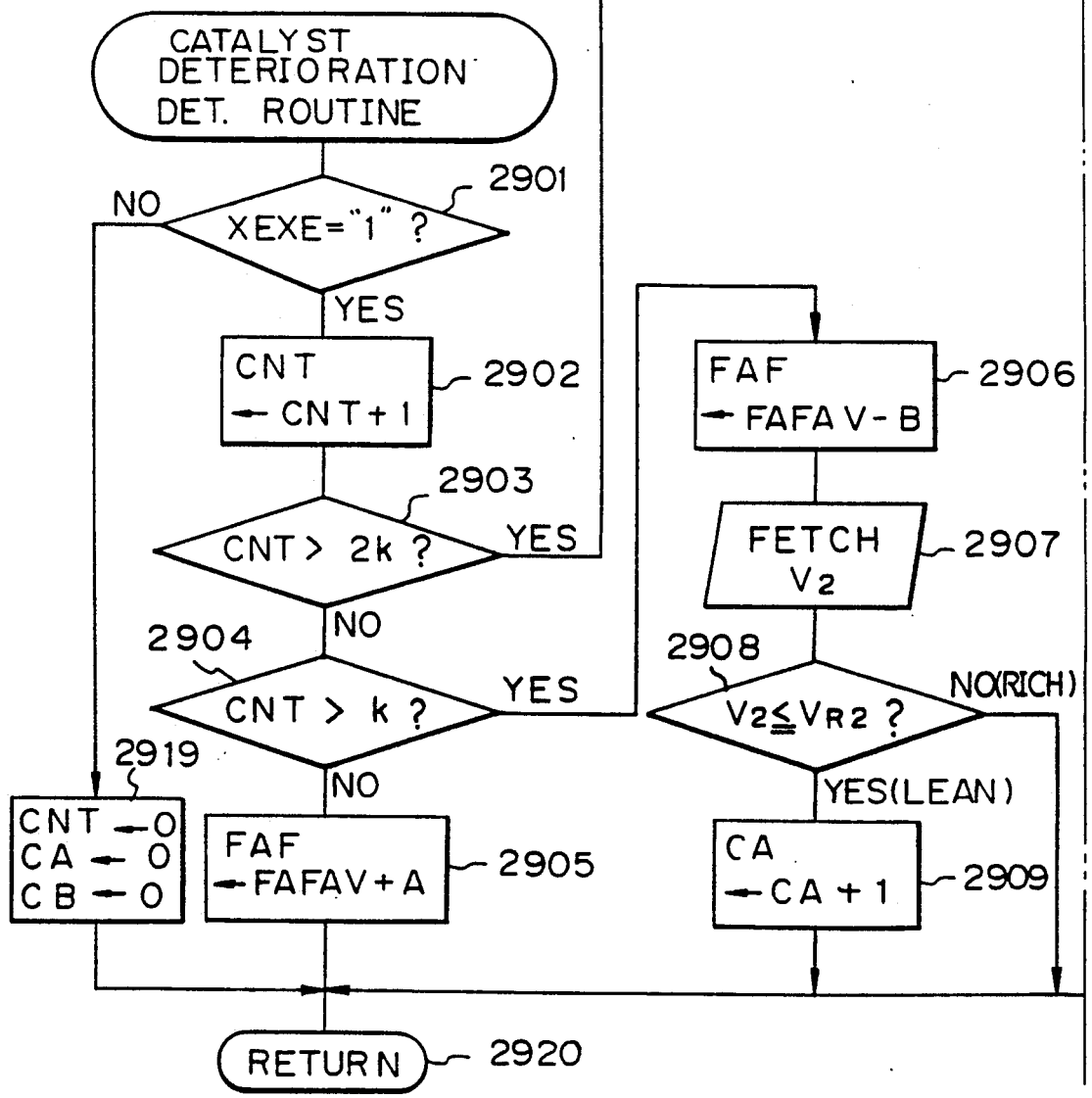
Figure 29B:
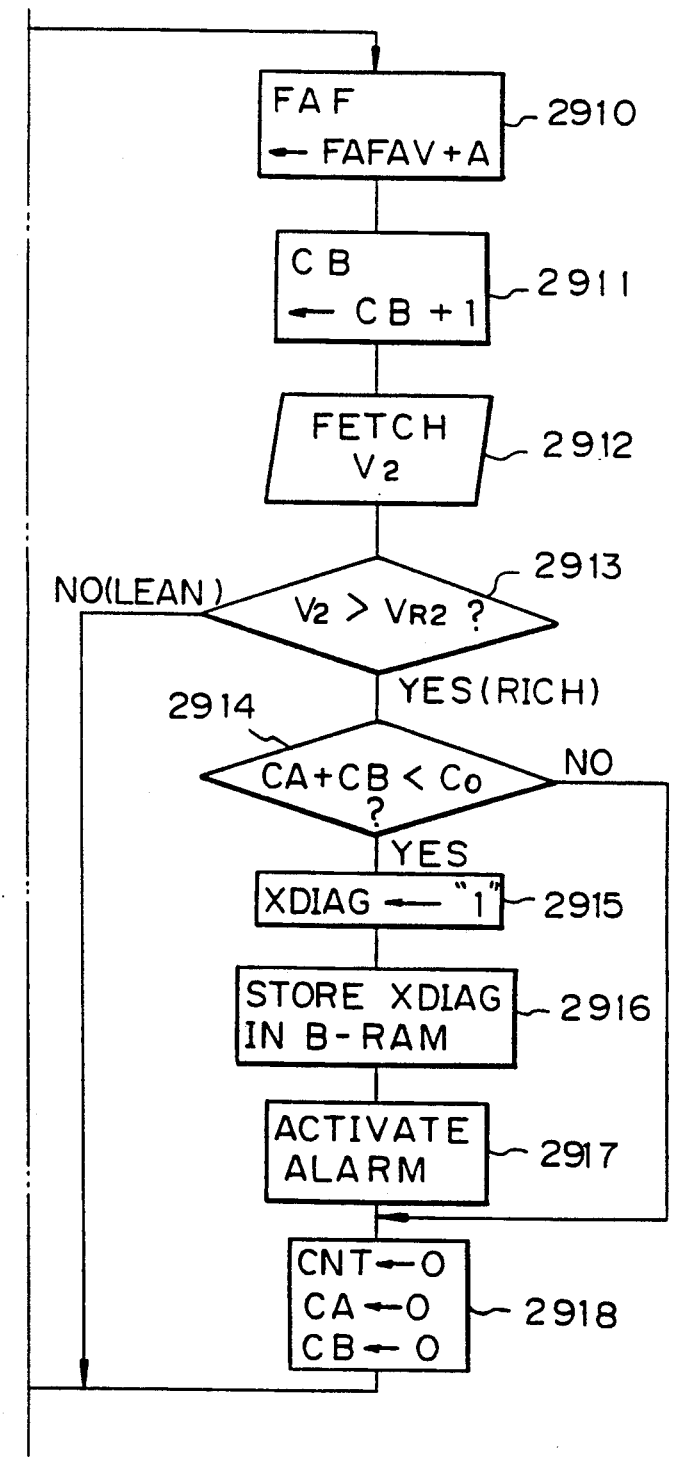

FIG. 29 is a seventh routine for the determination of a deterioration of the catalysts executed at a predetermined time such as 4 ms. In FIG. 29, the routine of FIG. 25 is combined with the routine of FIG. 27. That is, the air-fuel ratio is first forcibly made rich, and then the air-fuel ratio is forcibly made lean, thereby counting a transition time CA from a rich state to a lean state. Further, the air-fuel ratio is again forcibly made rich, thereby counting a transition time CB from a lean state to a rich state. Then, a determination of the deterioration of the catalysts is carried out by a sum of the two transition times TA and TB.

The routine of FIG. 29 is explained with reference to timing diagrams illustrated in FIGS. 30A through 30E.

Before a time $t_1$, as illustrated in FIG. 30A, since the execution flag XEXE is "0", the control at step 2901 proceeds to step 2919 which clears counters CNT, CA, and CB, and then proceeds to step 2919. In this state, the air-fuel ratio feedback control by the upstream $O_2$ sensor 13 is carried out as illustrated in FIG. 30B, and the air-fuel ratio feedback control by the downstream $O_2$ sensor 15 may be carried out as illustrated in FIGS. 30C, 30D, 30E.

At the time $t_1$, when the execution flag XEXE is switched from "0" to "1", the control at step 2901 proceeds to steps 2902 through 2905, thereby forcibly making the air-fuel ratio rich for a time of from $t_2$ to $t_3$ defined by $CNT = k$, as illustrated in FIG. 30B. That is, at step 2902, the value of the counter CNT is counted up by $+1$, and at step 2903, it is determined whether or not $CNT > 2 k$ is satisfied. Also, at step 2904, it is determined whether $CNT > k$ is satisfied. Then, at step 2905, the air-fuel ratio correction amount FAF1 is calculated by $$FAF1 \leftarrow FAFAV + A$$

Thus, such a rich state wherein $FAF1 = FAFAV + A$ is maintained for a time ($CNT = k$) long enough to expel oxygen from the catalysts of the catalyst converter 12. As a result, at a time $t_3$, the output $V_2$ of the downstream-side $O_2$ sensor 15 becomes completely high as illustrated in FIGS. 30C, 30D, and 30E. Also, note that FIGS. 30C, 30D, and 30E show the cases wherein the degree of deterioration of the catalysts is small, medium, and large, respectively.

For a time of from $t_3$ to $t_5$ ($k < CNT \leq 2 k$), the control at step 2904 proceeds to steps 2906 through 2909, thereby forcibly making the air-fuel ratio lean. That is, at step 2906, the air-fuel ratio correction amount FAF1 is calculated by $$FAF1 \leftarrow FAFAV - B.$$

At step 2907, an A/D conversion is performed upon the output $V_2$ of the downstream $O_2$ sensor 15, and at step 2508, it is determined whether or not $V_2 \leq V_{R2}$ (lean) is satisfied. Then, if $V_2 \leq V_{R2}$, at step 2909, a timer counter CA is counted up. That is, the counter CA is used for counting a transition time from the time $t_3$ to the time $t_4$ ($t_4'$, $t_4''$) when the downstream air-fuel ratio is switched from the rich side to the lean side.

Note that, at a time $t_5$ when the value of the counter CNT reaches 2 k, oxygen is fully stored in the catalysts of the catalyst converter 12, and accordingly, the output $V_2$ of the downstream $O_2$ sensor 15 is sufficiently low as illustrated in FIGS. 30C, 30D, and 30E.

After the time $t_5$, since $CNT > 2 k$, the control at step 2903 proceeds to steps 2910 through 2917, thereby forcibly making the air-fuel ratio rich. That is, at step 2910, the air-fuel ratio correction amount FAF1 is calculated by $$FAF1 \leftarrow FAFAV + A.$$

At step 2911, a timer counter CB is counted up by $+1$. Then at step 2912, an A/D conversion is performed upon the output $V_2$ of the downstream $O_2$ sensor 15, and at step 2913, it is determined whether or not $V_2 > V_{R2}$ (rich) is satisfied. That is, the counter CB is used for counting a transition time from a time $t_5$ to a time $t_6$ ($t_6'$, $t_6''$) when the downstream air-fuel ratio is switched from the lean side to the rich side.

As a result, at a time $t_6$ ($t_6'$, $t_6''$), the control at step 2913 proceeds to step 2914 which determines whether or not $CA + CB < C_0$ is satisfied. Only when $CA + CB < C_0$ are the catalysts determined to be deteriorated, so that the control proceeds to step 2915 which sets "1" in the deterioration diagnosis flag XDIAG. Then, at 2916, the deterioration flag XDIAG is stored in the backup RAM 106, and at step 2917, the alarm 18 is activated.

Then, at step 2918, the counters CNT, CA, and CB are cleared, and the routine of FIG. 29 is completed by step 2920.

In the routine of FIG. 29, the value of the counter CA shows a transition time of the catalysts from a completely $O_2$ empty state to a full $O_2$ storage state, and the value of the counter CB shows a transition time of the catalysts from a full $O_2$ storage state to a completely $O_2$ empty state. Therefore, the sum of CA and CB represents the degree of deterioration of the catalysts with a high accuracy. As illustrated in FIGS. 30C, 30D, and 30E, the sums $CA1 + CB1$, $CA2 + CB2$, and $CA3 + CB3$ are gradually decreased, and therefore, the threshold value $C_0$ at step 2914 is a value between $CA1 + CB1$ and $CA2 + CB2$.

Note that, in the above-mentioned embodiments, if the catalysts are determined to be deteriorated, it is possible to prohibit the air-fuel ratio feedback control by the downstream $O_2$ sensor 15, thus avoiding an adverse affect on the emission characteristics.

Note that the first air-fuel ratio feedback control by the upstream $O_2$ sensor 13 is carried out at a predetermined relatively short interval, such as 4 ms, and the second air-fuel ratio feedback control by the downstream $O_2$ sensor 15 is carried out at a predetermined relatively long interval, such as 1 s. That is because the upstream $O_2$ sensor 13 has good response characteristics compared with the downstream $O_2$ sensor 15.

Further, the present invention can be applied to a double $O_2$ sensor system in which other air-fuel ratio feedback control parameters, such as the integration amounts KIR and KIL, the delay times TDR and TDL, or the reference voltage $V_{R1}$, are variable.

Still further, a Karman vortex sensor, a heat-wire type flow sensor, and the like can be used instead of the airflow meter.

Although in the above-mentioned embodiments, a fuel injection amount is calculated on the basis of the intake air amount and the engine speed, it can be also calculated on the basis of the intake air pressure and the engine speed, or the throttle opening and the engine speed.

Further, the present invention can be also applied to a carburetor type internal combustion engine is which the air-fuel ratio is controlled by an electric air control value (EACV) for adjusting the intake air amount; by an electric bleed air control valve for adjusting the air bleed amount supplied to a main passage and a slow passage; or by adjusting the secondary air amount introduced into the exhaust system. In this case, the base fuel injection amount corresponding to TAUP at step 902 of FIG. 9 or at step 1102 of FIG. 11 is determined by the carburetor itself, i.e., the intake air negative pressure and the engine speed, and the air amount corresponding to TAU is calculated at step 906 of FIG. 9 or at step 1106 of FIG. 11.

Further, a CO sensor, a lean-mixture sensor or the like can be also used instead of the $O_2$ sensor. Particularly, when a $TiO_2$ sensor is used as the upstream $O_2$ sensor, the control response can be improved, thus avoiding overcorrection by the downstream $O_2$ sensor.

As explained above, according to the present invention, a determination of a deterioration of the three-way reducing oxidizing catalysts can be accurately carried out.

We claim:

1. A method of determining a state of deterioration of a three-way catalyst converter for removing pollutants in the exhaust gas of an internal combustion engine having an air-fuel ratio sensor disposed downstream of said three-way catalyst converter, for detecting a specific component in the exhaust gas, comprising the steps of:

determining whether or not said engine is switched from a stoichiometric air-fuel ratio driving state to a rich air-fuel ratio driving state;

determining whether or not the output of said downstream air-fuel ratio sensor is switched from a lean state to a rich state;

counting a time from a timing when said engine is switched from the stoichiometric air-fuel ratio driving state to the rich air-fuel ratio driving state to a timing when the output of said downstream air-fuel ratio sensor is switched from the lean state to the rich state; and determining whether or not said time is shorter than a predetermined time, thereby determining that said three-way catalyst converter is deteriorated when said time is shorter than said predetermined time.

2. A method of determining a state of deterioration of a three-way catalyst converter for removing pollutants in the exhaust gas of an internal combustion engine having an air-fuel ratio sensor disposed downstream of said three-way catalyst converter, for detecting a specific component in the exhaust gas, comprising the steps of:

determining whether or not said engine is switched from a stoichiometric air-fuel ratio driving state to a lean air-fuel ratio driving state;

determining whether or not the output of said downstream air-fuel ratio sensor is switched from a rich state to a lean state;

counting a time from a timing when said engine is switched from the stoichiometric air-fuel ratio driving state to the lean air-fuel ratio driving state to a timing when the output of said downstream air-fuel ratio sensor is switched from the rich state to the lean state; and determining whether or not said time is shorter than a predetermined time, thereby determining that said three-way catalyst converter is deteriorated when said time is shorter than said predetermined time.

3. A method of determining a state of deterioration of a three-way catalyst converter for removing pollutants in the exhaust gas of an internal combustion engine having an air-fuel ratio sensor disposed downstream of said three-way catalyst converter, for detecting a specific component in the exhaust gas, comprising the steps of:

determining whether or not said engine is switched from a stoichiometric air-fuel ratio driving state to a rich air-fuel ratio driving state;

determining whether or not the output of said downstream air-fuel ratio sensor is switched from a lean state to a rich state;

counting a first time from a timing when said engine is switched from the stoichiometric air-fuel ratio driving state to the rich air-fuel ratio driving state to a timing when the output of said downstream air-fuel ratio sensor is switched from the lean state to the rich state;

determining whether or not said engine is switched from the stoichiometric air-fuel ratio driving state to a lean air-fuel ratio driving state;

determining whether or not the output of said downstream air-fuel ratio sensor is switched from a rich state to a lean state;

counting a second time from a timing when said engine is switched from the stoichiometric air-fuel ratio driving state to the lean air-fuel ratio driving state to a timing when the output of said downstream air-fuel ratio sensor is switched from the rich state to the lean state; and determining whether or not a sum of said first time and said second time is shorter than a predetermined time, thereby determining that said three-way catalyst converter is deteriorated when the sum of said first time and said second time is shorter than said predetermined time.

4. A method of determining a state of deterioration of a three-way catalyst converter for removing pollutants in the exhaust gas of an internal combustion engine having an air-fuel ratio sensor disposed downstream of said three-way catalyst converter, for detecting a specific component in the exhaust gas, comprising the steps of:

determining whether or not said engine is switched from a lean air-fuel ratio driving state to a stoichiometric air-fuel ratio driving state or a rich air-fuel ratio driving state;

determining whether or not the output of said downstream air-fuel ratio sensor is switched from a lean state to a rich state;

counting a time from a timing when said engine is switched from the lean air-fuel ratio to the stoichiometric air-fuel ratio driving state or the rich air-fuel ratio driving state to a timing when the output of said downstream air-fuel ratio sensor is switched from the lean state to the rich state; and determining whether or not said time is shorter than a predetermined time, thereby determining that said three-way catalyst converter is deteriorated when said time is shorter than said predetermined time.

5. A method of determining a state of deterioration of a three-way catalyst converter for removing pollutants in the exhaust gas of an internal combustion engine having an air-fuel ratio sensor disposed downstream of said three-way catalyst converter, for detecting a specific component in the exhaust gas, comprising the steps of:

determining whether or not said engine is switched from a rich air-fuel ratio driving state to a stoichiometric air-fuel ratio driving state or a lean air-fuel ratio driving state;

determining whether or not the output of said downstream air-fuel ratio sensor is switched from a rich state to a lean state;

counting a time from a timing when said engine is switched from the rich air-fuel ratio driving state to the stoichiometric air-fuel ratio driving state or the lean air-fuel ratio driving state to a timing when the output of said downstream air-fuel ratio sensor is switched from the rich state to the lean state; and determining whether or not said time is shorter than a predetermined time, thereby determining that said three-way catalyst converter is deteriorated when said time is shorter than said predetermined time.

6. A method of determining a state of deterioration of a three-way catalyst converter for removing pollutants in the exhaust gas of an internal combustion engine having an air-fuel ratio sensor disposed downstream of said three-way catalyst converter, for detecting a specific component in the exhaust gas, comprising the steps of:

determining whether or not said engine is switched from a lean air-fuel ratio driving state to a stoichiometric air-fuel ratio driving state or a rich air-fuel ratio driving state;

determining whether or not the output of said downstream air-fuel ratio sensor is switched from a lean state to a rich state;

counting a first time from a timing when said engine is switched from the lean air-fuel ratio driving state to the stoichiometric air-fuel ratio driving state or the rich air-fuel ratio driving state to a timing when the output of said downstream air-fuel ratio sensor is switched from the lean state to the rich state;

determining whether or not said engine is switched from the rich air-fuel ratio driving state to the stoichiometric air-fuel ratio driving state or a lean air-fuel ratio driving state;

determining whether or not the output of said downstream air-fuel ratio sensor is switched from a rich state to a lean state;

counting a second time from a timing when said engine is switched from the rich air-fuel ratio driving state or the lean air-fuel ratio driving state to a timing when the output of said downstream air-fuel ratio sensor is switched from the rich state to the lean state; and determining whether or not a sum of said first time and said second time is shorter than a predetermine time, thereby determining that said three-way catalyst converter is deteriorated when the sum of said first time and said second time is shorter than said predetermined time.

7. A method of determining a state of deterioration of a three-way catalyst converter for removing pollutants in the exhaust gas of an internal combustion engine having an air-fuel ratio sensor disposed downstream of said three-way catalyst converter, for detecting a specific component in the exhaust gas, comprising the steps of:

determining whether or not said engine is in a predetermined driving state;

forcibly making the air-fuel ratio of said engine rich and thereafter forcibly making the air-fuel ratio of said engine lean, when said engine is in said predetermined driving state;

determining whether or not the output of said downstream air-fuel ratio sensor is switched from a rich state to a lean state;

counting a time from a timing when the air-fuel ratio of said engine is forcibly switched from the rich state to the lean state to a timing when the output of said downstream air-fuel ratio sensor is switched from the rich state to the lean state; and determining whether or not said time is shorter than a predetermined time, thereby determining that said three-way catalyst converter is deteriorated when said time is shorter than said predetermined time.

8. A method of determining a state of deterioration of a three-way catalyst converter for removing pollutants in the exhaust gas of an internal combustion engine having an air-fuel ratio sensor disposed downstream of said three-way catalyst converter, for detecting a specific component in the exhaust gas, comprising the steps of:

determining whether or not said engine is in a predetermined driving state;

forcibly making the air-fuel ratio of said engine lean and thereafter forcibly making the air-fuel ratio of said engine rich, when said engine is in said predetermined driving state;

determining whether or not the output of said downstream air-fuel ratio sensor is switched from a lean state to a rich state;

counting a time from a timing when the air-fuel ratio of said engine is forcibly switched from the lean state to the rich state to a timing when the output of said downstream air-fuel ratio sensor is switched from lean state to the rich state; and determining whether or not said time is shorter than a predetermined time, thereby determining that said three-way catalyst converter is deteriorated when said time is shorter than said predetermined time.

9. A method of determining a state of deterioration of a three-way catalyst converter for removing pollutants in the exhaust gas of an internal combustion engine having an air-fuel ratio sensor disposed downstream of said three-way catalyst converter, for detecting a specific component in the exhaust gas, comprising the steps of:

determining whether or not said engine is in a predetermined driving state;

forcibly making the air-fuel ratio of said engine rich and thereafter forcibly making the air-fuel ratio of said engine lean, when said engine is in said predetermined driving state;

determining whether or not the output of said downstream air-fuel ratio sensor is switched from a rich state to a lean state;

counting a first time from a timing when the air-fuel ratio of said engine is forcibly switched from the rich state to the lean state to a timing when the output of said downstream air-fuel ratio sensor is switched from the rich state to the lean state;

forcibly making the air-fuel ratio of said engine lean and thereafter forcibly making the air-fuel ratio of said engine rich, when said engine is in said predetermined driving state;

determining whether or not the output of said downstream air-fuel ratio sensor is switched from a lean state to a rich state;

counting a second time from a timing when the air-fuel ratio of said engine is forcibly switched from the lean state to the rich state to a timing when the output of said downstream air-fuel ratio sensor is switched from the lean state to the rich state; and determining whether or not a sum of said first time and said second time is shorter than a predetermined time;

thereby determining that said three-way catalyst converter is deteriorated when the sum of said first time and said second time is shorter than said predetermined time.

10. A method of determining a state of deterioration of a three-way catalyst converter for removing pollutants in the exhaust gas of an internal combustion engine having upstream and downstream air-fuel ratio sensors disposed upstream and downstream, respectively, of said three-way catalyst converter, for detecting a specific component in the exhaust gas, comprising the steps of:

estimating a full $O_2$ storage amount in said three-way catalyst converter; and determining whether or not said estimated full $O_2$ storage amount is smaller than a predetermined amount, thereby determining that said three-way catalyst converter is deteriorated, when said estimated full $O_2$ storage is smaller than said predetermined amount;

calculating a first air-fuel ratio correction amount in accordance with the output of said upstream air-fuel ratio sensor; and calculating a second air-fuel ratio correction amount in accordance with the output of said downstream air-fuel ratio sensor, thereby adjusting said actual air-fuel ratio in accordance with said first and second air-fuel ratio correction amounts.

11. A method of determining a state of deterioration of a three-way catalyst converter for removing pollutants in the exhaust gas of an internal combustion engine having upstream and downstream air-fuel ratio sensors disposed upstream and downstream, respectively, of said three-way catalyst converter, for detecting a specific component in the exhaust gas, comprising the steps of:

estimating a full $O_2$ storage amount in said three-way catalyst converter; and determining whether or not said estimated full $O_2$ storage amount is smaller than a predetermined amount, thereby determining that said three-way catalyst converter is deteriorated, when said estimated full $O_2$ storage is smaller than said predetermined amount;

calculating an air-fuel ratio feedback control parameter in accordance with the output of said downstream air-fuel ratio sensor; and calculating an air-fuel ratio correction amount in accordance with the output of said upstream air-fuel ratio sensor and said air-fuel ratio feedback control parameter, thereby adjusting said actual air-fuel ratio in accordance with said air-fuel ratio correction amount.

12. A method as set forth in claim 11, wherein said air-fuel ratio feedback control parameter is defined by a lean skip amount by which said air-fuel ratio correction amount is skipped down when the output of said upstream air-fuel ratio sensor is switched from the lean side to the rich side and a rich skip amount by which said air-fuel ratio correction amount is skipped up when the output of said upstream air-fuel ratio sensor is switched from the rich side to the lean side.

13. A method as set forth in claim 12, wherein said air-fuel ratio feedback control parameter is defined by a lean integration amount by which said air-fuel ratio correction amount is gradually decreased when the output of said upstream air-fuel ratio sensor is on the rich side and a rich integration amount by which said air-fuel ratio correction amount is gradually increased when the output of said upstream air-fuel ratio sensor is on the lean side.

14. A method as set forth in claim 11, wherein said air-fuel ratio feedback control parameter is determined by a rich delay time for delaying the output of said upstream air-fuel ratio sensor switched from the lean side to the rich side and a lean delay time for delaying the output of said upstream air-fuel ratio sensor switched from the rich side to the lean side.

15. A method as set forth in claim 11, wherein said air-fuel ratio feedback control parameter is determined by a reference voltage with which the output of said upstream air-fuel ratio sensor is compared, thereby determining whether the air-fuel ratio is on the rich side or on the lean side.

16. An apparatus for determining a state of deterioration of a three-way catalyst converter for removing pollutants in the exhaust gas of an internal combustion engine having a downstream air-fuel ratio sensor disposed downstream of said catalyst converter, for detecting a specific component in the exhaust gas, comprising:

means for estimating a full $O_2$ storage amount in said three-way catalyst converter; and means for determining whether or not said estimated full $O_2$ storage amount is smaller than a predetermined amount, thereby determining that said three-way catalyst converter is deteriorated, when said estimated full $O_2$ storage is smaller than said predetermined amount, wherein said full $O_2$ storage amount estimating means comprises:

means for determining whether or not said engine is switched from a stoichiometric air-fuel ratio driving state to a rich air-fuel ratio driving state;

means for determining whether or not the output of said downstream air-fuel ratio sensor is switched from a lean state to a rich state; and means for counting a time from a timing when said engine is switched from the stoichiometric air-fuel ratio driving state to the rich air-fuel ratio driving state to a timing when the output of said downstream air-fuel ratio sensor is switched from the lean state to the rich state, said time corresponding to said estimated full $O_2$ storage amount.

17. An apparatus for determining a state of deterioration of a three-way catalyst converter for removing pollutants in the exhaust gas of an internal combustion engine having a downstream air-fuel ratio sensor disposed downstream of said catalyst converter, for detecting a specific component in the exhaust gas, comprising:

means for estimating a full $O_2$ storage amount in said three-way catalyst converter; and means for determining whether or not said estimated full $O_2$ storage amount is smaller than a predetermined amount, thereby determining that said three-way catalyst converter is deteriorated, when said estimated full $O_2$ storage is smaller than said predetermined amount, wherein said full $O_2$ storage amount estimating means comprises:

means for determining whether or not said engine is switched from a stoichiometric air-fuel ratio driving state to a lean air-fuel ratio driving state;

means for determining whether or not the output of said downstream air-fuel ratio sensor is switched from a rich state to a lean state; and means for counting a time from a timing when said engine is switched from the stoichiometric air-fuel ratio driving state to the lean air-fuel ratio driving state to a timing when the output of said downstream air-fuel ratio sensor is switched from the rich state to the lean state, said time corresponding to said estimated full $O_2$ storage amount.

18. An apparatus for determining a state of deterioration of a three-way catalyst converter for removing pollutants in the exhaust gas of an internal combustion engine having a downstream air-fuel ratio sensor disposed downstream of said catalyst converter, for detecting a specific component in the exhaust gas, comprising:

means for estimating a full $O_2$ storage amount in said three-way catalyst converter; and means for determining whether or not said estimated full $O_2$ storage amount is smaller than a predetermined amount, thereby determining that said three-way catalyst converter is deteriorated, when said estimated full $O_2$ storage is smaller than said predetermined amount, wherein said full $O_2$ storage amount estimating means comprises:

means for determining whether or not said engine is switched from a stoichiometric air-fuel ratio driving state to a lean air-fuel ratio driving state;

means for determining whether or not the output of said downstream air-fuel ratio sensor is switched from a lean state to a rich state; and means for counting a first time from a timing when said engine is switched from the stoichiometric air-fuel ratio driving state to the rich air-fuel ratio driving state to a timing when the output of said downstream air-fuel ratio sensor is switched from the lean state to the rich state, means for determining whether or not said engine is switched from stoichiometric air-fuel ratio driving state to a lean air-fuel ratio driving state;

means for determining whether or not the output of said downstream air-fuel ratio sensor is switched from a rich state to a lean state; and means for counting a second time from a timing when said engine is switched from the stoichiometric air-fuel ratio driving state to the lean air-fuel ratio driving state to a timing when the output of said downstream air-fuel ratio sensor is switched from the rich state to the lean state, a sum of said first time and said second time corresponding to said estimated full $O_2$ storage amount.

19. An apparatus for determining a state of deterioration of a three-way catalyst converter for removing pollutants in the exhaust gas of an internal combustion engine having a downstream air-fuel ratio sensor disposed downstream of said catalyst converter, for detecting a specific component in the exhaust gas, comprising:

means for estimating a full $O_2$ storage amount in said three-way catalyst converter; and means for determining whether or not said estimated full $O_2$ storage amount is smaller than a predetermined amount, thereby determining that said three-way catalyst converter is deteriorated, when said estimated full $O_2$ storage is smaller than said predetermined amount, wherein said full $O_2$ storage amount estimating means comprises:

means for determining whether or not said engine is switched from a lean air-fuel ratio driving state to a stoichiometric air-fuel ratio driving state or a rich air-fuel ratio driving state;

means for counting a time from a timing when said engine is switched from the lean air-fuel ratio driving state to the stoichiometric air-fuel ratio driving state or the rich air-fuel ratio driving state to a timing when the output of said downstream air-fuel ratio sensor is switched from the lean state side to the rich state, said time corresponding to said estimated full $O_2$ storage amount.

20. An apparatus for determining a state of deterioration of a three-way catalyst converter for removing pollutants in the exhaust gas of an internal combustion engine having a downstream air-fuel ratio sensor disposed downstream of said catalyst converter, for detecting a specific component in the exhaust gas, comprising:

means for estimating a full $O_2$ storage amount in said three-way catalyst converter; and means for determining whether or not said estimated full $O_2$ storage amount is smaller than a predetermined amount, thereby determining that said three-way catalyst converter is deteriorated, when said estimated full $O_2$ storage is smaller than said predetermined amount, wherein said full $O_2$ storage amount estimating means comprises:

means for determining whether or not said engine is switched from a rich air-fuel ratio driving state to a stoichiometric air-fuel ratio driving state or a lean air-fuel ratio driving state;

means for determining whether or not the output of said downstream air-fuel sensor is switched from a rich state to a lean state; and means for counting a time from a timing when said engine is switched from the rich air-fuel ratio driving state to the stoichiometric air-fuel ratio driving state or the lean air-fuel ratio driving state to a timing when the output of said downstream-side air-fuel ratio sensor is switched from the rich state to the lean state, said time corresponding to said estimated full $O_2$ storage amount.

21. An apparatus for determining a state of deterioration of a three-way catalyst converter for removing pollutants in the exhaust gas of an internal combustion engine having a downstream air-fuel ratio sensor disposed downstream of said catalyst converter, for detecting a specific component in the exhaust gas, comprising:

means for estimating a full $O_2$ storage amount in said three-way catalyst converter; and means for determining whether or not said estimated full $O_2$ storage amount is smaller than a predetermined amount, thereby determining that said three-way catalyst converter is deteriorated, when said estimated full $O_2$ storage is smaller than said predetermined amount, wherein said full $O_2$ storage amount estimating means comprises:

means for determining whether or not said engine is switched from a lean air-fuel ratio driving state to a stoichiometric air-fuel ratio driving state or a rich air-fuel ratio driving state;

means for determining whether or not the output of said downstream air-fuel ratio sensor is switched from a lean state to a rich state;

means for counting a first time from a timing when said engine is switched from the lean air-fuel ratio driving sate to the stoichiometric air-fuel ratio driving state or the rich air-fuel ratio driving state to a timing when the output of said downstream air-fuel ratio sensor is switched from the lean state to the rich state;

means for determining whether or not said engine is switched from the rich air-fuel ratio driving state to the stoichiometric air-fuel ratio driving state or a lean air-fuel ratio driving state;

means for determining whether or not the output of said downstream air-fuel ratio sensor is switched from a rich state to a lean state; and means for counting a second time from a timing when said engine is switched from the rich air-fuel ratio driving state to the stoichiometric air-fuel ratio driving state or the lean air-fuel ratio driving state to a timing when the output of said downstream air-fuel ratio sensor is switched from the rich state to the lean state, a sum of said first time and said second time corresponding to said estimated full $O_2$ storage amount.

22. An apparatus for determining a state of deterioration of a three-way catalyst converter for removing pollutants in the exhaust gas of an internal combustion engine having a downstream air-fuel ratio sensor disposed downstream of said catalyst converter, for detecting a specific component in the exhaust gas, comprising:

means for estimating a full $O_2$ storage amount in said three-way catalyst converter; and means for determining whether or not said estimated full $O_2$ storage amount is smaller than a predetermined amount, thereby determining that said three-way catalyst converter is deteriorated, when said estimated full $O_2$ storage is smaller than said predetermined amount, wherein said full $O_2$ storage amount estimating means comprises:

means for determining whether or not said engine is in a predetermined driving state;

means for forcibly making the air-fuel ratio of said engine rich and thereafter forcibly making the air-fuel ratio of said engine lean, when said engine is in said predetermined driving state;

means for determining whether or not the output of said downstream air-fuel ratio sensor is switched from the rich state to the lean state;

means for counting a time from a timing when the air-fuel ratio of said engine is forcibly switched from the rich state to the lean state to a timing when the output of said downstream air-fuel ratio sensor is switched from the rich side to the lean side, and said time corresponding to said estimated full $O_2$ storage amount.

23. An apparatus for determining a state of deterioration of a three-way catalyst converter for removing pollutants in the exhaust gas of an internal combustion engine having a downstream air-fuel ratio sensor disposed downstream of said catalyst converter, for detecting a specific component in the exhaust gas, comprising:

means for estimating a full $O_2$ storage amount in said three-way catalyst converter; and means for determining whether or not said estimated full $O_2$ storage amount is smaller than a predetermined amount, thereby determining that said three-way catalyst converter is deteriorated, when said estimated full $O_2$ storage is smaller than said predetermined amount, wherein said full $O_2$ storage amount estimating means comprises:

means for determining whether or not said engine is in a predetermined driving state;

means for forcibly making the air-fuel ratio of said engine lean and thereafter forcibly making the air-fuel ratio of said engine rich, when said engine is in said predetermined driving state;

means for determining whether or not the output of said downstream air-fuel ratio sensor is switched from a lean state to a rich state; and means for counting a time from a timing when the air-fuel ratio of said engine is forcibly switched from the lean state to the rich state to a timing when the output of said downstream air-fuel ratio sensor is switched from the lean state to the rich state, said time corresponding to said estimated full $O_2$ storage amount.

24. An apparatus for determining a state of deterioration of a three-way catalyst converter for removing pollutants in the exhaust gas of an internal combustion engine having a downstream air-fuel ratio sensor disposed downstream of said catalyst converter, for detecting a specific component in the exhaust gas, comprising:

means for estimating a full $O_2$ storage amount in said three-way catalyst converter; and means for determining whether or not said estimated full $O_2$ storage amount is smaller than a predetermined amount, thereby determining that said three-way catalyst converter is deteriorated, when said estimated full $O_2$ storage is smaller than said predetermined amount, wherein said full $O_2$ storage amount estimating means comprises:

means for determining whether or not said engine is a predetermined driving state;

means for forcibly making the air-fuel ratio of said engine rich and thereafter forcibly making the air-fuel ratio of said engine lean, when said engine is in said predetermined driving state;

means for determining whether or not the output of said downstream air-fuel ratio sensor is switched from a rich state to a lean state;

means for counting a first time from a timing when the air-fuel ratio of said engine is forcibly switched from the rich state to the lean state to a timing when the output of said downstream air-fuel ratio sensor is switched from the rich state to the lean state;

means for forcibly making air-fuel ratio of said engine lean and thereafter forcibly making the air-fuel ratio of said engine rich, when said engine is in said predetermined driving state;

means for determining whether or not the output of said downstream air-fuel ratio sensor is switched from a lean state to a rich state; and means for counting a second time from a timing when the air-fuel ratio of said engine is forcibly switched from the lean state to the rich state to a timing when the output of said downstream air-fuel ratio sensor is switched from the lean state to the rich state;

a sum of said first time and said second time corresponding to said estimated full $O_2$ storage amount.

25. An apparatus for determining a state of deterioration of a three-way catalyst converter for removing pollutants in the exhaust gas of an internal combustion engine having upstream and downstream air-fuel ratio sensors disposed upstream and downstream, respectively, of said catalyst converter, for detecting a specific component in the exhaust gas, thereby adjusting an actual air-fuel ratio in accordance with the outputs of said upstream and downstream air-fuel ratio sensors, comprising:

means for estimating a full $O_2$ storage amount in said three-way catalyst converter; and means for determining whether or not said estimated full $O_2$ storage amount is smaller than a predetermined amount, thereby determining that said three-way catalyst converter is deteriorated, when said estimated full $O_2$ storage is smaller than said predetermined amount, means for calculating a first air-fuel ratio correction amount in accordance with the output of said upstream air-fuel ratio sensor; and means for calculating a second air-fuel ratio correction amount in accordance with the output of said downstream air-fuel ratio sensor, thereby adjusting said actual air-fuel ratio in accordance with said first and second air-fuel ratio correction amounts.

26. An apparatus for determining a state of deterioration of a three-way catalyst converter for removing pollutants in the exhaust gas of an internal combustion engine having upstream and downstream air-fuel ratio sensors disposed upstream and downstream, respectively, of said catalyst converter, for detecting a specific component in the exhaust gas, thereby adjusting an actual air-fuel ratio in accordance with the outputs of said upstream and downstream air-fuel ratio sensors, comprising:

means for estimating a full $O_2$ storage amount in said three-way catalyst converter; and means for determining whether or not said estimated full $O_2$ storage amount is smaller than a predetermined amount, thereby determining that said three-way catalyst converter is deteriorated, when said estimated full $O_2$ storage is smaller than said predetermined amount, means for calculating an air-fuel ratio feedback control parameter in accordance with the output of said downstream air-fuel ratio sensor; and means for calculating an air-fuel ratio correction amount in accordance with the output of said upstream air-fuel ratio sensor and said air-fuel ratio feedback control parameter, thereby adjusting said actual air-fuel ratio in accordance with said air-fuel ratio correction amount.

27. An apparatus as set for in claim 26, wherein said air-fuel ratio feedback control parameter is defined by a lean skip amount by which said air-fuel ratio correction amount is skipped down when the output of said upstream-side air-fuel ratio sensor is switched from the lean side to the rich side and a rich skip amount is skipped up when the output of said upstream air-fuel ratio sensor is switched from the rich side to the lean side.

28. An apparatus as set for in claim 26, wherein said air-fuel ratio feedback control parameter is defined by a lean integration amount by which said air-fuel ratio correction amount is gradually decreased when the output of said upstream air-fuel ratio sensor is on the rich side and a rich integration amount by which said air-fuel ratio correction amount is gradually increased when the output of said upstream air-fuel ratio sensor is on the lean side.

29. An apparatus as set for in claim 26, wherein said air-fuel ratio feedback control parameter is defined by a rich delay time for delaying the output of said upstream air-fuel ratio sensor switched from the lean side to the rich side and a lean delay time for delaying the output of said upstream air-fuel ratio sensor switched from the rich side to the leans side.

30. An apparatus as set for in claim 26, wherein said air-fuel ratio feedback control parameter is defined by a reference voltage with which the output of said upstream air-fuel ratio sensor is compared, thereby determining whether the air-fuel ratio is on the rich side or on the lean side.

31. A method of determining a state of deterioration of a three-way catalyst converter for removing pollutants in the exhaust gas of an internal combustion engine having an air-fuel ratio sensor disposed downstream of said three-way catalyst converter, for detecting a specific component in the exhaust gas to generate an air-fuel ratio signal indicating the air-fuel ratio downstream of said three-way catalyst converter, comprising the steps of:

detecting a first state wherein the air-fuel ratio signal of said air-fuel ratio sensor indicates a lean state with respect to the stoichiometric air-fuel ratio when an engine is in a driving state for the stoichiometric air-fuel ratio or a lean air-fuel ratio with respect to the stoichiometric air-fuel ratio;

detecting a second state wherein said engine is in a driving state for a rich air-fuel ratio with respect to the stoichiometric air-fuel ratio and the first air-fuel ratio signal of said downstream-side air-fuel ratio sensor indicates a rich state with respect to the stoichiometric air-fuel ratio;

counting a time from a timing when said second state is detected after said first state is detected, to a timing when the air-fuel ratio signal of said air-fuel ratio sensor indicates a rich state with respect to the stoichiometric air-fuel ratio;

thereby determining that said three-way catalyst converter is deteriorated, when said time is shorter than a predetermined time.

32. A method of determining a state of deterioration of a three-way catalyst converter for removing pollutants in the exhaust gas of an internal combustion engine having an upstream air-fuel ratio sensor disposed downstream of said three-way catalyst converter, for detecting a specific component in the exhaust gas to generate an air-fuel ratio signal indicating the air-fuel ratio upstream of said three-way catalyst converter and having a downstream air-fuel ratio sensor disposed downstream of said three-way catalyst converter, for detecting a specific component in the exhaust gas to generate a second air-fuel ratio signal indicating the air-fuel ratio downstream of said three-way catalyst converter, comprising the steps of:

detecting a first state wherein the second air-fuel ratio signal of said downstream air-fuel ratio sensor indicates a lean state with respect to the stoichiometric air-fuel ratio when an engine is in a driving state for the stoichiometric air-fuel ratio or a lean air-fuel ratio with respect to the stoichiometric air-fuel ratio;

detecting a second state wherein said engine is in a driving state for a rich air-fuel ratio with respect to the stoichiometric air-fuel ratio;

counting a time from a timing when said second state is detected after said first state is detected, to a timing when both of the first and second air-fuel ratio signals of said upstream and downstream air-fuel ratio sensors indicate a rich state with respect to the stoichiometric air-fuel ratio;

thereby determining that said three-way catalyst converter is deteriorated, when said time is shorter than a predetermined time.

33. A method of determining a state of deterioration of a three-way catalyst converter for removing pollutants in the exhaust gas of an internal combustion engine having an air-fuel ratio sensor disposed downstream of said three-way catalyst converter, for detecting a specific component in the exhaust gas to generate an air-fuel ratio signal indicating the air-fuel ratio downstream of said three-way catalyst converter, comprising the steps of:

detecting a first state wherein the air-fuel ratio signal of said air-fuel ratio sensor indicates a lean state with respect to the stoichiometric air-fuel ratio when an engine is in a driving state for the stoichiometric air-fuel ratio or a rich air-fuel ratio with respect to the stoichiometric air-fuel ratio;

detecting a second state wherein said engine is in a driving state for a lean air-fuel ratio with respect to the stoichiometric air-fuel ratio; and counting a time from a timing when said second state is detected after said first state is detected, to a timing when the air-fuel ratio signal of said air-fuel ratio sensor indicates a lean state with respect to the stoichiometric air-fuel ratio;

thereby determining that said three-way catalyst converter is deteriorated, when said time is shorter than a predetermined time.

34. A method as set forth in claim 33, wherein said driving state for the stoichiometric air-fuel ratio or lean state with respect to the stoichiometric air-fuel ratio is a fuel cut-off state.

35. A method of determining a state of deterioration of a three-way catalyst converter for removing pollutants in the exhaust gas of an internal combustion engine having an upstream air-fuel ratio sensor disposed upstream of said three-way catalyst converter, for detecting a specific component in the exhaust gas to generate a first air-fuel ratio signal indicating the air-fuel ratio upstream of said three-way catalyst converter, and having a downstream air-fuel ratio sensor disposed downstream of said three-way catalyst converter, for detecting a specific component in the exhaust gas to generate a second air-fuel ratio signal indicating the air-fuel ratio downstream of said three-way catalyst converter, comprising the steps of:

detecting a first state wherein the second air-fuel ratio signal of said downstream air-fuel ratio sensor indicates a rich state with respect to the stoichiometric air-fuel ratio when the engine is in a driving state for the stoichiometric air-fuel ratio or a rich air-fuel ratio with respect to the stoichiometric air-fuel ratio;

detecting a second state wherein said engine is in a driving state for a lean air-fuel ratio with respect to the stoichiometric air-fuel ratio and the air-fuel ratio signal of said air-fuel ratio sensor indicates a lean state with respect to the stoichiometric air-fuel ratio; and counting a time from a timing when said second state is detected after said first state is detected, to a timing when both of the first and second the air-fuel ratio signals of said upstream and downstream air-fuel ratio sensors indicate a lean state with respect to the stoichiometric air-fuel ratio;

thereby determining that said three-way catalyst converter is deteriorated, when said time is shorter than a predetermined time.

36. A method as set forth in claim 35, wherein said driving state for the stoichiometric air-fuel ratio or lean state with respect to the stoichiometric air-fuel ratio is a fuel cut-off state.

37. A method of determining state of deterioration of a three-way catalyst converter for removing pollutants in the exhaust gas of an internal combustion engine having an downstream air-fuel ratio sensor disposed downstream of said three-way catalyst converter, for detecting a specific component in the exhaust gas to generate an air-fuel ratio signal indicating the air-fuel ratio downstream of said three-way catalyst converter, comprising the steps of:

detecting a first state wherein said engine is in a fuel cut-off state for a time longer than a first predetermined time;

detecting a second state wherein said engine is in a driving state for the stoichiometric air-fuel ratio; and counting a time from a timing when said second state is detected after said first state is detected, to a timing when the air-fuel ratio signal of said downstream air-fuel ratio sensor indicates a rich state with respect to the stoichiometric air-fuel ratio;

thereby determining that said three-way catalyst converter is deteriorated, when said time is shorter than a second predetermined time.

38. A method as set forth in claim 37, wherein said engine further has an upstream air-fuel ratio sensor disposed upstream of said three-way catalyst converter, for detecting a specific component in the exhaust gas to generate an air-fuel ratio signal indicating the air-fuel ratio upstream of said three-way catalyst converter, said method further comprising a step of determining whether or not said engine is in a driving state for an air-fuel ratio feedback control of the stoichiometric air-fuel ratio, the driving state for the stoichiometric air-fuel ratio being such that an actual air-fuel ratio is controlled in accordance with the air-fuel ratio signals of said upstream and downstream air-fuel ratio, so that the actual air-fuel ratio is close to the stoichiometric air-fuel ratio, when said engine is in a driving state for an air-fuel ratio feedback control of the stoichiometric air-fuel ratio.

39. A method of determining a state of deterioration of a three-way catalyst converter for removing pollutants in the exhaust gas of an internal combustion engine having an upstream air-fuel ratio sensor disposed upstream of said three-way catalyst converter, for detecting a specific component in the exhaust gas to generate a first air-fuel ratio signal indicating the air-fuel ratio upstream of said three-way catalyst converter, and having a downstream air-fuel ratio sensor disposed downstream of said three-way catalyst converter, for detecting a specific component in the exhaust gas to generate a second air-fuel ratio signal indicating the air-fuel ratio downstream of said three-way catalyst converter, comprising the steps of:

- calculating an air-fuel ratio correction amount in accordance with the air-fuel ratio signal of said upstream air-fuel ratio sensor so that the controlled air-fuel ratio is brought close to the stoichiometric air-fuel ratio;
- adjusting an actual air-fuel ratio in accordance with the air-fuel ratio correction amount;
- calculating a mean value of the air-fuel ratio correction amount;
- making the controlled air-fuel ratio rich with respect to the stoichiometric air-fuel ratio for a definite time by increasing the air-fuel ratio correction amount based upon the mean value thereof;
- making the controlled air-fuel ratio lean with respect to the stoichiometric air-fuel ratio by reducing the air-fuel ratio correction amount based upon the mean value thereof, after said definite time has passed;
- counting a time from a time when the controlled air-fuel ratio is switched from the rich state side to the lean state to a timing when the air-fuel ratio signal of said downstream air-fuel ratio sensor indicates a lean state with respect to the stoichiometric air-fuel ratio; and
- determining whether or not said time is shorter than a predetermined time,
- thereby determining that said three-way catalyst converter is deteriorated, when said time is shorter than said predetermined time.

40. A method of determining a state of deterioration of a three-way catalyst converter for removing pollutants in the exhaust gas of an internal combustion engine having an upstream air-fuel ratio sensor disposed upstream of said three-way catalyst converter, for detecting a specific component in the exhaust gas to generate a first air-fuel ratio signal indicating the air-fuel ratio upstream of said three-way catalyst converter, and having a downstream air-fuel ratio sensor disposed downstream of said three-way catalyst converter, for detecting a specific component in the exhaust gas to generate a second air-fuel ratio signal indicating the air-fuel ratio downstream of said three-way catalyst converter, comprising the steps of:

- calculating an air-fuel ratio correction amount in accordance with the air-fuel ratio signal of said upstream air-fuel ratio sensor so that the controlled air-fuel ratio is brought close to the stoichiometric air-fuel ratio;
- adjusting an actual air-fuel ratio in accordance with the air-fuel ratio correction amount;
- calculating a mean value of the air-fuel ratio correction amount;
- making the controlled air-fuel ratio lean with respect to the stoichiometric air-fuel ratio for a definite time by increasing the air-fuel ratio correction amount based upon the mean value thereof;
- making the controlled air-fuel ratio rich with respect to the stoichiometric air-fuel ratio by increasing the air-fuel ratio correction amount based upon the mean value thereof, after said definite time has passed;
- counting a time from a time when the controlled air-fuel ratio is switched from the lean state side to the rich state to a timing when the air-fuel ratio signal of said downstream air-fuel ratio sensor indicates a rich state with respect to the stoichiometric air-fuel ratio; and
- determining whether or not said time is shorter than a predetermined time,
- thereby determining that said three-way catalyst converter is deteriorated, when said time is shorter than said predetermined time.

41. A method of determining a state of deterioration of a three-way catalyst converter for removing pollutants in the exhaust gas of an internal combustion engine having an upstream air-fuel ratio sensor disposed upstream of said three-way catalyst converter, for detecting a specific component in the exhaust gas to generate a first air-fuel ratio signal indicating the air-fuel ratio upstream of said three-way catalyst converter, and having a downstream air-fuel ratio sensor disposed downstream of said three-way catalyst converter, for detecting a specific component in the exhaust gas to generate a second air-fuel ratio signal indicating the air-fuel ratio downstream of said three-way catalyst converter, comprising the steps of:

- calculating an air-fuel ratio correction amount in accordance with the air-fuel ratio signal of said upstream air-fuel ratio sensor so that the controlled air-fuel ratio is brought close to the stoichiometric air-fuel ratio;
- adjusting an actual air-fuel ratio in accordance with the air-fuel ratio correction amount;
- calculating a mean value of the air-fuel ratio correction amount;
- making the controlled air-fuel ratio rich with respect to the stoichiometric air-fuel ratio for a first definite time by increasing the air-fuel ratio correction amount based upon the mean value thereof;
- making the controlled air-fuel ratio lean with respect to the stoichiometric air-fuel ratio by increasing the air-fuel ratio correction amount based upon the mean value thereof, for a second definite time after said first definite time has passed;
- making the controlled air-fuel ratio rich with respect to the stoichiometric air-fuel ratio by increasing the air-fuel ratio correction based upon the mean thereof, after said second time has passed;
- counting a first time from a time when the controlled air-fuel ratio is switched from the rich state to the lean state to a timing when the air-fuel ratio signal of said downstream air-fuel ratio sensor indicates a lean state with respect to the stoichiometric air-fuel ratio;
- counting a second time from a time when the controlled air-fuel ratio is switched from the lean state to the rich state to a timing when the air-fuel ratio signal of said downstream air-fuel ratio sensor indicates a rich state with respect to the stoichiometric air-fuel ratio; and determining whether or not a sum of said first time and said second time is shorter than a predetermined time, thereby determining that said three-way catalyst converter is deteriorated, when said sum is shorter than said predetermined time.

42. A method of determining a state of deterioration of a three-way catalyst converter for removing pollutants in the exhaust gas of an internal combustion engine having an upstream air-fuel ratio sensor disposed upstream of said three-way catalyst converter, for detecting a specific component in the exhaust gas to generate a first air-fuel ratio signal indicating the air-fuel ratio upstream of said three-way catalyst converter, and having a downstream air-fuel ratio sensor disposed downstream of said three-way catalyst converter, for detecting a specific component in the exhaust gas to generate a second air-fuel ratio signal indicating the air-fuel ratio downstream of said three-way catalyst converter, comprising the steps of:

calculating an air-fuel ratio correction amount in accordance with the air-fuel ratio signal of said upstream air-fuel ratio sensor so that the controlled air-fuel ratio is brought close to the stoichiometric air-fuel ratio;

adjusting an actual air-fuel ratio in accordance with the air-fuel ratio correction amount;

calculating a mean value of the air-fuel ratio correction amount;

making the controlled air-fuel ratio lean with respect to the stoichiometric air-fuel ratio for a first definite time by increasing the air-fuel ratio correction amount based upon the mean value thereof;

making the controlled air-fuel ratio rich with by increasing the air-fuel ratio correction amount based upon the mean value thereof, for a second definite time after said first definite time has passed;

making the controlled air-fuel ratio lean with respect to the stoichiometric air-fuel ratio by reducing the air-fuel ratio correction based upon the mean thereof, after said second time has passed;

counting a first time from a time when the controlled air-fuel ratio is switched from the lean state to the rich state to a timing when the air-fuel ratio signal of said downstream air-fuel ratio sensor indicates a rich state with respect to the stoichiometric air-fuel ratio;

counting a second time from a time when the controlled air-fuel ratio is switched from the rich state to the lean state to a timing when the air-fuel ratio signal of said downstream air-fuel ratio sensor indicates a lean state with respect to the stoichiometric air-fuel ratio; and determining whether or not a sum of said first time and said second time is shorter than a predetermined time, thereby determining that said three-way catalyst converter is deteriorated, when said sum is shorter than said predetermined time.

43. An apparatus for determining a state of deterioration of a three-way catalyst converter for removing pollutants in the exhaust gas of an internal combustion engine comprising:

an air-fuel ratio sensor ratio sensor disposed downstream of said three-way catalyst converter, for detecting a specific component in the exhaust gas to generate an air-fuel ratio signal indicating the air-fuel ratio downstream of said three-way catalyst converter;

means for detecting a first state wherein the air-fuel ratio signal of said air-fuel ratio sensor indicates a lean state with respect to the stoichiometric air-fuel ratio when an engine is in a driving state for the stoichiometric air-fuel ratio or a lean air-fuel ratio with respect to the stoichiometric air-fuel ratio;

means for detecting a second state wherein said engine is in a driving state for a rich air-fuel ratio with respect to the stoichiometric air-fuel ratio and the first air-fuel ratio signal of said downstream-side air-fuel ratio sensor indicates a rich state with respect to the stoichiometric air-fuel ratio;

means for counting a time from a timing when said second state is detected after said first state is detected, to a timing when the air-fuel ratio signal of said air-fuel ratio sensor indicates a rich state with respect to the stoichiometric air-fuel ratio; and means for determining that said three-way catalyst converter is deteriorated, when said time is shorter than a predetermined time.

44. An apparatus for determining a state of deterioration of a three-way catalyst converter for removing pollutants in the exhaust gas of an internal combustion engine comprising:

an upstream air-fuel ratio sensor ratio sensor disposed upstream of said three-way catalyst converter, for detecting a specific component in the exhaust gas to generate an air-fuel ratio signal indicating the air-fuel ratio upstream of said three-way catalyst converter;

a downstream air-fuel ratio sensor disposed downstream of said three-way catalyst converter, for detecting a specific component in the exhaust gas to generate a second air-fuel ratio signal indicating the air-fuel ratio downstream of said three-way catalyst converter;

means for detecting a first state wherein the second air-fuel ratio signal of said downstream air-fuel ratio sensor indicates a lean state with respect to the stoichiometric air-fuel ratio when the engine is in a driving state for the stoichiometric air-fuel ratio or a lean air-fuel ratio with respect to the stoichiometric air-fuel ratio;

means for detecting a second state wherein said engine is in a driving state for a rich air-fuel ratio with respect to the stoichiometric air-fuel ratio;

means for counting a time from a timing when said second state is detected after said first state is detected, to a timing when both of the first and second air-fuel ratio signals of said upstream and downstream air-fuel ratio sensors indicate a rich state with respect to the stoichiometric air-fuel ratio; and means for determining that said three-way catalyst converter is deteriorated, when said time is shorter than a predetermined time.

45. An apparatus for determining a state of deterioration of a three-way catalyst converter for removing pollutants in the exhaust gas of an internal combustion engine comprising:

an air-fuel ratio sensor ratio sensor disposed downstream of said three-way catalyst converter, for detecting a specific component in the exhaust gas to generate an air-fuel ratio signal indicating the air-fuel ratio downstream of said three-way catalyst converter;

means for detecting a first state wherein the air-fuel ratio signal of said air-fuel ratio signal of said air-fuel ratio sensor indicates a rich state with respect to the stoichiometric air-fuel ratio when engine is in a driving state for the stoichiometric air-fuel ratio or a rich air-fuel ratio with respect to the stoichiometric air-fuel ratio;

means for detecting a second state wherein said engine is in a driving state for a lean air-fuel ratio with respect to the stoichiometric air-fuel ratio;

means for counting a time from a timing when said second state is detected after said first state is detected, to a timing when the air-fuel ratio signal of said air-fuel ratio sensor indicates a lean state with respect to the stoichiometric air-fuel ratio; and means for determining that said three-way catalyst converter is deteriorated, when said time is shorter than a predetermined time.

46. An apparatus set forth in claim 45, wherein said driving state for the stoichiometric air-fuel ratio or lean state with respect to the stoichiometric air-fuel ratio is a fuel cut-off state.

47. An apparatus for determining a state of deterioration of a three-way catalyst converter for removing pollutants in the exhaust gas of an internal combustion engine comprising:

an upstream air-fuel ratio sensor disposed upstream of said three-way catalyst converter, for detecting a specific component in the exhaust gas to generate a first air-fuel ratio signal indicating the air-fuel ratio upstream of said three-way catalyst converter;

a downstream air-fuel ratio sensor disposed downstream of said three-way catalyst converter, for detecting a specific component in the exhaust gas to generate a second air-fuel ratio signal indicating the air-fuel ratio downstream of said three-way catalyst converter;

means for detecting a first state wherein the second air-fuel ratio signal of said downstream air-fuel ratio sensor indicates a rich state with respect to the stoichiometric air-fuel ratio when the engine is in a driving state for the stoichiometric air-fuel ratio or a rich air-fuel ratio with respect to the stoichiometric air-fuel ratio;

means for detecting a second state that said engine is in a driving state for a lean air-fuel ratio with respect to the stoichiometric air-fuel ratio and the air-fuel ratio signal of said air-fuel ratio sensor indicates a lean state with respect to the stoichiometric air-fuel ratio;

means for counting a time from a timing when said second state is detected after said first state is detected, to a timing when both of the first and second air-fuel ratio signals of said upstream and downstream air-fuel ratio sensors indicate a lean state with respect to the stoichiometric air-fuel ratio; and means for determining that said three-way catalyst converter is deteriorated, when said time is shorter than predetermined time.

48. An apparatus as set forth in claim 47, wherein said driving state for the stoichiometric air-fuel ratio or lean state with respect to the stoichiometric air-fuel ratio is a fuel cut-off state.

49. An apparatus for determining a state of deterioration of a three-way catalyst converter for removing pollutants in the exhaust gas of an internal combustion engine comprising:

an downstream air-fuel ratio sensor disposed downstream of said three-way catalyst converter, for detecting a specific component in the exhaust gas to generate an air-fuel ratio signal indicating the air-fuel ratio upstream of said three-way catalyst converter;

means for detecting a first state wherein said engine is in a fuel cut-off state for a time longer than a first predetermined time;

means for detecting a second state wherein said engine is in a driving state for the stoichiometric air-fuel ratio;

means for counting a time from a timing when said second state is detected after said first state is detected, to a timing when the air-fuel ratio signal of said downstream air-fuel ratio sensor indicates a rich state with respect to the stoichiometric air-fuel ratio; and means for determining that said three-way catalyst converter is deteriorated, when said time is shorter than a second predetermined time.

50. An apparatus as set forth in claim 48, further comprising:

an upstream air-fuel ratio sensor disposed upstream of said three-way catalyst converter, for detecting a specific component in the exhaust gas to generate an air-fuel ratio signal indicating the air-fuel ratio upstream of said three-way catalyst converter, means for determining whether or not said engine is in a driving state for an air-fuel ratio feedback control of the stoichiometric air-fuel ratio, the driving state for the stoichiometric air-fuel ratio being such that an actual air-fuel ratio is controlled in accordance with the air-fuel ratio signals of said upstream and downstream air-fuel ratio, so that the actual air-fuel ratio is close to the stoichiometric air-fuel ratio, when said engine is in a driving state for an air-fuel ratio feedback control of the stoichiometric air-fuel ratio.

51. An apparatus for determining a state of deterioration of a three-way catalyst converter for removing pollutants in the exhaust gas of an internal combustion engine comprising:

an upstream air-fuel ratio sensor disposed upstream of said three-way catalyst converter, for detecting a specific component in the exhaust gas to generate a first air-fuel ratio signal indicating the air-fuel ratio upstream of said three-way catalyst converter;

a downstream air-fuel ratio sensor disposed downstream of said three-way catalyst converter, for detecting a specific component in the exhaust gas to generate a second air-fuel ratio signal indicating the air-fuel ratio signal indicating the air-fuel ratio downstream of said three-way catalyst converter;

means for calculating an air-fuel ratio correction amount in accordance with the air-fuel ratio signal of said upstream air-fuel ratio sensor so that the controlled air-fuel ratio is brought close to the stoichiometric air-fuel ratio;

means for adjusting an actual air-fuel ratio in accordance with the air-fuel ratio correction amount;

means for calculating a mean value of the air-fuel ratio correction amount;

means for making the controlled air-fuel ratio rich with respect to the stoichiometric air-fuel ratio for a definite time by increasing the air-fuel ratio correction amount based upon the mean value thereof;

means for making the controlled air-fuel ratio lean with respect to the stoichiometric air-fuel ratio by reducing the air-fuel ratio correction amount based upon the mean value thereof, after said definite time has passed;

means for counting a time from a time when the controlled air-fuel ratio is switched from the rich state to the lean state to a timing when the air-fuel ratio signal of said downstream air-fuel ratio sensor indicates a lean state with respect to the stoichiometric air-fuel ratio;

means for determining whether or not said time is shorter than predetermined time, and means determining that said three-way catalyst converter is deteriorated, when said time is shorter than said predetermined time.

52. An apparatus for determining a state of deterioration of a three-way catalyst converter for removing pollutants in the exhaust gas of an internal combustion engine comprising:

an upstream air-fuel ratio sensor disposed upstream of said three-way catalyst converter, for detecting a specific component in the exhaust gas to generate a first air-fuel ratio signal indicating the air-fuel ratio upstream of said three-way catalyst converter;

a downstream air-fuel ratio sensor disposed downstream of said three-way catalyst converter, for detecting a specific component in the exhaust gas to generate a second air-fuel ratio signal indicating the air-fuel ratio downstream of said three-way catalyst converter;

means for calculating an air-fuel ratio correction amount in accordance with the air-fuel ratio signal of said upstream air-fuel ratio sensor so that the controlled air-fuel ratio is brought close to the stoichiometric air-fuel ratio;

means for adjusting an actual air-fuel ratio in accordance with the air-fuel ratio correction amount;

means for calculating a mean value of the air-fuel ratio correction amount;

means for making the controlled air-fuel ratio rich with respect to the stoichiometric air-fuel ratio for a definite time by reducing the air-fuel ratio correction amount based upon the mean value thereof;

means for making the controlled air-fuel ratio rich with respect to the stoichiometric air-fuel ratio by increasing the air-fuel ratio correction amount based upon the mean value thereof, after said definite time has passed;

means for counting a time from a time when the controlled air-fuel ratio is switched from the lean state to the rich state to a timing when the air-fuel ratio signal of said downstream air-fuel ratio sensor indicates a rich state with respect to the stoichiometric air-fuel ratio;

means for determining whether or not said time is shorter than predetermined time, and means determining that said three-way catalyst converter is deteriorated, when said time is shorter than said predetermined time.

53. An apparatus for determining a state of deterioration of a three-way catalyst converter for removing pollutants in the exhaust gas of an internal combustion engine comprising:

an upstream air-fuel ratio sensor disposed upstream of said three-way catalyst converter, for detecting a specific component in the exhaust gas to generate a first air-fuel ratio signal indicating the air-fuel ratio upstream of said three-way catalyst converter;

a downstream air-fuel ratio sensor disposed downstream of said three-way catalyst converter, for detecting a specific component in the exhaust gas to generate a second air-fuel ratio signal indicating the air-fuel ratio downstream of said three-way catalyst converter;

means for calculating an air-fuel ratio correction amount in accordance with the air-fuel ratio signal of said upstream air-fuel ratio sensor so that the controlled air-fuel ratio is brought close to the stoichiometric air-fuel ratio;

means for adjusting an actual air-fuel ratio in accordance with the air-fuel ratio correction amount;

means for calculating a mean value of the air-fuel ratio correction amount;

means for making the controlled air-fuel ratio rich with respect to the stoichiometric air-fuel ratio for a first definite time by increasing the air-fuel ratio correction amount based upon the mean value thereof;

means for making the controlled air-fuel ratio lean with respect to the stoichiometric air-fuel ratio by reducing the air-fuel ratio correction amount based upon the mean value thereof, for a second definite time after said first definite time has passed;

means for making the controlled air-fuel ratio rich with respect to the stoichiometric air-fuel ratio by increasing the air-fuel ratio correction based upon the mean thereof, after said second time has passed;

means for counting a first time from a time when the controlled air-fuel ratio is switched from the rich state to the lean state to a timing when the air-fuel ratio signal of said downstream air-fuel ratio sensor indicates a lean state with respect to the stoichiometric air-fuel ratio;

means for counting a second time from a time when the controlled air-fuel ratio is switched from the lean state to the rich state to a timing when the air-fuel ratio signal of said downstream air-fuel ratio sensor indicates a rich state with respect to the stoichiometric air-fuel ratio;

means for determining whether or not a sum of said first time and said second time is shorter than a predetermined time, and means for determining that said three-way catalyst converter is deteriorated, when said sum is shorter than said predetermined time.

54. An apparatus for determining a state of deterioration of a three-way catalyst converter for removing pollutants in the exhaust gas of an internal combustion engine comprising:

a upstream air-fuel ratio sensor disposed upstream of said three-way catalyst converter, for detecting a specific component in the exhaust gas to generate a first air-fuel ratio signal indicating the air-fuel ratio upstream of said three-way catalyst converter;

a downstream air-fuel ratio sensor disposed downstream of said three-way catalyst converter, for detecting a specific component in the exhaust gas to generate a second air-fuel ratio signal indicating the air-fuel ratio downstream of said three-way catalyst converter;

means for calculating an air-fuel ratio correction amount in accordance with the air-fuel ratio signal of said upstream air-fuel ratio sensor so that the controlled air-fuel ratio is brought close to the stoichiometric air-fuel ratio;

means for adjusting an actual air-fuel ratio is accordance with the air-fuel ratio correction amount;

means for calculating a mean value of the air-fuel ratio correction amount;

means for making the controlled air-fuel ratio lean with respect to the stoichiometric air-fuel ratio for a first definite time by increasing the air-fuel ratio correction amount based upon the mean value thereof;

means for making the controlled air-fuel ratio rich by increasing the air-fuel ratio correction amount based upon the mean value thereof, for a second definite time after said first definite time has passed;

means for making the controlled air-fuel ratio lean with respect to the stoichiometric air-fuel ratio by reducing the air-fuel ratio correction amount based upon the mean thereof, after said second time has passed;

means for counting a first time from a time when the controlled air-fuel ratio is switched from the lean state to the rich state to a timing when the air-fuel ratio signal of said downstream air-fuel ratio sensor indicates a rich state with respect to the stoichiometric air-fuel ratio;

means for counting a second time from a time when the controlled air-fuel ratio is switched from the rich side to the lean side to a timing when the air-fuel ratio signal of said downstream air-fuel ratio sensor indicates a lean state with respect to the stoichiometric air-fuel ratio;

means for determining whether or not a sum of said first time and said second time is shorter than a predetermined time, and means for determining that said three-way catalyst converter is deteriorated, when said sum is shorter than said predetermined time.

* * * * *